US010894250B2

(12) United States Patent
McDaniel et al.

(10) Patent No.: US 10,894,250 B2
(45) Date of Patent: Jan. 19, 2021

(54) METHODS OF PREPARING A CATALYST UTILIZING HYDRATED REAGENTS

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US); Jeremy M. Praetorius, Bartlesville, OK (US); Eric D. Schwerdtfeger, Bartlesville, OK (US); Mitchell D. Refvik, Kingwood, TX (US); Mark L. Hlavinka, Kingwood, TX (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 0 days.

(21) Appl. No.: 16/987,128

(22) Filed: Aug. 6, 2020

(65) Prior Publication Data

US 2020/0360909 A1 Nov. 19, 2020

Related U.S. Application Data

(63) Continuation of application No. 16/907,801, filed on Jun. 22, 2020, which is a continuation of application
(Continued)

(51) Int. Cl.
*B01J 31/02* (2006.01)
*B01J 35/10* (2006.01)
(Continued)

(52) U.S. Cl.
CPC ........... *B01J 31/0209* (2013.01); *B01J 31/34* (2013.01); *B01J 35/1019* (2013.01);
(Continued)

(58) Field of Classification Search
CPC ........ B01J 31/0209; B01J 31/34; B01J 31/38; B01J 35/1014; B01J 35/1019;
(Continued)

(56) References Cited

U.S. PATENT DOCUMENTS 2,503,913 A 4/1950 Kimberlin, Jr.
3,119,569 A 1/1964 Baricordi
(Continued)

FOREIGN PATENT DOCUMENTS

EP 0033953 A2 8/1981
EP 0088989 A2 9/1983
(Continued)

OTHER PUBLICATIONS

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.
(Continued)

*Primary Examiner* — Patricia L. Hailey
(74) *Attorney, Agent, or Firm* — Conley Rose, P.C.

(57) ABSTRACT

A method comprising a) contacting a solvent, a carboxylic acid, and a peroxide-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4 and an equivalent molar ratio of titanium-containing compound to peroxide-containing compound in the solubilized titanium mixture is from about 1:1 to about 1:20; and c) contacting a chromium-silica support comprising from about 0.1 wt. % to about 20 wt. % water and the solubilized titanium mixture to form an addition
(Continued)

product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

20 Claims, 1 Drawing Sheet

Related U.S. Application Data

No. 16/774,891, filed on Jan. 28, 2020, now Pat. No. 10,722,874, which is a continuation-in-part of application No. 16/711,304, filed on Dec. 11, 2019, which is a continuation of application No. 15/953,930, filed on Apr. 16, 2018, now Pat. No. 10,543,480.

(51) Int. Cl.
*B01J 31/34* (2006.01)
*B01J 37/02* (2006.01)

(52) U.S. Cl.
CPC ....... *B01J 35/1023* (2013.01); *B01J 35/1047* (2013.01); *B01J 37/024* (2013.01)

(58) Field of Classification Search
CPC .. B01J 35/1023; B01J 35/1047; B01J 37/024; B01J 21/08; B01J 21/063; B01J 27/24; B01J 31/0237; B01J 31/0247; B01J 31/0249
USPC ........................................ 502/170, 242, 256
See application file for complete search history.

(56) References Cited

U.S. PATENT DOCUMENTS

| | | | |
|---|---|---|---|
| 3,248,179 A | 4/1966 | Norwood |
| 3,622,521 A | 11/1971 | Hogan |
| 3,758,418 A | 9/1973 | Wus |
| 3,780,011 A | 12/1973 | Tus |
| 3,875,079 A | 4/1975 | Witt |
| 3,882,096 A | 5/1975 | Shida |
| 3,887,494 A | 6/1975 | Dietz |
| 3,900,457 A | 8/1975 | Witt |
| 3,970,613 A | 7/1976 | Goldie |
| 3,976,632 A | 8/1976 | Delap |
| 4,041,224 A | 8/1977 | Hoff |
| 4,053,436 A | 10/1977 | Hogan |
| 4,119,569 A | 10/1978 | Dietz |
| 4,169,926 A | 10/1979 | McDaniel |
| 4,190,457 A | 2/1980 | McDaniel |
| 4,206,297 A | 6/1980 | Hoff |
| 4,218,345 A | 8/1980 | Hoff |
| 4,247,421 A | 1/1981 | McDaniel |
| 4,280,141 A | 7/1981 | McCann |
| 4,294,724 A | 10/1981 | McDaniel |
| 4,296,001 A | 10/1981 | Hawley |
| 4,299,731 A | 11/1981 | McDaniel |
| 4,312,967 A | 1/1982 | Norwood |
| 4,345,055 A | 8/1982 | Hawley |
| 4,368,303 A | 1/1983 | McDaniel |
| 4,402,864 A | 9/1983 | McDaniel |
| 4,405,501 A | 9/1983 | Witt |
| 4,405,768 A | 9/1983 | McDaniel |
| 4,424,320 A | 1/1984 | McDaniel |
| 4,434,243 A | 2/1984 | Martin |
| 4,442,275 A | 4/1984 | Martin |
| 4,446,243 A | 5/1984 | Chester |
| 4,501,885 A | 2/1985 | Sherk |
| 4,547,557 A | 10/1985 | McDaniel |
| 4,559,394 A | 12/1985 | McDaniel |
| 4,588,790 A | 5/1986 | Jenkins, III |
| 4,832,022 A | 5/1989 | Tjulkov |
| 4,981,831 A | 1/1991 | Knudsen |
| 5,115,053 A | 5/1992 | Knudsen |
| 5,183,792 A | 2/1993 | Wang |
| 5,231,066 A | 7/1993 | Rekers |
| 5,284,926 A | 2/1994 | Benham |
| 5,352,749 A | 10/1994 | Dechellis |
| 5,426,082 A | 6/1995 | Marsden |
| 5,436,304 A | 7/1995 | Griffin |
| 5,455,314 A | 10/1995 | Burns |
| 5,478,898 A | 12/1995 | Standaert |
| 5,565,175 A | 10/1996 | Hottovy |
| 5,575,979 A | 11/1996 | Hanson |
| 5,576,262 A | 11/1996 | Denton |
| 5,599,762 A | 2/1997 | Denton |
| 5,914,291 A | 6/1999 | Marsden |
| 5,968,675 A | 10/1999 | Tamano |
| 6,200,920 B1 | 3/2001 | Debras |
| 6,239,235 B1 | 5/2001 | Hottovy |
| 6,262,191 B1 | 7/2001 | Hottovy |
| 6,423,663 B2 | 7/2002 | Debras |
| 6,482,901 B1 | 11/2002 | Debras |
| 6,489,428 B1 | 12/2002 | Debras |
| 6,624,324 B2 | 9/2003 | Iwakura |
| 6,657,023 B2 | 12/2003 | Bergmeister |
| 6,707,498 B1 | 3/2004 | Toma |
| 6,833,415 B2 | 12/2004 | Kendrick |
| 6,855,781 B2 | 2/2005 | Bergmeister |
| 7,088,394 B2 | 8/2006 | Rossi |
| 7,262,259 B2 | 8/2007 | Katzen |
| 7,375,169 B1 | 5/2008 | Smith |
| 7,390,395 B2 | 6/2008 | Elomari |
| 7,700,516 B2 | 4/2010 | McDaniel |
| 7,803,736 B2 | 9/2010 | Rohde |
| 7,981,832 B2 | 7/2011 | McDaniel |
| 8,183,173 B2 | 5/2012 | McDaniel |
| 8,367,785 B2 | 2/2013 | Chamayou |
| 8,372,771 B2 | 2/2013 | Benham |
| 9,023,967 B2 | 5/2015 | Yu |
| 9,096,699 B2 | 8/2015 | McDaniel |
| 9,243,091 B2 | 1/2016 | Moineau |
| 9,587,048 B2 | 3/2017 | Praetorius |
| 9,598,513 B2 | 3/2017 | Yu |
| 9,796,798 B2 | 10/2017 | Praetorius |
| 9,879,101 B2 | 1/2018 | Yu |
| 9,988,468 B2 | 6/2018 | McDaniel |
| 10,213,766 B2 | 2/2019 | Praetorius |
| 10,287,369 B2 | 5/2019 | Schwerdtfeger |
| 10,323,108 B2 | 6/2019 | Yu |
| 10,323,109 B2 | 6/2019 | McDaniel |
| 10,513,570 B2 | 12/2019 | McDaniel |
| 10,543,480 B2 | 1/2020 | McDaniel |
| 10,722,874 B2 * | 7/2020 | McDaniel ............ B01J 31/0209 |
| 2003/0007083 A1 | 1/2003 | Rossi |
| 2004/0014914 A1 | 1/2004 | Schneider |
| 2004/0026324 A1 | 2/2004 | Luca |
| 2005/0153830 A1 | 7/2005 | Jensen |
| 2005/0192177 A1 | 9/2005 | Roger |
| 2005/0272886 A1 | 12/2005 | Cann |
| 2006/0166809 A1 | 7/2006 | Malek |
| 2007/0034549 A1 | 2/2007 | Elomari |
| 2008/0038161 A1 | 2/2008 | Marti |
| 2008/0103331 A1 | 5/2008 | Gaffney |
| 2011/0201768 A1 | 8/2011 | Benham |
| 2013/0090437 A1 | 4/2013 | Shah |
| 2013/0137839 A1 | 5/2013 | Yu |
| 2014/0045953 A1 | 2/2014 | Daly |
| 2014/0088206 A1 | 3/2014 | Daly |
| 2014/0275457 A1 | 9/2014 | McDaniel |
| 2014/0295178 A1 | 10/2014 | Watanabe |
| 2015/0065667 A1 | 3/2015 | Cheng |
| 2017/0037158 A1 | 2/2017 | Yu |
| 2017/0080406 A1 | 3/2017 | Praetorius |
| 2018/0094087 A1 | 4/2018 | McDaniel |

(56) References Cited

U.S. PATENT DOCUMENTS

| | | |
|---|---|---|
| 2018/0186908 A1 | 7/2018 | McDaniel |
| 2019/0314787 A1 | 10/2019 | McDaniel |

FOREIGN PATENT DOCUMENTS

| | | |
|---|---|---|
| EP | 0314385 A2 | 5/1989 |
| EP | 0085857 B1 | 8/1989 |
| EP | 0337365 A2 | 10/1989 |
| EP | 0439294 A1 | 7/1991 |
| EP | 0339571 B1 | 2/1994 |
| EP | 0589643 A1 | 3/1994 |
| EP | 0455444 B1 | 10/1997 |
| EP | 0882744 B1 | 7/2003 |
| EP | 0882743 B1 | 11/2003 |
| EP | 1845110 A1 | 10/2007 |
| EP | 2606962 A1 | 6/2013 |
| GB | 1197069 A | 7/1970 |
| GB | 1369485 A | 10/1974 |
| GB | 1405721 A | 9/1975 |
| GB | 1415649 A | 11/1975 |
| GB | 1447605 A | 8/1976 |
| GB | 1575419 A | 9/1980 |
| JP | 2011117006 A | 6/2011 |
| KR | 20070015410 A | 2/2007 |
| WO | 1993011173 A1 | 6/1993 |
| WO | 2002002652 A2 | 1/2002 |
| WO | 2003033550 A1 | 4/2003 |
| WO | 2004052948 A1 | 6/2004 |
| WO | 2005103100 A1 | 11/2005 |
| WO | 2009042149 A2 | 4/2009 |
| WO | 2009045215 A1 | 4/2009 |
| WO | 2010034464 A1 | 4/2010 |
| WO | 2012040144 A1 | 3/2012 |
| WO | 2013081826 A1 | 6/2013 |
| WO | 2013082346 A2 | 6/2013 |
| WO | 2016176189 A1 | 11/2016 |
| WO | 2017048930 A1 | 3/2017 |
| WO | 2018064050 A2 | 4/2018 |
| WO | 2018125690 A1 | 7/2018 |
| WO | 2018200273 A1 | 11/2018 |
| WO | 2019204076 A1 | 10/2019 |

OTHER PUBLICATIONS

Bouh, Abdillahi Omar, et al., "Mono- and dinuclear silica-supported titanium(IV) complexes and the effect of TiOTi connectivity on reactivity," J. Am. Chem. Soc., 1999, pp. 7201-7210, vol. 121, American Chemical Society.

Conway, Steven J., et al., "Chromia/silica-titania cogel catalysts for ethene polymerisation," J. Chem. Soc., Faraday Trans., 1989, pp. 1841-1851, vol. 85, No. 7.

Conway, Steven J., et al., "Chromia/silica-titania cogel catalysts for ethene polymerisation," J. Chem. Soc., Faraday Trans., 1989, pp. 71-78, vol. 85, No. 1.

Conway, Steven J., et al., "Chromia/silica-titania cogel catalysts for ethene polymerisation," J. Chem. Soc., Faraday Trans., 1989, pp. 79-90, vol. 85, No. 1.

Ellison, Alan, et al., "Characterisation of cr/silica catalysts," J. Chem. Soc. Faraday Trans., 1993, pp. 4393-4395, vol. 89, No. 24.

Ellison, Alan, et al., "Characterisation of modified cr-silica catalysts," Journal of Molecular Catalysis, 1994, pp. 81-86, vol. 90, Elsevier Science B.V.

Hieber, C. A., et al., "Shear-rate-dependence modeling of polymer melt viscosity," Polymer Engineering and Science, Jul. 1992, pp. 931-938, vol. 32, No. 14.

Hieber, C. A., et al., "Some correlations involving the shear viscosity of polystyrene melts," Rheol Acta, 1989, pp. 321-332, vol. 28.

Iler, Ralph K., "The Chemistry of Silica: Solubility, Polymerization, Colloid and Surface Properties and Biochemistry of Silica," 1979, 1 page, Wiley.

Mabilon, G., et al., "Copolymerisation ethylene-propylene par des catalyseurs a l'oxyde de chrome," Eur. Polym. J., 1985, pp. 245-249, vol. 21, No. 3, Pergamon Press Ltd., Great Britain.

McDaniel, M. P., et al., Activation of Phillips Cr/silica catalysts IV. Mobility of Cr(VI), Journal of Catalysis, 1982, pp. 37-47, vol. 76, Academic Press, Inc.

McDaniel, M. P., et al., "The activation of the phillips polymerization catalyst," Journal of Catalysis, 1983, pp. 118-126, vol. 82, Academic Press, Inc.

McDaniel, M. P., et al., The State of Cr(VI) on the Phillips Polymerization Catalyst, Journal of Catalysis, 1982, pp. 29-36, vol. 76, Academic Press, Inc.

Niemanstverdriet, J.W., "Spectroscopy in Catalysis: An Introduction," Jul. 11, 2008, 3rd Edition, pp. 251-295, Section 9.5, Wiley-VCH.

Product Information, "Ludox® SM-AS Colloidal Silica," 2005, W. R. Grace & Co.-Conn., 2 pages.

Pullukat, T. J., et al., "A chemical study of thermally activated chromic titanate on silica ethylene polymerization catalysts," Journal of Polymer Science: Polymer Chemistry Edition, 1980, pp. 2857-2866, vol. 18, John Wiley & Sons, Inc.

Pullukat, Thomas J., et al., "Titanium modified chromium catalysts for ethylene polymerization," Symposium on Transition Metal Catalysts Polymerization, Michigan Molecular Institute, Aug. 1981, pp. 697-712.

Rebenstorf, B., et al., "Influence of chromium concentration and addition of fluorine, titanium, or boron on the chromium species of the phillips catalyst: a quantitative evaluation," Langmuir, 1991, pp. 2160-2165, vol. 7, American Chemical Society.

Youlu Yu, et al., "SEC-MALS Method for the Determination of Long-Chain Branching and Long-Chain Branching Distribution in Polyethylene," Science Direct, Polymer vol. 46, 2005, pp. 5165-5182.

Yu, Youlu, et al., "Size-exclusion chromatography coupled to multiangle light scattering detection of long-chain branching in polyethylene made with phillips catalyst," Journal of Polymer Science Part A: Polymer Chemistry, 2012, vol. 50, pp. 1166-1173, Wiley Periodicals, Inc.

McDaniel, M. P., et al., Activation of Phillips Cr/silica catalysts IV. Mobility of Cr(VI), Journal of Catalysis, 2007, pp. 281-295, vol. 252, Academic Press, Inc.

* cited by examiner

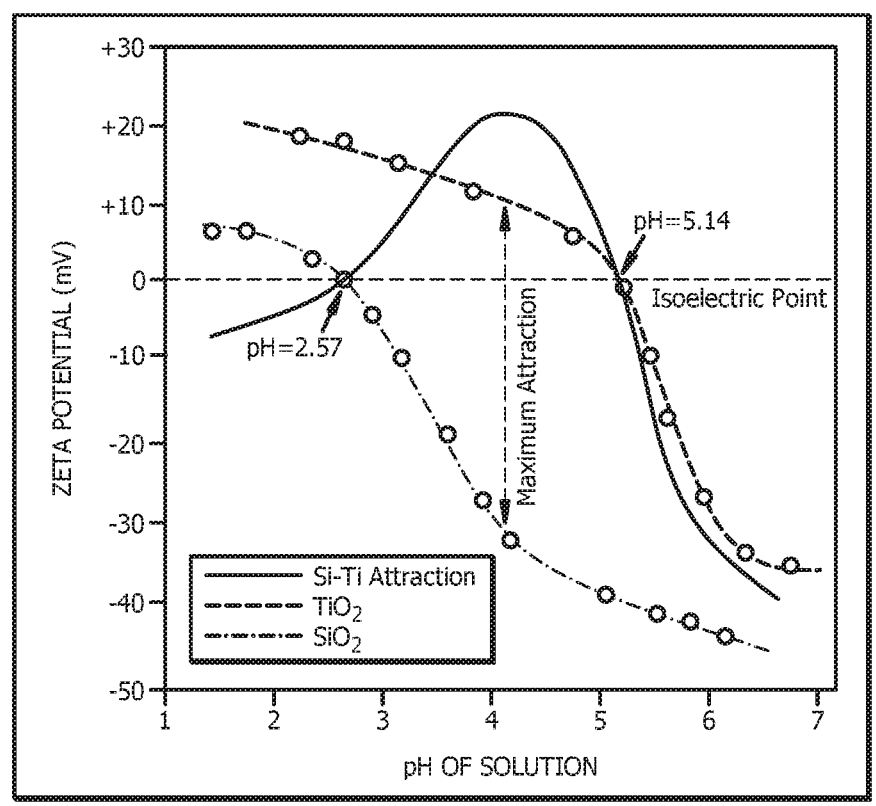

METHODS OF PREPARING A CATALYST UTILIZING HYDRATED REAGENTS

CROSS-REFERENCE TO RELATED APPLICATIONS

This application is a continuation of and claims priority to U.S. patent application Ser. No. 16/907,801, filed Jun. 22, 2020, which is a continuation of and claims priority to U.S. patent application Ser. No. 16/774,891, filed Jan. 28, 2020, now U.S. Pat. No. 10,722,874, which is a continuation-in part of and claims priority to U.S. patent application Ser. No. 16/711,304 filed Dec. 11, 2019 and published as U.S. Patent Application Publication No. US 2020/0114343 A1, which is a continuation of and claims priority to U.S. patent application Ser. No. 15/953,930 filed Apr. 16, 2018, now U.S. Pat. No. 10,543,480, and all entitled "Methods of Preparing a Catalyst Utilizing Hydrated Reagents," each of which is hereby incorporated by reference in its entirety for all purposes.

TECHNICAL FIELD

The present disclosure relates to catalyst compositions. More specifically, the present disclosure relates to methods of preparing olefin polymerization catalyst compositions and polymers prepared from same.

BACKGROUND

An economically important class of olefin polymerization catalysts includes chromium-silica-titanium (Cr/Si—Ti) catalysts prepared from silica-based catalyst supports. Rigorous drying of the water-sensitive catalyst components used to produce Cr/Si—Ti catalysts increases the time and cost of production. Development of an aqueous solution suitable for depositing titanium onto a silica-based catalyst support would reduce the costs of production of olefin polymerization catalysts. Thus, there is an ongoing need to develop new methods of producing olefin polymerization catalysts.

SUMMARY

Disclosed herein is a pre-catalyst composition comprising a) a silica support comprising silica wherein an amount of silica is in a range of from about 70 wt. % to about 95 wt. % based upon a total weight of the silica support, b) a chromium-containing compound wherein an amount of chromium is in a range of from about 0.1 wt. % to about 5 wt. % based upon the amount of silica, c) a titanium-containing compound wherein an amount of titanium is in a range of from about 0.1 wt. % to about 20 wt. % based upon the amount of silica, d) a carboxylic acid wherein an equivalent molar ratio of titanium-containing compound to carboxylic acid is in a range of from about 1:1 to about 1:10, and e) a nitrogen-containing compound with a molecular formula containing at least one nitrogen atom wherein an equivalent molar ratio of titanium-containing compound to nitrogen-containing compound is in a range of from about 1:0.5 to about 1:10.

Also disclosed herein is a pre-catalyst composition comprising a) a silica support comprising silica wherein an amount of silica is in a range of from about 70 wt. % to about 95 wt. % based upon a total weight of the silica support, b) a chromium-containing compound wherein an amount of chromium is in a range of from about 0.1 wt. % to about 5 wt. % based upon the amount of silica, and c) a titano-organic salt, wherein the titano-organic salt comprises titanium, a protonated nitrogen-containing compound and a carboxylate, and wherein i) an amount of titanium is in a range of from about 0.1 wt. % to about 20 wt. % based upon the amount of silica, ii) an equivalent molar ratio of titanium to carboxylate is in a range of from about 1:1 to about 1:10, and iii) an equivalent molar ratio of titanium to protonated nitrogen-containing compound is in a range of from about 1:0.5 to about 1:10.

Also disclosed herein is a pre-catalyst composition comprising a) a silica support comprising silica wherein an amount of silica is in a range of from about 70 wt. % to about 95 wt. % based upon a total weight of the silica support, b) a chromium-containing compound wherein an amount of chromium is in a range of from about 0.1 wt. % to about 5 wt. % based upon the amount of silica, c) a titanium-containing compound wherein an amount of titanium is in a range of from about 0.01 wt. % to about 0.1 wt. % based upon the amount of silica, d) a carboxylic acid wherein an equivalent molar ratio of titanium-containing compound to carboxylic acid is in a range of from about 1:1 to about 1:10, and e) a nitrogen-containing compound with a molecular formula containing at least one nitrogen atom wherein an equivalent molar ratio of titanium-containing compound to nitrogen-containing compound is in a range of from about 1:0.5 to about 1:10.

Also disclosed herein is a pre-catalyst composition prepared by a method comprising a) contacting a solvent and a carboxylic acid to form an acidic mixture wherein a weight ratio of solvent to carboxylic acid in the acidic mixture is from about 1:1 to about 100:1, b) contacting a titanium-containing compound and the acidic mixture to form an acidic titanium mixture wherein an equivalent molar ratio of titanium-containing compound to carboxylic acid in the acidic titanium mixture is from about 1:1 to about 1:4, c) contacting a nitrogen-containing compound and the acidic titanium mixture to form a solubilized titanium mixture wherein an equivalent molar ratio of titanium-containing compound to nitrogen-containing compound in the solubilized titanium mixture is from about 1:1 to about 1:4 and a pH of the solubilized titanium mixture is less than about 5.5, and d) contacting a chromium-silica support comprising from about 0.1 wt. % to about 20 wt. % water and the solubilized titanium mixture to form an addition product and drying the addition product by heating the addition product to a temperature in a range of from about 50° C. to about 150° C. and maintaining the temperature of the addition product in the range of from about 50° C. to about 150° C. for a time period of from about 30 minutes to about 6 hours to form the pre-catalyst.

Further disclosed herein is a method comprising a) contacting a solvent and a carboxylic acid to form an acidic mixture wherein a weight ratio of solvent to carboxylic acid in the acidic mixture is from about 1:1 to about 100:1, b) contacting a titanium-containing compound and the acidic mixture to form an acidic titanium mixture wherein an equivalent molar ratio of titanium-containing compound to carboxylic acid in the acidic titanium mixture is from about 1:1 to about 1:4, c) contacting a nitrogen-containing compound and the acidic titanium mixture to form a solubilized titanium mixture wherein an equivalent molar ratio of titanium-containing compound to nitrogen-containing compound in the solubilized titanium mixture is from about 1:1 to about 1:4 and a pH of the solubilized titanium mixture is less than about 5.5, and d) contacting a chromium-silica support comprising from about 0.1 wt. % to about 20 wt. % water and the solubilized titanium mixture to form an addition product and drying the addition product by heating the addition product to a temperature in a range of from about 50° C. to about 150° C. and maintaining the temperature of the addition product in the range of from about 50° C. to about 150° C. for a time period of from about 30 minutes to about 6 hours to form a pre-catalyst.

Also disclosed herein is a method comprising a) contacting a solvent and a carboxylic acid to form an acidic mixture wherein a weight ratio of solvent to carboxylic acid in the acidic mixture is from about 1:1 to about 100:1, b) contacting a titanium-containing compound and the acidic mixture to form an acidic titanium mixture wherein an equivalent molar ratio of titanium-containing compound to carboxylic acid in the acidic titanium mixture is from about 1:1 to about 1:4, c) contacting a nitrogen-containing compound and the acidic titanium mixture to form a solubilized titanium mixture wherein an equivalent molar ratio of titanium-containing compound to nitrogen-containing compound in the solubilized titanium mixture is from about 1:1 to about 1:4 and a pH of the solubilized titanium mixture is in a range of from about 3.5 to about 4.5, d) contacting a silica support comprising from about 0.1 wt. % to about 20 wt. % water and the solubilized titanium mixture to form a titanated support and drying the titanated support by heating the titanated support to a temperature in a range of from about 50° C. to about 150° C. and maintaining the temperature of the titanated support in the range of from about 50° C. to about 150° C. for a time period of from about 30 minutes to about 6 hours to form a dried titanated support, and e) contacting, to form a pre-catalyst, a chromium-containing compound and at least one material selected from the group consisting of the silica support, the titanated support, and the dried titanated support.

Also disclosed herein is a method comprising a) contacting a titanium-containing compound and a nitrogen-containing compound to form a basic mixture wherein an equivalent molar ratio of titanium-containing compound to nitrogen-containing compound in the basic mixture is from about 1:1 to about 1:4, b) contacting a solvent and a carboxylic acid to form an acidic mixture wherein a weight ratio of solvent to carboxylic acid in the acidic mixture is from about 1:1 to about 100:1, c) contacting the basic mixture and the acidic mixture to form a solubilized titanium mixture wherein an equivalent molar ratio of titanium-containing compound to carboxylic acid in the solubilized titanium mixture is from about 1:1 to about 1:4 and a pH of the solubilized titanium mixture is in a range of from about 3.5 to about 4.5, and d) contacting a chromium-silica support comprising from about 0.1 wt. % to about 20 wt. % water and the solubilized titanium mixture to form an addition product and drying the addition product by heating the addition product to a temperature in a range of from about 50° C. to about 150° C. and maintaining the temperature of the addition product in the range of from about 50° C. to about 150° C. for a time period of from about 30 minutes to about 6 hours to form a pre-catalyst.

Also disclosed herein is a method comprising a) contacting a titanium-containing compound and a nitrogen-containing compound to form a basic mixture wherein an equivalent molar ratio of titanium-containing compound to nitrogen-containing compound in the basic mixture is from about 1:1 to about 1:4, b) contacting a solvent and a carboxylic acid to form an acidic mixture wherein a weight ratio of solvent to carboxylic acid in the acidic mixture is from about 1:1 to about 100:1, c) contacting the basic mixture and the acidic mixture to form a solubilized titanium mixture wherein an equivalent molar ratio of titanium-containing compound to carboxylic acid in the solubilized titanium mixture is from about 1:1 to about 1:4 and a pH of the solubilized titanium mixture is in a range of from about 3.5 to about 4.5, d) contacting a silica support comprising from about 0.1 wt. % to about 20 wt. % water and the solubilized titanium mixture to form a titanated support and drying the titanated support by heating the titanated support to a temperature in a range of from about 50° C. to about 150° C. and maintaining the temperature of the titanated support in the range of from about 50° C. to about 150° C. for a time period of from about 30 minutes to about 6 hours to form a dried titanated support, and e) contacting, to form a pre-catalyst, a chromium-containing compound and at least one material selected from the group consisting of the silica support, the titanated support, and the dried titanated support.

Also disclosed herein is a method comprising a) contacting a solvent, a carboxylic acid, and a peroxide-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4 and an equivalent molar ratio of titanium-containing compound to peroxide-containing compound in the solubilized titanium mixture is from about 1:1 to about 1:20; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

Also disclosed herein is a method comprising a) contacting a solvent, at least two carboxylic acids and a peroxide-containing compound to form an acidic mixture wherein a weight ratio of solvent to carboxylic acid in the acidic mixture is from about 1:1 to about 100:1 and wherein the at least two carboxylic acids comprises at least one simple carboxylic acid and at least one complex carboxylic acid; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4 and an equivalent molar ratio of titanium-containing compound to peroxide-containing compound in the solubilized titanium mixture is from about 1:1 to about 1:20; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

Also disclosed herein is a method comprising a) contacting a solvent, at least two carboxylic acids and a nitrogen-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

Also disclosed herein is a method comprising a) contacting a solvent, at least two carboxylic acids, a nitrogen-containing compound and a peroxide-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4 and an equivalent molar ratio of titanium-containing compound to peroxide-containing compound in the solubilized titanium mixture is from about 1:1 to about 1:20; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

Also disclosed herein is a method comprising a) contacting a solvent, a carboxylic acid, an acidic phenol and a peroxide-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4, wherein an equivalent molar ratio of titanium-containing compound to acidic phenol in the solubilized titanium mixture is from about 1: to about 1:5; and wherein an equivalent molar ratio of titanium-containing compound to peroxide-containing compound in the solubilized titanium mixture is from about 1:1 to about 1:20; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

Also disclosed herein is a method comprising a) contacting a solvent, a carboxylic acid, an acidic phenol and a peroxide-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4, wherein an equivalent molar ratio of titanium-containing compound to acidic phenol in the solubilized titanium mixture is from about 1: to about 1:5; and wherein an equivalent molar ratio of titanium-containing compound to peroxide-containing compound in the solubilized titanium mixture is from about 1:1 to about 1:20; c) contacting the solubilized titanium mixture with a chromium-containing compound to form a chromium titanium mixture; d) contacting the chromium titanium mixture with a silica support comprising silica wherein an amount of silica is in a range of from about 70 wt. % to about 95 wt. % based upon a total weight of the silica support to form an addition product; and e) drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

Also disclosed herein is a method comprising a) preparing an acidic mixture comprising a solvent and at least two components selected from the group consisting of one or more carboxylic acids, one or more acidic phenols, one or more peroxide-containing compounds and one or more nitrogen-containing compounds wherein a weight ratio of solvent to carboxylic acid in the acidic mixture is from about 1:1 to about 100:1; b) contacting the acidic mixture with a chromium-containing compound, a titanium-containing compound and a silica support to form an addition product wherein: (i) an equivalent molar ratio of titanium-containing compound to carboxylic acid, when present in the acidic mixture, is from about 1:1 to about 1:4, (ii) an equivalent molar ratio of titanium-containing compound to acidic phenol, when present in the acidic mixture, is from about 1: to about 1:5, and (iii) an equivalent molar ratio of titanium-containing compound to peroxide-containing compound, when present in the acidic mixture, is from about 1:1 to about 1:20; and c) drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

Also disclosed herein is a composition comprising a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; c) a titanium-containing compound wherein an amount of titanium is in a range of from about 0.1 wt. % to about 20 wt. % based upon the amount of silica; d) a carboxylic acid wherein an equivalent molar ratio of titanium-containing compound to carboxylic acid is in a range of from about 1:1 to about 1:10; and e) a peroxide-containing compound wherein an equivalent molar ratio of titanium-containing compound to peroxide-containing compound is in a range of from about 1:1 to about 1:20.

Also disclosed herein is a composition comprising a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; and c) a titano-organic salt, wherein the titano-organic salt comprises titanium, a carboxylate, and a peroxide-containing compound and wherein the titano-organic salt comprises i) an amount of titanium is in a range of from about 0.1 wt. % to about 20 wt. % based upon the amount of silica; ii) an equivalent molar ratio of titanium to carboxylate is in a range of from about 1:1 to about 1:10; and iii) an equivalent molar ratio of titanium to peroxide-containing compound is in a range of from about 1:0.5 to about 1:20.

Also disclosed herein is a composition comprising a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; c) a titanium-containing compound wherein an amount of titanium is in a range of from about 0.01 wt. % to about 0.1 wt. % based upon the amount of silica; d) at least two carboxylic acids wherein an equivalent molar ratio of titanium-containing compound to carboxylic acids is in a range of from about 1:1 to about 1:10; and e) a peroxide-containing compound wherein an equivalent molar ratio of titanium-containing compound to peroxide-containing compounds is in a range of from about 1:1 to about 1:10.

Also disclosed herein is a composition comprising a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; c) a titano-organic salt, wherein the titano-organic salt comprises titanium, a protonated nitrogen-containing compound and a carboxylate, and wherein the titano-organic salt comprises: i) an amount of titanium is in a range of from about 0.1 wt. % to about 20 wt. % based upon the amount of silica; ii) an equivalent molar ratio of titanium to carboxylate is in a range of from about 1:1 to about 1:10; and iii) an equivalent molar ratio of titanium to protonated nitrogen-containing compound is in a range of from about 1:0.5 to about 1:10; and d) a peroxide-containing compound wherein an equivalent molar ratio of titanium-containing compound to peroxide-containing compound is from about 1:1 to about 1:20.

Also disclosed herein is a composition comprising a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; and c) a titano-organic salt, wherein the titano-organic salt comprises titanium, a protonated nitrogen-containing compound and a carboxylate, and wherein the titano-organic salt comprises i) an amount of titanium is in a range of from about 0.1 wt. % to about 20 wt. % based upon the amount of silica; ii) an equivalent molar ratio of titanium to carboxylate is in a range of from about 1:1 to about 1:10; and iii) an equivalent molar ratio of titanium to protonated nitrogen-containing compound is in a range of from about 1:0.5 to about 1:10; and d) an acidic phenol wherein an equivalent molar ratio of titanium-containing compound to acidic phenol in the acidic titanium mixture is from about 1:1 to about 1:5.

Also disclosed herein is a composition comprising a) at least two components selected from the group consisting of one or more carboxylic acids, one or more acidic phenols, one or more peroxide-containing compounds and one or more nitrogen-containing compounds; b) a chromium-containing compound wherein an amount of chromium is in a range of from about 0.1 wt. % to about 5 wt. % based upon the amount of silica; c) a titanium-containing compound wherein an amount of titanium is in a range of from about 0.01 wt. % to about 0.1 wt. % based upon the amount of silica; and (i) wherein an equivalent molar ratio of titanium-containing compound to carboxylic acid, when present, is in a range of from about 1:1 to about 1:10; (ii) wherein an equivalent molar ratio of titanium-containing compound to peroxide-containing compound, when present, is in a range of from about 1:1 to about 1:10; (iii) wherein an equivalent molar ratio of titanium-containing compound to acidic phenol, when present, in the acidic titanium mixture is from about 1:1 to about 1:5; and (iv) wherein an equivalent molar ratio of titanium-containing compound to nitrogen-containing compound, when present, is in a range of from about 1:0.5 to about 1:5.

BRIEF DESCRIPTION OF THE FIGURE

The following FIGURE forms part of the present specification and is included to further demonstrate certain aspects of the present disclosure. The subject matter of the present disclosure may be better understood by reference to the FIGURE in combination with the detailed description of specific aspects presented herein.

The FIGURE illustrates relationships between zeta potential and pH value for silica and titania.

While the subject matter disclosed herein is susceptible to various modifications and alternative forms, only a few specific aspects have been shown by way of example in the drawing and are described below in detail. The FIGURE and detailed descriptions of these specific aspects are not intended to limit the breadth or scope of the subject matter disclosed or the appended claims in any manner. Rather, the FIGURE and detailed written descriptions are provided to illustrate the present disclosure to a person skilled in the art and to enable such person to make and use the concepts disclosed herein.

DETAILED DESCRIPTION

The present disclosure encompasses olefin polymerization catalysts and pre-catalysts thereof, methods of preparing olefin polymerization catalysts and pre-catalysts thereof, and methods of utilizing olefin polymerization catalysts. In an aspect, a method of the present disclosure comprises contacting a silica support or a chromium-silica support (i.e., support) with titanium to produce a Cr/Si—Ti catalyst. The methodologies disclosed herein contemplate the use of a solubilized titanium mixture (STM) to facilitate the association of titanium with the support in the presence of water. Herein a methodology for preparation of the olefin polymerization catalyst comprises contacting the chromium-silica support with the STM under conditions suitable to form the catalyst composition. An alternative methodology for preparation of the olefin polymerization catalyst comprises contacting the silica support with the STM and chromium under conditions suitable to form a catalyst composition. While these aspects may be disclosed under a particular heading, the heading does not limit the disclosure found therein. Additionally, the various aspects and embodiments disclosed herein can be combined in any manner.

Aspects of the present disclosure are directed to catalyst compositions and pre-catalyst compositions. In an aspect, a catalyst composition comprises an olefin polymerization catalyst. In a further aspect, the olefin polymerization catalyst comprises a treated pre-catalyst composition. In yet a further aspect, the treated pre-catalyst composition comprises a pre-catalyst that has been subjected to an activation treatment (e.g., calcination) as disclosed herein.

Disclosed herein are pre-catalyst compositions. In an aspect, a pre-catalyst composition comprises a silica support, a chromium-containing compound, a titanium-containing compound, a carboxylic acid, and a nitrogen-containing compound. Alternatively, the pre-catalyst composition comprises the silica support, the chromium-containing compound, and a titano-organic salt. Alternatively, the pre-catalyst composition comprises a silica support, a chromium-containing compound, a titanium-containing compound, a carboxylic acid, a nitrogen-containing compound and a peroxide-containing compound. Alternatively, the pre-catalyst composition comprises a silica support, a chromium-containing compound, a titanium-containing compound, a carboxylic acid, and a peroxide-containing compound. Alternatively, the pre-catalyst composition comprises a silica support, a chromium-containing compound, a titanium-containing compound, an acidic phenol, and a peroxide-containing compound. In some aspects, the pre-catalyst compositions comprises a silica support, a chromium-containing compound, a titanium-containing compound, one or more carboxylic acids, one or more nitrogen-containing compounds, one or more acidic phenols, one or more peroxide-containing compounds or any combination thereof.

In an aspect, an olefin polymerization catalyst and a pre-catalyst thereof of the present disclosure comprise a silica support. The silica support may be any silica support suitable for preparation of the olefin polymerization catalyst and the pre-catalyst thereof as disclosed herein. In a further aspect, preparation of the olefin polymerization catalyst and the pre-catalyst thereof excludes thermal treatment of the silica support prior to contact with any other catalyst component. Consequently, the silica support suitable for use in the present disclosure may be a termed a hydrated silica support. Without wishing to be limited by theory, the hydrated silica support comprises a silica support wherein water evolution occurs when the silica support is heated within a range of from about 180° C. to about 200° C. under vacuum conditions for a period of time ranging from about 8 hours to about 20 hours. In a further aspect, the thus-treated silica support may evolve from about 0.1 wt. % to about 20 wt. % water; alternatively, about 1 wt. % to about 20 wt. % water; alternatively, about 1 wt. % to about 10 wt. % water; or alternatively, about 0.1 wt. % to about 10 wt. % water based upon the total weight of the silica support.

The silica support suitable for use in the present disclosure may have a surface area and a pore volume effective to provide for the production of an active olefin polymerization catalyst. In an aspect of the present disclosure, the silica support possesses a surface area in a range of from about 100 $m^2$/gram to about 1000 $m^2$/gram; alternatively, from about 250 $m^2$/gram to about 1000 $m^2$/gram; alternatively, from about 250 $m^2$/gram to about 700 $m^2$/gram; alternatively, from about 250 $m^2$/gram to about 600 $m^2$/gram; or alternatively, greater than about 250 $m^2$/gram. The silica support may be further characterized by a pore volume of greater than about 0.9 $cm^3$/gram; alternatively, greater than about 1.0 $cm^3$/gram; or alternatively, greater than about 1.5 $cm^3$/gram. In an aspect of the present disclosure, the silica support is characterized by a pore volume in a range of from about 1.0 $cm^3$/gram to about 2.5 $cm^3$/gram. The silica support may be further characterized by an average particle size in a range of from about 10 microns to about 500 microns; alternatively, about 25 microns to about 300 microns; or alternatively, about 40 microns to about 150 microns. Generally, an average pore size of the silica support may be in a range of from about 10 Angstroms to about 1000 Angstroms. In one aspect of the present disclosure, the average pore size of the silica support is in a range of from about 50 Angstroms to about 500 Angstroms; alternatively, from about 75 Angstroms to about 350 Angstroms.

The silica support suitable for use in the present disclosure may contain greater than about 50 wt. % silica; alternatively, greater than about 80 wt. % silica; or alternatively, greater than about 95 wt. % silica based upon the total weight of the silica support. In an aspect, the silica support comprises an amount of silica in a range of from about 70 wt. % to about 95 wt. % based upon a total weight of the silica support. The silica support may be prepared using any suitable method, e.g., the silica support may be prepared by hydrolyzing tetrachlorosilane ($SiCl_4$) with water or by contacting sodium silicate and a mineral acid. In a particular aspect, the silica support may be a hydrogel or a preformed silica support wherein the preformed silica support optionally has been dried prior to contact with any other catalyst component. The silica support may include additional components that do not adversely affect the catalyst, such as zirconia, alumina, thoria, magnesia, fluoride, sulfate, phosphate, or a combination thereof. In a particular aspect, the silica support of the present disclosure comprises alumina. Non-limiting examples of silica supports suitable for use in this disclosure include ES70, which is a silica support material with a surface area of 300 $m^2$/gram and a pore volume of 1.6 $cm^3$/gram, that is commercially available from PQ Corporation and V398400, which is a silica support material that is commercially available from Evonik.

In a particular aspect of the present disclosure, a silica support suitable for use in the present disclosure comprises chromium. The silica support comprising chromium may be termed a chrominated silica support or a chromium-silica support. In another aspect, the chromium-silica support comprises the characteristics disclosed herein for the silica support while additionally containing chromium. A non-limiting example of the chrominated silica support is HW30A, which is a chromium-silica support material that is commercially available from W. R. Grace and Company.

The silica support may be present in the olefin polymerization catalyst and a pre-catalyst thereof in an amount in a range of from about 50 wt. % to about 99 wt. %; or alternatively, from about 80 wt. % to about 99 wt. %. Herein a silica support percentage refers to a weight percent (wt. %) of the silica support associated with the olefin polymerization catalyst based upon the total weight of the olefin polymerization catalyst after completion of all processing steps (i.e., after activation via calcination). Alternatively, the silica support percentage refers to a weight percent (wt. %) of the silica support associated with the pre-catalyst based upon the total weight of the pre-catalyst after completion of all relevant processing steps excluding activation via calcination.

In a still further aspect, an olefin polymerization catalyst and a pre-catalyst thereof of the present disclosure comprise chromium. The source of chromium may be any chromium-containing compound capable of providing a sufficient amount of chromium to the olefin polymerization catalyst and the pre-catalyst thereof. In an aspect, the chromium-containing compound may be a water-soluble chromium compound or a hydrocarbon-soluble chromium compound. Examples of water-soluble chromium compounds include chromium trioxide, chromium acetate, chromium nitrate, or a combination thereof. Examples of hydrocarbon-soluble chromium compounds include tertiary butyl chromate, bis-cyclopentadienyl chromium(II), chromium(III) acetylacetonate, or a combination thereof. In one aspect of the present disclosure, the chromium-containing compound may be a chromium(II) compound, a chromium(III) compound, or a combination thereof. Suitable chromium(III) compounds include, but are not limited to, chromium(III) carboxylates, chromium(III) naphthenates, chromium(III) halides, chromium(III) sulfates, chromium(III) nitrates, chromium(III) dionates, or a combination thereof. Specific chromium(III)

compounds include, but are not limited to, chromium(III) sulfate, chromium(III) chloride, chromium(III) nitrate, chromium(III) bromide, chromium(III) acetylacetonate, and chromium(III) acetate. Suitable chromium(II) compounds include, but are not limited to, chromium(II) chloride, chromium(II) bromide, chromium(II) iodide, chromium(II) sulfate, chromium(II) acetate, or a combination thereof.

An amount of chromium present in the olefin polymerization catalyst may be in a range of from about 0.01 wt. % to about 10 wt. %; alternatively, from about 0.5 wt. % to about 5 wt. %; alternatively, from about 1 wt. % to about 4 wt. %; or alternatively, from about 2 wt. % to about 4 wt. % chromium based upon the total weight of the olefin polymerization catalyst. In another aspect, the amount of chromium present in the olefin polymerization catalyst may be in a range of from about 1 wt. % to about 5 wt. % chromium based upon the total weight of the olefin polymerization catalyst. Herein, a chromium percentage refers to a weight percent (wt. %) of chromium associated with the olefin polymerization catalyst based upon the total weight of the olefin polymerization catalyst after completion of all processing steps (i.e., after activation via calcination). In a further aspect, an amount of chromium present in a pre-catalyst may be in a range of from about 0.01 wt. % to about 10 wt. %; alternatively, from about 0.1 wt. % to about 5 wt. %; alternatively, from about 0.2 wt. % to about 2 wt. %; or alternatively, from about 0.5 wt. % to about 1.5 wt. % chromium based upon a total weight of silica within the pre-catalyst. Herein, a chromium percentage refers to a weight percent (wt. %) of chromium associated with the pre-catalyst based upon the total weight of silica within the pre-catalyst after completion of all processing steps excluding activation via calcination.

In a further aspect, an olefin polymerization catalyst and a pre-catalyst thereof of the present disclosure comprise titanium. The source of titanium may be any titanium-containing compound capable of providing a sufficient amount of titanium to the olefin polymerization catalyst and the pre-catalyst thereof. In a further aspect, the titanium-containing compound comprises a tetravalent titanium (Ti(IV)) compound or a trivalent titanium (Ti(III)) compound. The Ti(IV) compound may be any compound that comprises Ti(IV); alternatively, the Ti(IV) compound may be any compound that is able to release a Ti(IV) species upon dissolving into solution. The Ti(III) compound may be any compound that comprises Ti(III); alternatively, the Ti(III) compound may be any compound that is able to release a Ti(III) species upon dissolving into solution.

In an aspect, the titanium-containing compound suitable for use in the present disclosure comprises a Ti(IV) compound having at least one alkoxide group; or alternatively, at least two alkoxide groups. Ti(IV) compounds suitable for use in the present disclosure include, but are not limited to, Ti(IV) compounds that have the general formula TiO(OR$^K$)$_2$, Ti(OR)$_2$(acac)$_2$, Ti(OR$^K$)$_2$(oxal), a combination thereof wherein R$^K$ may be ethyl, isopropyl, n-propyl, isobutyl, n-butyl, or a combination thereof, "acac" is acetylacetonate; and "oxal" is oxalate. Alternatively, the titanium-containing compound comprises a titanium(IV) alkoxide. In an aspect, the titanium(IV) alkoxide may be titanium(IV) ethoxide, titanium(IV) isopropoxide, titanium(IV) n-propoxide, titanium(IV) n-butoxide, titanium(IV) 2-ethylhexoxide, or a combination thereof. In a particular aspect, the titanium-containing compound may be titanium(IV) isopropoxide.

In a still further aspect, the titanium-containing compound suitable for use in the present disclosure may comprise hydrous titania, titanium hydroxide, titanic acid, titanyl sulfate, titanium acetylacetonate, titanium oxyacetylacetonate, or a combination thereof.

In yet another aspect, the titanium-containing compound suitable for use in the present disclosure may comprise a titanium(IV) halide, non-limiting examples of which include titanium tetrachloride, titanium tetrabromide, titanium (IV) oxychloride, and titanium(IV) oxybromide. In a further aspect the titanium(IV) halide may comprise a titanium alkoxyhalide having the general formula Ti(OR$^K$)$_n$Q$_{4-n}$; wherein R$^K$ may be ethyl, isopropyl, n-propyl, isobutyl, n-butyl, or a combination thereof, wherein Q may be a fluoride, a chloride, a bromide, an iodide, or a combination thereof, and wherein n may be an integer from 1 to 4.

An amount of titanium present in an olefin polymerization catalyst of the present disclosure may range from about 0.01 wt. % to about 10 wt. %; alternatively, from about 0.5 wt. % to about 5 wt. %; alternatively, from about 1 wt. % to about 4 wt. %; or alternatively, from about 2 wt. % to about 4 wt. % titanium based upon the total weight of the olefin polymerization catalyst. In another aspect, the amount of titanium present in the olefin polymerization catalyst may range from about 1 wt. % to about 5 wt. % titanium based upon the total weight of the olefin polymerization catalyst. Herein, a titanium percentage refers to a weight percent (wt. %) of titanium associated with the olefin polymerization catalyst based upon the total weight of the olefin polymerization catalyst after completion of all processing steps (i.e., after activation via calcination). In a further aspect, an amount of titanium present in a pre-catalyst of the present disclosure may range from about 0.01 wt. % to about 25 wt. %; alternatively, from about 0.1 wt. % to about 20 wt. %; alternatively, from about 0.5 wt. % to about 10 wt. %; alternatively, from about 1 wt. % to about 6 wt. %; or alternatively, from about 2 wt. % to about 4 wt. % titanium based upon a total weight of silica within the pre-catalyst. Herein, a titanium percentage refers to a weight percent (wt. %) of titanium associated with the pre-catalyst based upon a total weight of silica within the pre-catalyst after completion of all processing steps excluding activation via calcination.

In an aspect, an olefin polymerization catalyst and a pre-catalyst thereof of the present disclosure comprise one or more carboxylic acids. The carboxylic acid may be a monocarboxylic acid, a dicarboxylic acid, a tricarboxylic acid, an α-hydroxycarboxylic acid, a β-hydroxycarboxylic acid, an α-ketocarboxylic acid, or a combination thereof. In an aspect, the carboxylic acid may be a $C_1$ to $C_{15}$ monocarboxylic acid or a $C_1$ to $C_5$ monocarboxylic acid; alternatively, a $C_1$ to $C_{15}$ dicarboxylic acid or a $C_1$ to $C_5$ dicarboxylic acid; alternatively, a $C_1$ to $C_{15}$ tricarboxylic acid or a $C_1$ to $C_5$ tricarboxylic acid; alternatively, a $C_1$ to $C_{15}$ α-hydroxycarboxylic acid or a $C_1$ to $C_5$ α-hydroxycarboxylic acid; alternatively, a $C_1$ to $C_{15}$ β-hydroxycarboxylic acid or a $C_1$ to $C_5$ β-hydroxycarboxylic acid; or alternatively, a $C_1$ to $C_{15}$ α-ketocarboxylic acid or a $C_1$ to $C_5$ α-ketocarboxylic acid.

In a particular aspect, the one or more carboxylic acids may be acetic acid, citric acid, gluconic acid, glycolic acid, glyoxylic acid, lactic acid, malic acid, malonic acid, oxalic acid, phosphonoacetic acid, tartaric acid, glyceric acid, gluconic acid, mandelic acid, 2,4-hydroxybenzoic acid, 2,6-pyridine dicarboxylic acid, nitrotriacetic acid, α-hydroxyisobutric acid, methylmalonic acid, phenyl malonic acid, digluconic acid, iminodiacetic acid, salicylic acid, catechol, 2-(hydoxymethyl)butyric acid, or a combination thereof. In yet a further aspect, the carboxylic acid may be oxalic acid.

In yet a further aspect, the olefin polymerization catalyst and a pre-catalyst thereof of the present disclosure comprises at least two carboxylic acids. In such aspects, the at least two carboxylic acids may comprise at least one simple carboxylic acid and at least one complex carboxylic acid where the complex carboxylic acid comprises at least one ring structure. For example, the at least two carboxylic acids may be oxalic acid and phenyl malonic acid.

In an aspect, an olefin polymerization catalyst and a pre-catalyst thereof of the present disclosure comprise an acidic phenol. The acidic phenol may be any acidic phenol capable of providing an olefin polymerization catalyst and pre-catalyst of the type disclosed herein. In an aspect, the acidic phenol comprises catechols, salicyl alcohol, salicylic acid, phthalic acid, or derivatives thereof. In some aspects, an olefin polymerization catalyst and a pre-catalyst thereof of the present disclosure comprise a carboxylic acid and an acidic phenol, both of the type disclosed herein.

A pre-catalyst of the present disclosure comprises an equivalent molar ratio of titanium to carboxylic acid in a range of from about 1:1 to about 1:10; alternatively, from about 1:1 to about 1:5 or alternatively, from about 1:1.5 to about 1:4. In an aspect, the equivalent molar ratio of titanium to carboxylic acid is in a range of from about 1:1 to about 1:2. Alternatively, a pre-catalyst of the present disclosure comprises an equivalent molar ratio of titanium to acidic phenol in a range of from about 1:1 to about 1:10; alternatively, from about 1:1 to about 1:5 or alternatively, from about 1:1.5 to about 1:4. In an aspect, the equivalent molar ratio of titanium to acidic phenol is in a range of from about 1:1 to about 1:2.

In an aspect, an olefin polymerization catalyst and a pre-catalyst thereof of the present disclosure comprise a nitrogen-containing compound. The nitrogen-containing compound may be any nitrogen-containing compound suitable for providing effective titanation of the olefin polymerization catalyst and the pre-catalyst thereof. In a further aspect, the nitrogen-containing compound may have Structure 1, Structure 2, Structure 3, Structure 4, Structure 5, Structure 6, or a combination thereof.

| | | |
|---|---|---|
| $NR^1R^2R^3$ | $N(R^4)_xH_{(4-x)}OH$ | $NR^5R^6(CR^7R^8)_yOH$ |
| Structure 1 | Structure 2 | Structure 3 |
| $NR^9R^{10}OH$ | $Z=C(N(R^{11})_2)_2$ | $N(R^{12}OH)_3$ |
| Structure 4 | Structure 5 | Structure 6 |

$R^1$, $R^2$, $R^3$, $R^4$, $R^5$, $R^6$, $R^7$, $R^8$, $R^9$, $R^{10}$, $R^{11}$, and $R^{12}$ within the nitrogen-containing compound utilized as described herein are independent elements of the nitrogen-containing compound structure in which they are present and are independently described herein. The independent descriptions of $R^1$, $R^2$, $R^3$, $R^4$, $R^5$, $R^6$, $R^7$, $R^8$, $R^9$, $R^{10}$, $R^{11}$, and/or $R^{12}$ provided herein can be utilized without limitation, and in any combination, to further describe any nitrogen-containing compound structure which comprises an $R^1$, $R^2$, $R^3$, $R^4$, $R^5$, $R^6$, $R^7$, $R^8$, $R^9$, $R^{10}$, $R^{11}$, and/or $R^{12}$.

Generally, $R^1$, $R^2$, $R^3$, $R^5$, $R^6$, $R^9$, $R^{10}$, and/or $R^{11}$ of a respective nitrogen-containing compound which has an $R^1$, $R^2$, $R^3$, $R^5$, $R^6$, $R^9$, $R^{10}$, and/or $R^{11}$ may each independently be hydrogen, an organyl group, a hydrocarbyl group, or an aryl group. In an aspect, $R^1$, $R^2$, $R^3$, $R^5$, $R^6$, $R^9$, $R^{10}$, and/or $R^{11}$ may each independently be a $C_1$ to $C_{30}$ organyl group; alternatively, a $C_1$ to $C_{12}$ organyl group; or alternatively, a $C_1$ to $C_6$ organyl group. In an aspect, $R^1$, $R^2$, $R^3$, $R^5$, $R^6$, $R^9$, $R^{10}$, and/or $R^{11}$ may each independently be a $C_1$ to $C_{30}$ hydrocarbyl group; alternatively, a $C_1$ to $C_{12}$ hydrocarbyl group; or alternatively, a $C_1$ to $C_6$ hydrocarbyl group. In yet other aspects, $R^1$, $R^2$, $R^3$, $R^5$, $R^6$, $R^9$, $R^{10}$, and/or $R^{11}$ may each independently be a $C_6$ to $C_{30}$ aryl group; or alternatively, a $C_6$ to $C_{12}$ aryl group. In a further aspect, any organyl group, hydrocarbyl group or aryl group which may be used as $R^1$, $R^2$, $R^3$, $R^5$, $R^6$, $R^9$, $R^{10}$, and/or $R^{11}$ within the nitrogen-containing compound of the present disclosure may be substituted or non-substituted. It will be understood by one skilled in the art that the terms "alkyl", "organyl", "hydrocarbyl", and "aryl" are used herein in accordance with the definitions from the IUPAC Compendium of Chemical Terminology, $2^{nd}$ Ed (1997).

$R^4$ of a respective nitrogen-containing compound which has an $R^4$ may be an organyl group, a hydrocarbyl group or an aryl group. In an aspect, $R^4$ may be a $C_1$ to $C_{30}$ organyl group; alternatively, a $C_1$ to $C_{12}$ organyl group; or alternatively, a $C_1$ to $C_6$ organyl group. In an aspect, $R^4$ may be a $C_1$ to $C_{30}$ hydrocarbyl group; alternatively, a $C_1$ to $C_{12}$ hydrocarbyl group; or alternatively, a $C_1$ to $C_6$ hydrocarbyl group. In yet other aspects, $R^4$ may be a $C_6$ to $C_{30}$ aryl group; or alternatively, a $C_6$ to $C_{12}$ aryl group. In a further aspect, any organyl group, hydrocarbyl group or aryl group which may be used as $R^4$ within the nitrogen-containing compound of the present disclosure may be substituted or non-substituted.

In a particular aspect, any substituted organyl group, substituted hydrocarbyl group or substituted aryl group which may be used as $R^1$, $R^2$, $R^3$, $R^4$, $R^5$, $R^6$, $R^9$, $R^{10}$, and/or $R^{11}$ may contain one or more non-hydrogen substituents. The non-hydrogen substituents suitable for use herein may be a halogen, a $C_1$ to $C_{12}$ hydrocarbyl group, a $C_1$ to $C_{12}$ hydrocarboxy group, or a combination thereof. In an aspect, the halogen utilized as the non-hydrogen substituent may be fluorine, chlorine, bromine, or iodine. Non-limiting examples of the $C_1$ to $C_{12}$ hydrocarboxy group suitable for use herein include a methoxy group, an ethoxy group, a propoxy group, a butoxy group, a pentoxy group, a hexoxy group, a phenoxy group, a toloxy group, a xyloxy group, a trimethylphenoxy group, and a benzoxy group.

$R^7$ and/or $R^8$ of a respective nitrogen-containing compound which has an $R^7$ and/or $R^8$ may each independently be hydrogen or a methyl group.

$R^{12}$ of a respective nitrogen-containing compound which has an $R^{12}$ may be a branched alkyl group or a linear alkyl group. In an aspect, $R^{12}$ may be a $C_1$ to $C_{30}$ branched alkyl group; alternatively, a $C_1$ to $C_{12}$ branched alkyl group; or alternatively, a $C_1$ to $C_6$ branched alkyl group. In a further aspect, $R^{12}$ may be a $C_1$ to $C_{30}$ linear alkyl group; alternatively, a $C_1$ to $C_{12}$ linear alkyl group; or alternatively, a $C_1$ to $C_6$ linear alkyl group.

In still another aspect, a nitrogen-containing compound of the present disclosure which has Structure 2 may have x wherein x is an integer from 1 to 4. In an aspect, the nitrogen-containing compound which has Structure 3 may have y wherein y is an integer from 1 to 12. In yet a further aspect, the nitrogen-containing compound which has Structure 5 may have Z wherein Z is oxygen or sulfur.

In an aspect, a nitrogen-containing compound suitable for use in the present disclosure may be an alkanolamine, an amide, an amine, an alkylamine, an ammonium hydroxide, an aniline, a hydrazide, a hydroxylamine, an imine, a urea, or a combination thereof. In a further aspect, the alkanolamine, the amide, the amine, the ammonium hydroxide, the hydrazide, the hydroxylamine, the imine, and/or the urea used as the nitrogen-containing compound may contain one or more substituent groups. In an aspect, any substituent group contained within any nitrogen-containing compound of the present disclosure may be a halogen, a $C_1$ to $C_{12}$ organyl group, a $C_1$ to $C_{12}$ hydrocarbyl group, a $C_1$ to $C_{12}$ hydrocarboxy group, or a combination thereof. The halogen utilized as the substituent group of any aspect disclosed herein may be fluorine, chlorine, bromine, or iodine. Non-limiting examples of the $C_1$ to $C_{12}$ hydrocarboxy group suitable for use herein include a methoxy group, an ethoxy group, a propoxy group, a butoxy group, a pentoxy group, a hexoxy group, a phenoxy group, a toloxy group, a xyloxy group, a trimethylphenoxy group, and a benzoxy group.

In a still further aspect, non-limiting examples of specific nitrogen-containing compounds suitable for use in the present disclosure include acetamide, acryl amide, allyl amine, ammonia, ammonium hydroxide, butyl amine, tert-butyl amine, N,N'-dibutyl urea, creatine, creatinine, diethanol amine, diethylhydroxy amine, diisopropanol amine, dimethylaminoethanol, dimethyl carbamate, dimethyl formamide, dimethyl glycine, dimethylisopropanol amine, N,N'-dimethyl urea, ethanol amine, ethyl amine, glycol amine, hexyl amine, hydroxyamine, imidazole, isopropanol amine, methacryl amide, methyl amine, N-methyl aniline, N-methyl-2-propanol amine, methyldiethanol amine, methyl formamide, propyl amine, 2-propanol amine, pyrazole, pyrrolidine, pyrrolidinone, succinimide, tetraethylammonium hydroxide, tetramethylammonium hydroxide, triethanol amine, triisopropanol amine, trimethyl amine, urea, 1,8-diazabicyclo[5.4.0]undec-7-ene, or a combination thereof.

A pre-catalyst of the present disclosure comprises an equivalent molar ratio of titanium to nitrogen-containing compound in a range of from about 2:1 to about 1:10; alternatively, from about 1:1 to about 1:5; or alternatively, from about 1:1.5 to about 1:4. In an aspect, the equivalent molar ratio of titanium to nitrogen-containing compound is in a range of from about 1:1 to about 1:2.

In a particular aspect, a pre-catalyst composition of the present disclosure comprises a titano-organic salt. In an aspect, the pre-catalyst composition comprising the titano-organic salt further comprises a silica support and a chromium-containing compound, both of the type previously disclosed herein. In a further aspect, the titano-organic salt suitable for use herein comprises titanium, a protonated nitrogen-containing compound, and a carboxylate.

In an aspect, the titano-organic salt comprises titanium. The source of titanium may be any titanium-containing compound capable of providing a sufficient amount of titanium to a pre-catalyst as disclosed herein. In a further aspect, the source of titanium is a titanium-containing compound of the type previously disclosed herein.

In an aspect, the titano-organic salt comprises a protonated nitrogen-containing compound. The protonated nitrogen-containing compound may be any protonated nitrogen-containing compound capable of providing a sufficient amount of titanium to a pre-catalyst as disclosed herein. In a further aspect, the protonated nitrogen-containing compound may comprise a protonated form of any nitrogen-containing compound of the type previously disclosed herein.

In an aspect, the protonated nitrogen-containing compound comprises a protonated alkanolamine, a protonated amide, a protonated amine, a protonated alkylamine, a protonated ammonium hydroxide, a protonated aniline, a protonated hydroxylamine, a protonated urea, or a combination thereof.

In yet a further aspect, the protonated nitrogen-containing compound comprises protonated acetamide, protonated acryl amide, protonated allyl amine, ammonia, protonated ammonium hydroxide, protonated butyl amine, protonated tert-butyl amine, protonated N,N'-dibutyl urea, protonated creatine, protonated creatinine, protonated diethanol amine, protonated diethylhydroxy amine, protonated diisopropanol amine, protonated dimethylaminoethanol, protonated dimethyl carbamate, protonated dimethyl formamide, protonated dimethyl glycine, protonated dimethylisopropanol amine, protonated N,N'-dimethyl urea, protonated ethanol amine, protonated ethyl amine, protonated glycol amine, protonated hexyl amine, protonated hydroxyamine, protonated imidazole, protonated isopropanol amine, protonated methacryl amide, protonated methyl amine, protonated N-methyl aniline, protonated N-methyl-2-propanol amine, protonated methyldiethanol amine, protonated methyl formamide, protonated propyl amine, protonated 2-propanol amine, protonated pyrazole, protonated pyrrolidine, protonated pyrrolidinone, protonated succinimide, protonated tetraethylammonium hydroxide, protonated tetramethylammonium hydroxide, protonated triethanol amine, protonated triisopropanol amine, protonated trimethyl amine, protonated urea, protonated 1,8-diazabicyclo[5.4.0]undec-7-ene, or a combination thereof.

In a still further aspect, the titano-organic salt comprises a carboxylate. The carboxylate may be any carboxylate capable of providing a sufficient amount of titanium to a pre-catalyst as disclosed herein. In an aspect, the carboxylate may comprise an anionic form of any carboxylic acid of the type previously disclosed herein.

In a further aspect, the carboxylate comprises a $C_1$ to $C_{15}$ monocarboxylate, a $C_1$ to $C_{15}$ dicarboxylate, a $C_3$ to $C_{15}$ tricarboxylate, a $C_1$ to $C_{15}$ α-hydroxycarboxylate, or a combination thereof.

In a still further aspect, the carboxylate comprises acetate, citrate, gluconate, glycolate, glyoxylate, lactate, malate, malonate, oxalate, phosphonoacetate, tartrate, or a combination thereof.

In a further aspect, an amount of titanium present in the titano-organic salt of the present disclosure may range from about 0.01 wt. % to about 20 wt. %; alternatively, from about 0.5 wt. % to about 10 wt. %; or alternatively, from about 1 wt. % to about 6 wt. % titanium based upon a total weight of silica of a pre-catalyst as disclosed herein. In another aspect, the titano-organic salt comprises an equivalent molar ratio of titanium to carboxylate in a range of from about 1:1 to about 1:10; alternatively, from about 1:1 to about 1:5 or alternatively, from about 1:1.5 to about 1:4. In some aspects, the equivalent molar ratio of titanium to carboxylate may be about 1:2. In yet another aspect, the titano-organic salt comprises an equivalent molar ratio of titanium to nitrogen-containing compound in a range of from about 2:1 to about 1:10; alternatively, from about 1:1 to about 1:5; or alternatively, from about 1:1.5 to about 1:4. In a still further aspect, the equivalent molar ratio of titanium to nitrogen-containing compound may be about 1:2.

In an aspect, an olefin polymerization catalyst and a pre-catalyst thereof of the present disclosure comprise a peroxide-containing compound. The peroxide-containing compound may be any peroxide-containing compound suitable for providing effective titanation of the olefin polymerization catalyst and the pre-catalyst thereof. In a further aspect, the peroxide-containing compound comprises organic peroxides, diacyl peroxides, peroxydicarbonates, monoperoxycarbonates, peroxyketals, peroxyesters, dialkyl peroxides, hydroperoxides or any combination thereof. In an aspect the peroxide-containing compound comprises hydrogen peroxide, di-tert-butyl peroxide, benzoyl peroxide, dicumyl peroxide, cumene hydroperoxide, tert-butyl hydroperoxide, phthaloyl peroxide, or any combination thereof. In an aspect the peroxide-containing compound comprises hydrogen peroxide. In an aspect, a pre-catalyst of the present disclosure comprises an equivalent molar ratio of titanium to peroxide-containing compound in a range of from about 1.0:0.5 to about 1:50, alternatively, from about 1:2 to about 1:20 or alternatively, from about 1:5 to about 1:10. In some aspects, utilization of a peroxide-containing compound in the olefin polymerization catalyst and a pre-catalyst thereof results in an increased solubility of the carboxylic acid-Ti component of the STM.

In an aspect of the present disclosure, a method for preparation of an olefin polymerization catalyst comprises utilization of a solubilized titanium mixture (STM). In a particular aspect, the STM of the present disclosure comprises a carboxylic acid, a titanium-containing compound, a nitrogen-containing compound, and a solvent. In another aspect, the STM of the present disclosure comprises a carboxylic acid, a titanium-containing compound, a nitrogen-containing compound, optionally a peroxide-containing compound and a solvent. In another aspect, the STM of the present disclosure comprises a carboxylic acid, a titanium-containing compound, a nitrogen-containing compound, a peroxide-containing compound and a solvent. In yet another aspect, the STM of the present disclosure comprises a carboxylic acid, a titanium-containing compound, a peroxide-containing compound and a solvent. In another aspect, the STM of the present disclosure comprises an acidic phenol, a titanium-containing compound, a nitrogen-containing compound, a peroxide-containing compound and a solvent. In another aspect, the STM of the present disclosure comprises an acidic phenol, a titanium-containing compound, a nitrogen-containing compound, and a solvent. In another aspect, the STM of the present disclosure comprises an acidic phenol, a titanium-containing compound, a peroxide-containing compound and a solvent. In another aspect, the STM of the present disclosure comprises a carboxylic acid, an acidic phenol, a titanium-containing compound, a peroxide-containing compound and a solvent. In another aspect, the STM of the present disclosure comprises a carboxylic acid, an acidic phenol, a nitrogen-containing compound, a titanium-containing compound, a peroxide-containing compound and a solvent. In an aspect, the STM comprises a carboxylic acid of the type used as a component of a pre-catalyst as disclosed herein, alternatively at least two carboxylic acids of the type used as a component of the pre-catalyst disclosed herein. In a further aspect, the STM comprises a titanium-containing compound of the type used as a component of the pre-catalyst as disclosed herein. In a further aspect, the STM comprises one or more nitrogen-containing compounds of the type used as a component of the pre-catalyst as disclosed herein. In a further aspect, the STM comprises one or more peroxide-containing compounds of the type used as a component of the pre-catalyst as disclosed herein. In a yet further aspect, the STM comprises one or more acidic phenols of the type used as a component of the pre-catalyst as disclosed herein.

In a further aspect, the STM of the present disclosure comprises a solvent. The solvent may be an aqueous solvent, an alcohol, an organic solvent, a hydrocarbon, or a combination thereof. A non-limiting example of an aqueous solvent suitable for use in the present disclosure comprises deionized water, distilled water, filtered water, or a combination thereof. Non-limiting examples of alcohols suitable for use as the solvent include methanol, ethanol, n-propanol, isopropanol, n-butanol, isobutanol, pentanol, hexanol, cyclohexanol, heptanol, octanol, benzyl alcohol, phenol, or a combination thereof. In a further aspect, the organic solvent suitable for use in the present disclosure may be an ester, a ketone, or a combination thereof. Non-limiting examples of esters suitable for use as the solvent include ethyl acetate, propyl acetate, butyl acetate, isobutyl isobutyrate, methyl lactate, ethyl lactate, or a combination thereof. Non-limiting examples of ketones suitable for use as the solvent include acetone, ethyl methyl ketone, methyl isobutyl ketone, or a combination thereof. In a particular aspect, the hydrocarbon suitable for use as the solvent may be a halogenated aliphatic hydrocarbon, an aromatic hydrocarbon, a halogenated aromatic hydrocarbon, or a combination thereof. Non-limiting examples of the hydrocarbon suitable for use as the solvent include methylene chloride, chloroform, carbon tetrachloride, dichloroethane, trichloroethane, benzene, toluene, ethylbenzene, xylenes, chlorobenzene, dichlorobenzene, or a combination thereof.

In a particular aspect, a solubilized titanium mixture (STM) as disclosed herein comprises an acidic mixture that may be prepared by contacting one or more carboxylic acids and a solvent or alternatively one or more acidic phenols and a solvent. In an aspect, the STM is prepared by sequential addition of a titanium-containing compound followed by a nitrogen-containing compound to the acidic mixture as disclosed herein. In an alternative aspect, the titanium-containing compound and the nitrogen-containing compound may be contacted to form a basic mixture that is subsequently contacted with the acidic mixture to form the STM as disclosed herein. In a further aspect, the nitrogen-containing compound utilized to form the basic mixture may be a component of an aqueous solution.

In another aspect, a solubilized titanium mixture (STM) as disclosed herein comprises an acidic mixture. The acidic mixture may be prepared by contacting a carboxylic acid with a peroxide-containing compound and a solvent. Alternatively, the acidic mixture may be prepared by contacting at least two carboxylic acids with a peroxide-containing compound and a solvent. Alternatively, the acidic mixture may be prepared by contacting an acidic phenol with a peroxide-containing compound and a solvent. Alternatively, the acidic mixture may be prepared by contacting an acidic phenol with one or more carboxylic acids and optionally with a peroxide-containing compound and a solvent.

In an aspect, the STM is prepared by sequential addition of a titanium-containing compound followed by a nitrogen-containing compound to the acidic mixture as disclosed herein. In another aspect, the STM is prepared by the addition of a titanium-containing compound to the acidic mixture as disclosed herein. In some aspects, the order of addition is any order compatible with the materials disclosed herein. For example, any STM may comprise any of the components disclosed herein (e.g., acidic phenol, nitrogen-containing compound, peroxide-containing compound, carboxylic acid), the titanium-containing compound and a chromium-containing compound.

In an alternative aspect, the titanium-containing compound and the nitrogen-containing compound may be contacted to form a basic mixture that is subsequently contacted with the acidic mixture to form the STM as disclosed herein. In a further aspect, the nitrogen-containing compound utilized to form the basic mixture may be a component of an aqueous solution.

In an aspect, the STM comprises one or more carboxylic acids, alternatively one or more acidic phenols, alternatively a combination of one or more acid phenols and one or more carboxylic acids, all of the type disclosed herein. In an aspect, a STM of the present disclosure comprises an acidic mixture having a weight ratio of solvent to carboxylic acid in a range of from about 1:1 to about 100:1; alternatively, from about 1:1 to about 50:1; or alternatively, from about 1:1 to about 10:1. In a further aspect, the STM comprises an equivalent molar ratio of titanium-containing compound to carboxylic acid in a range of from about 1:0.5 to about 1:20; alternatively, from about 1:1 to about 1:10; or alternatively, from about 1:1 to about 1:5. In some aspects, the equivalent molar ratio of titanium-containing compound to carboxylic acid may be about 1:2.5. In another aspect, the STM comprises an equivalent molar ratio of nitrogen-containing compound to carboxylic acid in a range of from about 0.1:1 to about 5:1; alternatively, from about 0.5:1 to about 3:1; alternatively, from about 1:1 to about 2:1; or alternatively, from about 1:1 to about 2:1. In another aspect, the STM comprises an equivalent molar ratio of titanium-containing compound to peroxide-containing compound in a range of from about 1:0.5 to about 1:50; alternatively, from about 1:1 to about 1:20; alternatively, from about 1:5 to about 1:10; or alternatively, from about 1:3 to about 1:8. In another aspect, the STM comprises an equivalent molar ratio titanium-containing compound to acidic phenol in a range of from about 1:0.5 to about 1:10; alternatively, from about 1:1 to about 1:5; alternatively, from about 1:1 to about 1:3; or alternatively, from about 1:1 to about 1:2.5.

In yet a further aspect, the STM comprises an equivalent molar ratio of titanium-containing compound to nitrogen-containing compound in a range of from about 1:0.5 to about 1:10; alternatively, from about 1:1 to about 1:5; alternatively, from about 1:1 to about 1:3; or alternatively, from about 1:1 to about 1:2.5. In still further aspects, the equivalent molar ratio of titanium-containing compound to nitrogen-containing compound may be about 1:2.

In a particular aspect, the STM suitable for use in the present disclosure may be characterized by a pH of less than about 5.5. Alternatively, the STM may be characterized by a pH in a range of from about 2.5 to about 5.5; alternatively, from about 3.0 to about 5.0; or alternatively, from about 3.5 to about 4.5.

In an aspect of the present disclosure, the catalyst components disclosed herein may be contacted in any order or fashion deemed suitable to one of ordinary skill in the art with the aid of the present disclosure to produce an olefin polymerization catalyst having the characteristics disclosed herein.

In a particular aspect, a method for preparation of an olefin polymerization catalyst comprises contacting a solvent and one or more carboxylic acids, both of the type disclosed herein, to form an acidic mixture. The method may further comprise contacting a titanium-containing compound of the type disclosed herein and the acidic mixture to form an acidic titanium mixture. In an aspect, a nitrogen-containing compound of the type disclosed herein and the acidic titanium mixture may be contacted to form a STM as disclosed herein, e.g., the nitrogen-containing compound may be added to the acidic titanium mixture to form the STM. In some aspects, the nitrogen-containing compound is added to the acidic titanium mixture as a single portion of an amount sufficient to form an equivalent molar ratio of titanium-containing compound to nitrogen-containing compound of about 1:2 within the STM. In a particular aspect, an amount of nitrogen-containing compound to be added to the acidic titanium mixture is determined with an acid-base indicator, (e.g., bromocresol green), wherein the nitrogen-containing compound is added to the acidic titanium mixture in multiple portions and wherein a single portion comprises from about 3% to about 10% of the amount of nitrogen-containing compound that comprises an equivalent molar ratio of titanium-containing compound to nitrogen-containing compound of about 1:2. Addition of the multiple portions of the nitrogen-containing compound may be ceased when a green-hued endpoint of a bromocresol green indicator is achieved. In some aspects, the green-hued endpoint of the bromocresol green indicator correlates to a pH value within the STM of about 4.0. In a further aspect, addition of the nitrogen-containing compound to the acidic titanium mixture comprises neutralizing the acidic titanium mixture partially; or alternatively, neutralizing the acidic titanium mixture completely. The method for preparation of the olefin polymerization catalyst may further comprise contacting a chromium-silica support of the type disclosed herein and the STM to form an addition product. In a further aspect, the addition product may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form a pre-catalyst.

In a further aspect, a method for preparation of an olefin polymerization catalyst comprises contacting a solvent and one or more carboxylic acids, both of the type disclosed herein, to form an acidic mixture. The method may further comprise contacting a titanium-containing compound of the type disclosed herein and the acidic mixture to form an acidic titanium mixture. In an aspect, a nitrogen-containing compound of the type disclosed herein and the acidic titanium mixture may be contacted to form a STM as disclosed herein, e.g., the nitrogen-containing compound may be added to the acidic titanium mixture to form the STM. In some aspects, the nitrogen-containing compound is added to the acidic titanium mixture as a single portion of an amount sufficient to form an equivalent molar ratio of titanium-containing compound to nitrogen-containing compound of about 1:2 within the STM. In a particular aspect, an amount of nitrogen-containing compound to be added to the acidic titanium mixture is determined with an acid-base indicator, (e.g., bromocresol green), wherein the nitrogen-containing compound is added to the acidic titanium mixture in multiple portions and wherein a single portion comprises from about 3% to about 10% of the amount of nitrogen-containing compound that comprises an equivalent molar ratio of titanium-containing compound to nitrogen-containing compound of about 1:2. Addition of the multiple portions of the nitrogen-containing compound may be ceased when a green-hued endpoint of a bromocresol green indicator is achieved. In some aspects, the green-hued endpoint of the bromocresol green indicator correlates to a pH value within the STM of about 4.0. In a further aspect, addition of the nitrogen-containing compound to the acidic titanium mixture comprises neutralizing the acidic titanium mixture partially; or alternatively, neutralizing the acidic titanium mixture completely.

The method for preparation of the olefin polymerization catalyst may further comprise contacting a silica support of the type disclosed herein and the STM to form a titanated support. In a further aspect, the titanated support may be dried by heating the titanated support to a temperature in a range of from about 25° C. to about 300° C.; alternatively, from about 50° C. to about 150° C.; or alternatively, from about 75° C. to about 100° C. The method further comprises maintaining the temperature of the titanated support in the range of from 25° C. to about 300° C.; alternatively, from about 50° C. to about 150° C.; or alternatively, from about 75° C. to about 100° C. for a time period of from about 30 minutes to about 6 hours to form a dried titanated support. The method may further comprise contacting a chromium-containing compound of the type disclosed herein and the dried titanated support to form an addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form a pre-catalyst. In an alternative aspect, prior to drying the titanated support as disclosed herein the chromium-containing compound and the titanated support may be contacted to form the addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form the pre-catalyst. In yet another alternative aspect, the chromium-containing compound and the silica support may be contacted to form a chromium-silica support that may be contacted with the STM to form the addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form the pre-catalyst.

In yet a further aspect, a method for preparation of an olefin polymerization catalyst comprises contacting a titanium-containing compound and a nitrogen-containing compound, both of the type disclosed herein, to form a basic mixture. The method may further comprise contacting a solvent and a carboxylic acid, both of the type disclosed herein, to form an acidic mixture. The basic mixture and the acidic mixture may be contacted to form a solubilized titanium mixture (STM) as disclosed herein, e.g., the basic mixture may be added to the acidic mixture to form the STM. In some aspects, the basic mixture is added to the acidic mixture as a single portion of an amount sufficient to form an equivalent molar ratio of titanium-containing compound to carboxylic acid of about 1:2. In a particular aspect, an amount of basic mixture to be added to the acidic mixture is determined with an acid-base indicator, (e.g., bromocresol green), wherein the basic mixture is added to the acidic mixture in multiple portions and wherein a single portion comprises from about 3% to about 10% of the amount of basic mixture that comprises an equivalent molar ratio of titanium-containing compound to carboxylic acid of about 1:2. Addition of the multiple portions of the basic mixture may be ceased when a green-hued endpoint of a bromocresol green indicator is achieved. In some aspects, the green-hued endpoint of the bromocresol green indicator correlates to a pH value within the STM of about 4.0. In a further aspect, addition of the basic mixture to the acidic mixture comprises neutralizing the acidic mixture partially; or alternatively, neutralizing the acidic mixture completely. The method for preparation of the olefin polymerization catalyst may further comprise contacting a chromium-silica support of the type disclosed herein and the STM to form an addition product. In a further aspect, the addition product may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form the pre-catalyst.

In a still further aspect, a method for preparation of an olefin polymerization catalyst comprises contacting a titanium-containing compound and a nitrogen-containing compound, both of the type disclosed herein, to form a basic mixture. The method may further comprise contacting a solvent and a carboxylic acid, both of the type disclosed herein, to form an acidic mixture. The basic mixture and the acidic mixture may be contacted to form a solubilized titanium mixture (STM) as disclosed herein, e.g., the basic mixture may be added to the acidic mixture to form the STM. In some aspects, the basic mixture is added to the acidic mixture as a single portion of an amount sufficient to form an equivalent molar ratio of titanium-containing compound to carboxylic acid of about 1:2. In a particular aspect, an amount of basic mixture to be added to the acidic mixture is determined with an acid-base indicator, (e.g., bromocresol green), wherein the basic mixture is added to the acidic mixture in multiple portions and wherein a single portion comprises from about 3% to about 10% of the amount of basic mixture that comprises an equivalent molar ratio of titanium-containing compound to carboxylic acid of about 1:2. Addition of the multiple portions of the basic mixture may be ceased when a green-hued endpoint of a bromocresol green indicator is achieved. In some aspects, the green-hued endpoint of the bromocresol green indicator correlates to a pH value within the STM of about 4.0. In a further aspect, addition of the basic mixture to the acidic mixture comprises neutralizing the acidic mixture partially; or alternatively, neutralizing the acidic mixture completely. The method for preparation of the olefin polymerization catalyst may further comprise contacting a silica support of the type disclosed herein and the STM to form a titanated support. In a further aspect, the titanated support may be dried by heating the titanated support to a temperature in a range of from about 25° C. to about 300° C.; alternatively, from about 50° C. to about 150° C.; or alternatively, from about 75° C. to about 100° C. The method further comprises maintaining the temperature of the titanated support in the range of from about 25° C. to about 300° C.; alternatively, from about 50° C. to about 150° C.; or alternatively, from about 75° C. to about 100° C. for a time period of from about 30 minutes to about 6 hours to form a dried titanated support. The method may further comprise contacting a chromium-containing compound of the type disclosed herein and the dried titanated support to form an addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form a pre-catalyst. In an alternative aspect, prior to drying the titanated support as disclosed herein the chromium-containing compound and the titanated support may be contacted to form the addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form the pre-catalyst. In yet another alternative aspect, the chromium-containing compound and the silica support may be contacted to form a chromium-silica support that may be contacted with the STM to form the addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form the pre-catalyst.

In a further aspect, a method for preparation of an olefin polymerization catalyst comprises contacting a solvent, one or more carboxylic acids, one or more nitrogen-containing compounds and a peroxide-containing compound, each of the type disclosed herein, to form an acidic mixture. Alternatively, a method for preparation of an olefin polymerization catalyst comprises contacting a solvent, one or more acidic phenols, a nitrogen-containing compound and a peroxide-containing compound, each of the type disclosed herein, to form an acidic mixture. Alternatively, a method for preparation of an olefin polymerization catalyst comprises contacting a solvent, one or more carboxylic acids, one or more acidic phenols, one or more nitrogen-containing compound and a peroxide-containing compound, each of the type disclosed herein, to form an acidic mixture. Alternatively, a method for preparation of an olefin polymerization catalyst comprises contacting a solvent, one or more carboxylic acids, one or more acidic phenols and a peroxide-containing compound, each of the type disclosed herein, to form an acidic mixture. Alternatively, a method for preparation of an olefin polymerization catalyst comprises contacting a solvent, one or more acidic phenols, one or more nitrogen-containing compounds and a peroxide-containing compound, each of the type disclosed herein, to form an acidic mixture. The method may further comprise contacting a titanium-containing compound of the type disclosed herein and the acidic mixture to form an acidic titanium mixture.

In an aspect, a nitrogen-containing compound of the type disclosed herein and the acidic titanium mixture may be contacted to form a solubilized titanium mixture (STM) as disclosed herein, e.g., the nitrogen-containing compound may be added to the acidic titanium mixture to form the STM. In some aspects, the nitrogen-containing compound is added to the acidic titanium mixture as a single portion of an amount sufficient to form an equivalent molar ratio of titanium-containing compound to nitrogen-containing compound of about 1:2 within the STM. In a particular aspect, an amount of nitrogen-containing compound to be added to the acidic titanium mixture is determined with an acid-base indicator, (e.g., bromocresol green), wherein the nitrogen-containing compound is added to the acidic titanium mixture in multiple portions and wherein a single portion comprises from about 3% to about 10% of the amount of nitrogen-containing compound that comprises an equivalent molar ratio of titanium-containing compound to nitrogen-containing compound of about 1:2. Addition of the multiple portions of the nitrogen-containing compound may be ceased when a green-hued endpoint of a bromocresol green indicator is achieved. In some aspects, the green-hued endpoint of the bromocresol green indicator correlates to a pH value within the STM of about 4.0. In a further aspect, addition of the nitrogen-containing compound to the acidic titanium mixture comprises neutralizing the acidic titanium mixture partially; or alternatively, neutralizing the acidic titanium mixture completely. The method for preparation of the olefin polymerization catalyst may further comprise contacting a silica support of the type disclosed herein and the STM to form a titanated support. In a further aspect, the titanated support may be dried by heating the titanated support to a temperature in a range of from about 25° C. to about 300° C.; alternatively, from about 50° C. to about 150° C.; or alternatively, from about 75° C. to about 100° C. The method further comprises maintaining the temperature of the titanated support in the range of from 25° C. to about 300° C.; alternatively, from about 50° C. to about 150° C.; or alternatively, from about 75° C. to about 100° C. for a time period of from about 30 minutes to about 6 hours to form a dried titanated support. The method may further comprise contacting a chromium-containing compound of the type disclosed herein and the dried titanated support to form an addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form a pre-catalyst. In an alternative aspect, prior to drying the titanated support as disclosed herein the chromium-containing compound and the titanated support may be contacted to form the addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form the pre-catalyst. In yet another alternative aspect, the chromium-containing compound and the silica support may be contacted to form a chromium-silica support that may be contacted with the STM to form the addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form the pre-catalyst.

In a further aspect, a method for preparation of an olefin polymerization catalyst comprises contacting a solvent, a carboxylic acid, and a peroxide-containing compound, each of the type disclosed herein, to form an acidic mixture. Alternatively, a method for preparation of an olefin polymerization catalyst comprises contacting a solvent, an acidic phenol, and a peroxide-containing compound, each of the type disclosed herein, to form an acidic mixture. Alternatively, a method for preparation of an olefin polymerization catalyst comprises contacting a solvent, a carboxylic acid, an acidic phenol, and a peroxide-containing compound, each of the type disclosed herein, to form an acidic mixture.

The method may further comprise contacting a titanium-containing compound of the type disclosed herein and the acidic mixture to form an acidic titanium mixture. The method for preparation of the olefin polymerization catalyst may further comprise contacting a silica support of the type disclosed herein and the STM to form a titanated support. In a further aspect, the titanated support may be dried by heating the titanated support to a temperature in a range of from about 25° C. to about 300° C.; alternatively, from about 50° C. to about 150° C.; or alternatively, from about 75° C. to about 100° C. The method further comprises maintaining the temperature of the titanated support in the range of from 25° C. to about 300° C.; alternatively, from about 50° C. to about 150° C.; or alternatively, from about 75° C. to about 100° C. for a time period of from about 30 minutes to about 6 hours to form a dried titanated support. The method may further comprise contacting a chromium-containing compound of the type disclosed herein and the dried titanated support to form an addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form a pre-catalyst. In an alternative aspect, prior to drying the titanated support as disclosed herein the chromium-containing compound and the titanated support may be contacted to form the addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form the pre-catalyst. In yet another alternative aspect, the chromium-containing compound and the silica support may be contacted to form a chromium-silica support that may be contacted with the STM to form the addition product that may be dried by heating the addition product to a temperature in a range of from about 25° C. to about 300° C.; alternatively, from about 50° C. to about 150° C.; or alternatively, from about 75° C. to about 100° C. The method further comprises maintaining the temperature of the addition product in the range of from about 25° C. to about 300° C.; alternatively, from about 50° C. to about 150° C.; or alternatively, from about 75° C. to about 100° C. for a time period of from about 30 minutes to about 6 hours to form the pre-catalyst.

Utilization of a solubilized titanium mixture (STM) in the preparation of an olefin polymerization catalyst of the present disclosure may be advantageous because the STM can facilitate the association of titanium with a silica support in the presence of an aqueous solvent (e.g., water). Further advantages may occur when the STM utilized to form the olefin polymerization catalyst comprises an aqueous solvent (e.g., water). The solubility of titanium in the aqueous solvent may be sufficient to allow the use of spray drying methodologies for contacting the STM and the silica support. Spray drying as used herein refers to a method of producing a dry powder from a liquid or slurry by rapidly drying with a hot gas. Spray drying methodologies may be utilized in the preparation of olefin polymerization catalysts in a continuous production method with the potential to produce large volumes of olefin polymerization catalysts. Spray drying methodologies may also be utilized in the preparation of olefin polymerization catalysts having a consistent particle size distribution. Utilization of the STM comprising the aqueous solvent may permit use of a hydrated silica support and obviate the thermal treatment required for anhydrous methods of catalyst preparation, (e.g., drying the hydrated silica support prior to contact with any other catalyst component).

As will be understood by one of ordinary skill in the art, calcination of the pre-catalysts disclosed herein may result in the emission of volatile organic compounds (VOC). In various aspects of the present disclosure utilizing peroxide in the absence of a nitrogen-containing compound, the emissions of VOCs are reduced when compared to an otherwise similar catalyst preparation carried out in the presence of a nitrogen-containing compound. In an aspect, the emissions of VOCs by a catalyst of the present disclosure may be reduced by equal to or greater than about 10%, alternatively equal to or greater than about 20% or alternatively equal to or greater than about 30% when compared to an otherwise similar catalyst preparation carried out in the presence of a nitrogen-containing compound.

In some aspects of the present disclosure, contacting of the components utilized in preparation of the olefin polymerization catalyst may be carried out in the presence of a reaction media. In a further aspect, the reaction media may be formed during contacting of the components utilized in preparation of the olefin polymerization catalyst. The reaction media may comprise a solvent (e.g., water) as disclosed herein and one or more liquids associated with the components utilized in preparation of the olefin polymerization catalyst (e.g., water associated with the silica support). In an aspect, the reaction media excludes any solid component utilized in the preparation of the olefin polymerization catalyst disclosed herein (e.g., silica support and any solids associated therewith). In some aspects, a sum of an amount of water present in the reaction media may be in a range of from about 1 wt. % to about 99 wt. %; alternatively, from about 1 wt. % to about 50 wt. %; alternatively, from about 1 wt. % to about 20 wt. %; or alternatively, from about 1 wt. % to about 10 wt. % based upon the total weight of the reaction media. In yet a further aspect, the reaction media may contain greater than about 20 wt. % water; alternatively, about 40 wt. % water; alternatively, about 60 wt. % water; alternatively, about 80 wt. % water; or alternatively, about 90 wt. % water based upon the total weight of the reaction media wherein the water may originate from one or more components utilized in preparation of the olefin polymerization catalyst.

In any aspect of the present disclosure, a method for preparation of an olefin polymerization catalyst further comprises activating a pre-catalyst prepared as disclosed herein via a calcination step. In some aspects, calcination of the pre-catalyst comprises heating the pre-catalyst in an oxidizing environment to produce the olefin polymerization catalyst. For example, the pre-catalyst may be calcined by heating the pre-catalyst in the presence of air to a temperature in a range of from about 400° C. to about 1000° C.; alternatively, from about 500° C. to about 900° C.; or alternatively, from about 500° C. to about 850° C. Calcination of the pre-catalyst may further comprise maintaining the temperature of the pre-catalyst in the presence of air in the range of from about 400° C. to about 1000° C.; alternatively, from about 500° C. to about 900° C.; or alternatively, from about 500° C. to about 850° C. for a time period in a range of from about 1 minute to about 24 hours; alternatively, from about 1 minute to about 12 hours; alternatively, from about 20 minutes to about 12 hours; alternatively, from about 1 hour to about 10 hours; alternatively, from about 3 hours to about 10 hours; or alternatively, from about 3 hours to about 5 hours to produce the olefin polymerization catalyst.

The olefin polymerization catalysts of the present disclosure are suitable for use in any olefin polymerization method, using various types of polymerization reactors. In an aspect of the present disclosure, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, olefin polymerization catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to, multiple loop reactors, multiple gas phase reactors, a combination of loop and gas phase reactors, multiple high pressure reactors, and a combination of high pressure with loop and/or gas reactors. The multiple reactors may be operated in series or in parallel. In an aspect of the present disclosure, any arrangement and/or any combination of reactors may be employed to produce the polymer of the present disclosure.

According to one aspect of the present disclosure, the polymerization reactor system may comprise at least one loop slurry reactor. Such reactors are commonplace, and may comprise vertical or horizontal loops. Generally, continuous processes may comprise the continuous introduction of a monomer, an olefin polymerization catalyst, and/or a diluent into a polymerization reactor and the continuous removal from this reactor of a suspension comprising polymer particles and the diluent. Monomer, diluent, olefin polymerization catalyst, and optionally any comonomer may be continuously fed to a loop slurry reactor, where polymerization occurs. Reactor effluent may be flashed to remove the liquids that comprise the diluent from the solid polymer, monomer and/or comonomer. Various technologies may be used for this separation step, including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Diluents suitable for use in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is the polymerization of propylene monomer as disclosed in U.S. Pat. No. 5,455,314, which is incorporated by reference herein in its entirety.

According to yet another aspect of the present disclosure, the polymerization reactor may comprise at least one gas phase reactor. Such systems may employ a continuous recycle stream containing one or more monomers continuously cycled through a fluidized bed in the presence of the olefin polymerization catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding an olefin polymerization catalyst-containing polymer formed in a first polymerization zone to a second polymerization zone. One type of gas phase reactor suitable for use is disclosed in U.S. Pat. Nos. 4,588,790, 5,352,749, and 5,436,304, each of which is incorporated by reference in its entirety herein.

According to still another aspect of the present disclosure, a high-pressure polymerization reactor may comprise a tubular reactor or an autoclave reactor. Tubular reactors may have several zones where fresh monomer, initiators, or olefin polymerization catalysts are added. Monomer may be entrained in an inert gaseous stream and introduced at one zone of the reactor. Initiators, olefin polymerization catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the present disclosure, the polymerization reactor may comprise a solution polymerization reactor wherein the monomer is contacted with the olefin polymerization catalyst composition by suitable stirring or other means. A carrier comprising an organic diluent or excess monomer may be employed. If desired, the monomer may be brought in the vapor phase and into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for use in the present disclosure may further comprise any combination of at least one raw material feed system, at least one feed system for an olefin polymerization catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to, temperature, pressure, type and quantity of the olefin polymerization catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually in a range of from about 200 psig (1.4 MPa)-500 psig (3.45 MPa). High-pressure polymerization in tubular or autoclave reactors is generally run in a range of from about 20,000 psig (138 MPa) to 75,000 psig (518 MPa). Polymerization reactors can also be operated in a supercritical region occurring at generally higher temperatures and pressures. Operation at conditions above the critical point as indicated by a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness test values. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, comonomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the olefin polymerization catalysts prepared as described herein. Polymers produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, and bottles.

A method of the present disclosure comprises contacting an olefin polymerization catalyst of the type described with an olefin monomer under conditions suitable for the formation of a polyolefin and recovering the polyolefin. In an aspect the olefin monomer is an ethylene monomer and the polyolefin is an ethylene polymer (polyethylene).

Polyethylene prepared as described herein may be characterized by a high load melt index (HLMI), in a range of from about 1 g/10 min. to about 1000 g/10 min.; alternatively, from about 3 g/10 min. to about 300 g/10 min.; alternatively, from about 6 g/10 min. to about 100 g/10 min.; or alternatively, from about 15 g/10 min. to about 40 g/10 min. In a further aspect, the polyethylene prepared as described herein may be characterized by an HLMI that is from about 1.5 to about 15 times greater than the HLMI of a polymer produced utilizing an otherwise similar olefin polymerization catalyst containing no titanium.

In a particular aspect, polyethylene may be prepared with a de-titanated catalyst that was produced from a water-extracted pre-catalyst. In a further aspect, the water-extracted pre-catalyst is a pre-catalyst that was extracted with water prior to being calcined. For example, a pre-catalyst prepared as described herein may be extracted with water and subsequently calcined to provide the de-titanated catalyst (i.e., olefin polymerization catalyst derived from the water-extracted pre-catalyst). In a further aspect, polyethylene prepared with a de-titanated catalyst may be characterized by an HLMI in the range of from about 1 dg/min to about 7 dg/min. Such an HMLI value can indicate that the de-titanated catalyst has an amount of titanium based upon an amount of silica in a range of from about 0 wt. % to about 1 wt. %; or alternatively, about 0.1 wt. % to about 0.5 wt. %.

The melt index (MI) represents the rate of flow of a molten polymer through an orifice of 0.0825 inch diameter when subjected to a force of 2,160 grams at 190° C. as determined in accordance with ASTM D1238-82 condition E. The I10 represents the rate of flow of a molten polymer through an orifice of 0.0825 inch diameter when subjected to a force of 10,000 grams at 190° C. as determined in accordance with ASTM D1238-82 condition N. The HLMI (high load melt index) represents the rate of flow of a molten polymer through an orifice of 0.0825 inch diameter when subjected to a force of 21,600 grams at 190° C. as determined in accordance with ASTM D1238-82 condition F.

EXAMPLES

The following examples are given as particular aspects of the present disclosure and to demonstrate the practice and advantages thereof. It is understood that the examples are given by way of illustration and are not intended to limit the specification or the claims to follow in any manner.

It will be appreciated by one skilled in the art that the surfaces of oxides, including silica ($SiO_2$) and titania ($TiO_2$), commonly terminate with hydroxyl groups which are protic groups that can participate in acid-base reactions. In strongly acidic conditions the hydroxyl groups can be protonated to establish a positive charge upon the oxide surface. In strongly alkaline conditions the hydroxyl groups may be deprotonated to establish a negative charge upon the oxide surface. There is a pH value somewhere between the two limits at which zero net charge exists upon the oxide surface. The pH value correlating to zero net charge is the isoelectric point. Every oxide possesses a characteristic acidity and a specific isoelectric point controlled by the chemical properties of the metal or non-metal element of the oxide.

The FIGURE displays zeta potential as a function of solution pH value for silica and titania along with the isoelectric point value of both oxides. A curve of the coulombic Si—Ti attraction is also shown. Zeta potential is the difference in electrical charge potential existing between the surface of a solid particle immersed in a conducting liquid (e.g., water) and the bulk of the liquid. The FIGURE displays that titania is positively charged and silica is negatively charged within a zone of pH values between 3.0 and 5.0. The FIGURE also indicates that coulombic Si—Ti attraction is greatest around a pH value of about 4.0. Not wishing to be limited by theory, highly effective titanation of an olefin polymerization catalyst from an aqueous Ti solution may result when the coulombic Si—Ti attraction is maximized by maintaining a pH value of the solution at about 4.0. To explore this theory, several series of experiments were conducted to establish conditions leading to the formation of an aqueous Ti solution with a pH value of about 4.0.

All of the silica support materials, chemical reagents, and solvents described herein were used as received and were not dried prior to use.

Catalysts used in the experiments described below include Magnapore® a commercial Cr/silica-titania catalyst obtained from W. R. Grace and Company, and activated at various temperatures. Magnapore® is made by tergellation of Si, Ti and Cr, containing 2.5 wt. % Ti and 1 wt. % Cr, having a surface of about 500 m²/g, a pore volume of 2.5 mL/g, and an average particle size of about 130 microns. Another commercial Cr/silica-titania catalyst that was used, called C-25305HM, was obtained from Philadelphia Quartz (PQ) Corporation. It also contains 2.5 wt. % Ti and 1 wt. % Cr, having has a surface of about 500 m²/g, a pore volume of 2.7 mL/g, and an average particle size of about 100 microns. The main base catalyst used for the titanations described below was Sylopol® HA30W, a commercial Cr/silica obtained from W.R. Grace. This catalyst contained no titanium but did contain 1 wt. % Cr. It had a surface area of about 500 m²/g, a pore volume of about 1.6 mL/g, and an average particle size of about 100 microns. Three other commercial Cr/silica catalysts were also used; one called EP30X from PQ Corporation, another under the trade name D-70-150A(LV) from Asahi Glass Corporation (AGC), and the third was Sylopol® 969MPI from W.R. Grace. All three of these catalysts contained no titanium but did contain 1 wt. % Cr. All three had a pore volume of about 1.6 mL/g. EP30X and 969MPI had a surface area of about 300 m²/g and an average particle size of about 100 microns. AGC D-70-150A (LV) had a surface area of about 400 m²/g and an average particle size of about 80 microns.

Activity tests were conducted in a 2.2 liter steel reactor equipped with a marine stirrer running at 400 rpm. The reactor was surrounded by a steel jacket circulating water, the temperature of which was controlled by use of steam and water heat exchangers. These were connected in an electronic feed-back loop so that the reactor temperature could be maintained at +/−0.5° C. during the reaction.

Unless otherwise stated, a small amount (0.01 to 0.10 grams normally) of the solid chromium catalyst was first charged under nitrogen to the dry reactor. Next about 0.25 g of sulfate-treated alumina (600° C.) was added as a scavenger for poisons. Then 1.2 liter of isobutane liquid was charged and the reactor heated up to the specified temperature, usually 105 degrees C. Finally ethylene was added to the reactor to equal a fixed pressure, normally 550 psig (3.8 MPa), which was maintained during the experiment. The stirring was allowed to continue for the specified time, usually around one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

Example 1

Several control runs were conducted and the results of the control runs are listed in Table 1. Performance of the experimental catalysts shown in the further examples in terms of productivity, activity, and melt index potential may be compared to these control runs. Runs 1.10-1.13 display the performance of two non-titanated catalysts the latter of which, HA30W, provides a metric of the effectiveness of the titanations of Runs 1.16-1.18. The titanations displayed in Runs 1.16-1.18 used $Ti(OiPr)_4$ to titanate HA30W. The titanation in Run 1.15 exposed the support to $TiCl_4$ vapor at 250° C. in an attempt to produce a titanated catalyst uncontaminated by organic or alcohol by-products. In both of these methods, the support must be dried to remove free water from the surface, usually by a thermal treatment from about 150° C. to about 800° C. Otherwise the titanium will react with the free adsorbed water and be ineffective. In Runs 1.15-1.18 the catalyst was dried at 200° C. before being titanated by either gas phase or anhydrous solvent (usually heptane).

TABLE 1

Performance of Reference Catalysts

| Run No. | Catalyst Base | Treatment | Ti wt % | Act. Temp. | Ind. Time min | Prod. g/g | Activity g/g-h | MI dg/min | I10 dg/min | HLMI dg/min |
|---|---|---|---|---|---|---|---|---|---|---|
| 1.1 | Magnapore ® | none | 2.5 | 871° C. | 8 | 5362 | 7149 | 2.27 | 29.2 | 121 |
| 1.2 | Magnapore ® | none | 2.5 | 871° C. | 8 | 1921 | 4117 | 1.58 | 22.7 | 108 |
| 1.3 | Magnapore ® | none | 2.5 | 871° C. | 7 | 2822 | 3938 | 0.73 | 13.7 | 66.2 |
| 1.4 | Magnapore ® | none | 2.5 | 650° C. | 6 | 2071 | 2825 | 0.45 | | 30.0 |
| 1.5 | Magnapore ® | none | 2.5 | 650° C. | 6 | 1653 | 3672 | 0.58 | | 36.3 |

TABLE 1-continued

Performance of Reference Catalysts

| Run No. | Catalyst Base | Treatment | Ti wt % | Act. Temp. | Ind. Time min | Prod. g/g | Activity g/g-h | MI dg/min | I10 dg/min | HLMI dg/min |
|---|---|---|---|---|---|---|---|---|---|---|
| 1.6 | Magnapore ® | none | 2.5 | 650° C. | 7 | 3411 | 5831 | 0.50 | | 29.7 |
| 1.7 | Magnapore ® | none | 2.5 | 650° C. | 7 | 2150 | 2283 | 0.47 | | 26.9 |
| 1.8 | PQ C-25305HM | none | 2.5 | 650° C. | 5 | 1535 | 1674 | 0.91 | | 52.7 |
| 1.9 | PQ C-25305HM | none | 2.5 | 650° C. | 5 | 1596 | 4352 | 0.86 | | 53.9 |
| 1.10 | 969MPI | none | 0 | 780° C. | 20 | 2830 | 2326 | | 1.5 | 8.7 |
| 1.11 | 969MPI | none | 0 | 650° C. | 18 | 1835 | 1835 | 0.16 | | 12.8 |
| 1.12 | HA30W | none | 0 | 650° C. | 11 | 2973 | 2973 | | 0.87 | 5.5 |
| 1.13 | " | " | " | 650° C. | 18 | 3117 | 2309 | 0.24 | 4.22 | 19.6 |
| 1.14 | D-70-150A(LV) | PPC Cl Act. | 3.0 | 650° C. | 12 | 3221 | 2577 | 0.35 | 6.3 | 30.5 |
| 1.15 | D-70-150A(LV) | TiCl₄ vapor | 3.0 | 650° C. | 6 | 3092 | 2728 | 0.46 | 8.20 | 36.3 |
| 1.16 | HA30W | Ti(OiPr)₄/C7 | 3.5 | 650° C. | 8 | 2534 | 2715 | 0.40 | 7.70 | 36.7 |
| 1.17 | HA30W | Ti(OiPr)₄/C7 | 4.8 | 650° C. | 11 | 2455 | 1259 | 0.23 | 4.69 | 21.5 |
| 1.18 | " | " | " | " | 5 | 2271 | 2349 | 0.29 | 5.91 | 28.0 |

Run at 105° C., 550 psig

Example 2: Acidic Titanation

The first series of experiments studied the ability of carboxylic acids to form an acidic Ti-containing solution capable of providing effective titanation to an olefin polymerization catalyst of the type disclosed herein (i.e., catalyst). The results are listed in Table 2. All of these experiments started with hydrated silica supports that were not subjected to thermal treatment prior to contact with any other catalyst component. The carboxylic acids listed were mixed with water, or an alternate solvent system as listed, to form a solution, but in all cases the solvents were not dried and no attempt was made to use anhydrous conditions. Ti(OiPr)₄ was added and when dissolution occurred the acidic Ti-containing solution formed thereby was impregnated onto a chromium-silica support (HA30W). The product was then dried and calcined in air for three hours at 650° C. prior to use in polymerization experiments.

Table 2 summarizes the study of a variety of carboxylic acids. The use of carboxylic acids alone (no base added) did not produce very effective titanation. Run 2.2, which used acetic acid in propanol solvent, provided the most effective titanation. Successful results were also observed when HA30W was impregnated with the acidic Ti-containing solution and dropped into a 300° C. activator tube ("hot-drop", Runs 2.12-2.16). This rapid method of drying was moderately effective as evidenced by the higher melt index obtained when the catalyst was produced using this method compared to oven drying. The "hot-drop" method of drying resulted in more effective titanation when citric acid was used in place of oxalic acid. This result may have occurred because the first $pK_a$ of citric acid (3.13) is higher than the first $pK_a$ of oxalic acid (1.23). The lower acidity of citric acid may produce a Ti-containing solution with a pH value that is higher and closer to 4.0 when compared to the Ti-containing solution produced with oxalic acid.

TABLE 2

Titanation with Simple Acids

| Run No. | Acid/Solvent | Acid/Ti | Ind. Time min | Prod. g/g | Activity g/g-h | MI dg/min | I10 dg/min | HLMI dg/min |
|---|---|---|---|---|---|---|---|---|
| 2.1 | Acetic Acid Solvent | Large XS | 7 | 1453 | 1478 | 0.09 | 2.39 | 11.0 |
| 2.2 | Acetic Acid/n-propanol | Large XS | 5 | 3178 | 3467 | 0.49 | 8.69 | 39.1 |
| 2.3 | Glycolic acid | 4:1 | 17 | 3098 | 3320 | | 0.97 | 5.7 |
| 2.4 | Glycolic acid | 2:1 | 9 | 2186 | 2851 | | 0.37 | 2.9 |
| 2.5 | HNO₃ | 1.7% | 15 | 2846 | 2339 | | 0.08 | 1.1 |
| 2.6 | HNO₃/H₂O + n-propanol | 1.7% | 16 | 3111 | 3010 | 0.002 | 0.15 | 1.8 |
| 2.7 | Phosphonoacetic acid | 4:1 | 7 | 867 | 627 | | 1.14 | 6.0 |
| 2.8 | Oxalic acid, hot-drop** | 3:1 | 13 | 2933 | 3088 | | 1.03 | 6.4 |
| 2.9 | " | " | 9 | 2848 | 3224 | | 1.59 | 9.0 |
| 2.10 | Citric acid, hot-drop** | 3:1 | 9 | 3737 | 3114 | 0.11 | 3.41 | 17.3 |
| 2.11 | " | " | 14 | 2986 | 5599 | 0 | 1.53 | 9.0 |
| 2.12 | " | " | 9 | 3238 | 1833 | 0 | 3.02 | 16.0 |

Catalysts used virgin HA30W base, contained 3.5 wt % Ti, used water as solvent, were activated at 650° C.
Runs were normally conducted at 105° C., 550 psig.
*Run occurred at 100° C. with 5 mL 1-hexene, 550 psig
**These catalysts were dried by being dropped into a hot activator tube set at 300° C.

Example 3: Alkaline Titanation

The next series of experiments studied the ability of a base to form an alkaline Ti-containing solution capable of providing effective titanation to a catalyst. The results are listed in Table 3. The experimental approach was essentially identical to the method described in Example 2. Ti dissolved in some strong bases, e.g., organic bases were effective, but ammonium hydroxide and alkali hydroxides were not effective. Quaternary ammonium hydroxides dissolved Ti but uncharged primary, secondary, or tertiary amines were less effective. The melt index potentials resulting from the use of alkaline solutions were all low, like the non-titanated support, and thus did not display evidence of effective titanation of the chromium-silica support.

TABLE 3

Titanation with Simple Bases

| Run No. | Base/Solvent | Base/Ti | Ind. Time min | Prod g/g | Activity g/g-h | MI dg/min | I10 dg/min | HLMI dg/min |
|---|---|---|---|---|---|---|---|---|
| 3.1 | NEt$_4$OH | 4:1 | 34 | 0 | 0 | | | |
| 3.2 | " | 4:1 | 0 | 0 | 0 | | | |
| 3.3 | NEt$_4$OH | 1:1 | 24 | 2314 | 1876 | 0 | 0.28 | 2.6 |
| 3.4 | NTA + NEt$_4$OH | 1.2:2:1 | Not soluble | | | | | |
| 3.5 | AcAc + NEt$_4$OH | 1:1:1 | 18 | 2474 | 2699 | | 0.20 | 2.6 |
| 3.6 | Dimethylglycine | 4.5:1 | NA | 2749 | NA | 0.018 | 1.3 | 7.0 |
| 3.7 | " | | 16 | 3060 | 3165 | 0.013 | 1.0 | 5.9 |
| 3.8 | Triethanolamine | 2:1 | Not soluble | | | | | |
| 3.9 | Dimethylaminoethanol | 1:1 | 19 | 1186 | 1581 | | | 2.6 |
| 3.10 | NMe$_4$OH + Et-diamine | 2:2:1 | 0 | 67 | 59 | | | |
| 3.11 | NMe$_4$OH + Et-diamine | 0.6:4:1 | 37 | 3035.97 | 1023 | 0 | 0.0 | 1.6 |
| 3.12 | Ethylenediamine | 4:1 | Not soluble | | | | | |
| 3.13 | Arginine | 4:1 | Not soluble | | | | | |

Catalysts used virgin HA30W base, contained 3.5 wt % Ti, and were activated at 650° C.
Runs were normally conducted at 105° C. and 550 psig.
*Run at 100° C. with 5 mL 1-hexene, 550 psig
NTA = nitrilotetraacetic acid Example 4: pH Adjustment with Ammonium Hydroxides The results in Table 2 and Table 3 confirmed that attaching titania to silica can be problematic at both high pH and low pH. The next series of experiments were conducted to probe the theory that maximum coulombic Si—Ti attraction occurs at a pH value of about 4.0. Ti(OiPr)$_4$ was hydrolyzed to titania which was dissolved in an aqueous solution of oxalic acid (2 equivalents of oxalic acid per Ti), to produce an acidic Ti-containing solution with a pH value of about 1. Ammonium hydroxide, or a quaternary derivative as listed in Table 4, was added until a green-hued endpoint of a bromocresol green indicator was reached, indicating a pH value of about 4.0, to produce a solubilized Ti mixture (STM) of the type disclosed herein. The stoichiometry required to partially neutralize the acidic Ti-containing solution, and produce the STM thereby, was usually about two equivalents of base per Ti. An HA30W support was impregnated with the STM and the product was dried and calcined in air for three hours at 650° C. prior to use in polymerization experiments.

The results listed in Table 4 indicate that the approach was successful. Quaternary ammonium hydroxides were more effective when compared to ammonium hydroxide. This result may be explained by the lower volatility of tetraalkylammonium hydroxides. The results in Table 4 also indicate that the amount of base used to prepare the STM impacted the melt index potential conferred by the resultant catalyst. The method also allowed for effective titanation upon a hydrogel, rather than a pre-formed silica support (Run 4.16). The catalyst of Run 4.6 was prepared by inverse addition and displayed remarkable performance: Ti was dissolved in aqueous NMe$_4$OH to form an alkaline solution that was added to an aqueous solution of oxalic acid to prepare the STM used for impregnation of the HA30W support.

TABLE 4

Partial Neutralization with Ammonium Hydroxides

| Run No. | Base | Base/Ti | Ind. Time min | Prod. g/g | Activity g/g-h | MI dg/min | I10 dg/min | HLMI dg/min |
|---|---|---|---|---|---|---|---|---|
| 4.1 | NH$_4$OH | 2.0 | 11 | 2570 | 3281 | 0.10 | 3.16 | 16.8 |
| 4.2 | NH$_4$OH | 2.4 | 13 | 3144 | 3092 | 0.12 | 3.26 | 16.8 |
| 4.3 | NH$_4$OH | 2.7 | 11 | 2978 | 2414 | 0.14 | 3.62 | 17.6 |
| 4.4 | NMe$_4$OH | 2.0 | 12 | 3181 | 3976 | 0.51 | 9.1 | 44.4 |
| 4.5 | NMe$_4$OH | 2.1 | 11 | 3402 | 3581 | 0.32 | 6.4 | 31.8 |
| 4.6 | NMe$_4$OH | 2.0 R | 13 | 1508 | 542 | 1.63 | 28.8 | 143 |
| 4.7 | NMe$_4$OH | 1R 1OA | Precipitation occurred | | | | | |
| 4.8 | NEt$_4$OH | 1.0 | 18 | 2943 | 4772 | 0.14 | 3.39 | 16.9 |
| 4.9 | NEt$_4$OH | 1.5 | 16 | 3062 | 5104 | 0.20 | 4.22 | 21.0 |
| 4.10 | NEt$_4$OH | " | 11 | 2182 | 3193 | 0.13 | 3.45 | 18.0 |
| 4.11 | NEt$_4$OH | 1.5 | 13 | 2415 | 3916 | 0.24 | 5.32 | 26.8 |
| 4.12 | NEt$_4$OH | 2.0 | 13 | 3165 | 6126 | 0.27 | 5.34 | 26.8 |
| 4.13 | NEt$_4$OH | 2.5 | 12 | 3226 | 6244 | 0.18 | 3.95 | 21.2 |
| 4.14 | NEt$_4$OH | 3.0 | 22 | 2865 | 2605 | 0.00 | 1.20 | 6.8 |
| 4.15 | NEt$_4$OH | 4.0 | Precipitation occurred | | | | | |
| 4.16 | NEt$_4$OH | 2.0 H | 18 | 2769 | 1678 | 0.25 | 5.48 | 27.8 |
| 4.17 | NEt$_4$OH | 2.0 w Cr | 9 | 3157 | 2282 | 0.28 | 5.70 | 28.4 |

Ti(OiPr)$_4$ was dissolved in 2 eq. of oxalic acid solution, then base was added to partially neutralize the acid. The solution was then added to virgin HA30W and dried. Each catalyst contained 3.5 wt % Ti and was activated at 650° C. Runs were conducted at 105° C., 550 psig.
R: Ti was dissolved in base, then the acid was added.
H: A hydrogel was used in place of a pre-formed silica support.
Cr: Cr was added to the oxalic acid, rather than being on the catalyst initially.

Example 5: pH Adjustment with Urea

The next series of experiments studied the ability of urea to partially neutralize an acidic Ti-containing solution and create an STM capable of providing effective titanation to a catalyst. Urea is easily decomposed upon heating into volatile products. Replacement of carbon-containing catalyst components with urea compounds has the potential to reduce emissions of volatile organic and highly reactive volatile organic compounds created during calcination of the catalysts. The experimental approach was essentially identical to the method described in Example 4 but without the use of the bromocresol green indicator. The results are shown in Table 5. Addition of urea to the acidic Ti-containing solution provided increasingly effective titanation as the amount of urea was increased. This effect was not observed in experiments that investigated the use of urea in spray drying applications, possibly because the urea decomposed and/or evaporated during the spray drying operation. Effective titanation was also observed with N,N'-dimethyl urea, which is less volatile than urea.

TABLE 5

Oxalic Acid with Urea

| Run No. | Base | Urea/Ti | Ind. Time min | Prod. g/g | Activity g/g-h | MI dg/min | I10 dg/min | HLMI dg/min |
|---|---|---|---|---|---|---|---|---|
| 5.1 | Urea | 1:1 | 15 | 3804 | 4389 | 0.11 | 3.04 | 15.3 |
| 5.2 | Urea | 2:1 | 11 | 4519 | 3819 | 0.49 | 6.00 | 27.8 |
| 5.3 | Urea | 3:1 | 10 | 2553 | 4140 | 0.26 | 5.86 | 29.4 |
| 5.4 | Urea | 3:1 | 8 | 2370 | 3231 | 0.28 | 6.14 | 30.0 |
| 5.5 | Urea | 4:1 | 16 | 3423 | 4668 | 0.44 | 8.07 | 40.0 |
| 5.6 | N,N'-Dimethyl urea | 2:1 | 14 | 3712 | 5179 | 0.36 | 6.87 | 34.3 |

Ti(OiPr)$_4$ was dissolved in 2 eq of oxalic acid solution, then base was added to partially neutralize the acid. The solution was then added to virgin HA30W and dried.
Each catalyst contained 3.5 wt % Ti and was activated at 650° C.
Runs were conducted at 105° C., 550 psig.

Example 6: pH Adjustment with Alkanolamines

The next series of experiments studied the ability of alkanolamines to partially neutralize an acidic Ti-containing solution and create an STM capable of providing effective titanation to a catalyst. Ethanol amines and isopropanol amines were chosen because they generally exhibit low toxicity, have low cost, are readily available from multiple sources, and have less odor in contrast to most amines. The experimental approach was essentially identical to the method described in Example 5 and the results are shown in Table 6. The results were varied and bulkier amines appeared to perform best. Not wishing to be limited by theory, this could be a result of the lower volatility of the bulkier compounds and/or the lower permittivity of Ti ions resulting from the bulkier compounds. Dimethylaminoethanol (DMAE) provided a relatively high melt index, is low in cost, available from multiple suppliers, and has low odor. The catalyst of Run 6.11 was prepared by dissolving titania into two equivalents of aqueous oxalic acid, followed by addition of two equivalents of DMAE to form a solubilized Ti solution (STM) of the type disclosed herein. An HA30W support was impregnated with the STM to form a titanated support that was dried in vacuum conditions overnight at 100° C. The resultant dried titanated support was extracted with water prior to being calcined at 650° C. and subjected to polymerization experiments. The melt index data suggest that the catalyst had experienced extensive loss of Ti, presumably during the water extraction step. This observation indicates that the Ti may not have been attached thoroughly to the silica after drying at 100° C. and supports previous observations that attachment between Ti and silica occurs at least partly at temperatures greater than 150° C.

TABLE 6

Oxalic Acid with Alkanol Amines

| Run No. | Catalyst Base | OA/Ti | Base | Base/Ti | Ind. Time min | Prod. g/g | Activity g/g-h | MI dg/min | I10 dg/min | HLMI dg/min |
|---|---|---|---|---|---|---|---|---|---|---|
| 6.1 | HA30W | 2.0 | Ethanolamine | 2.0 | 10 | 3627 | 5062 | 0.29 | 5.9 | 30.7 |
| 6.2 | HA30W | 2.0 | Ethanolamine | 2.0 | 12 | 3621 | 3394 | 0.46 | 8.4 | 40.4 |
| 6.3 | HA30W | 1.5 | Ethanolamine | 1.35 | 10 | 3157 | 3105 | 0.21 | 4.6 | 22.7 |
| 6.4 | HA30W | 2.0 | Diethanolamine | 2.0 | 10 | 2977 | 3370 | 0.42 | 7.9 | 39.9 |
| 6.5 | HA30W | 2.0 | Triethanolamine | 2.0 | 12 | 3142 | 3928 | 0.30 | 6.2 | 31.0 |
| 6.6 | HA30W | 2.0 | DMAE | 2.0 | 13 | 4179 | 4179 | 0.64 | 10.7 | 52.1 |
| 6.7 | HA30W | 2.0 | DMAE | 2.0 | 13 | 3329 | 3504 | 0.45 | 8.4 | 41.2 |
| 6.8 | HA30W | 2.0 | DMAE | 3.0 | 8 | 3403 | 3646 | 0.33 | 6.8 | 34.1 |
| 6.9 | HA30W | 3.0 | DMAE | 3.0 | 8 | 3170 | 2291 | 0.26 | 5.7 | 28.9 |
| 6.10 | HA30W | 2.0 | DMAE | 3.0 | 6 | 2984 | 3197 | 0.19 | 4.9 | 25.6 |
| 6.11 | HA30W | 2.0 | DMAE * | 2.0 | 15 | 2467 | 1495 | 0.09 | 1.3 | 7.0 |
| 6.12 | 969MS | 2.0 | DMAE † | 2.0 | 10 | 3510 | 4213 | 0.73 | 13.2 | 66.2 |
| 6.13 | 969MS | 2.0 | DMAE ‡ | 2.0 | 9 | 3192 | 3547 | 1.12 | 18.1 | 84.1 |
| 6.14 | Evonik | 2.0 | DMAE | 2.0 | 10 | 2784 | 6425 | 0.66 | 12.4 | 61.1 |
| 6.15 | Evonik | 2.0 | DMAE | 2.0 | 14 | 2784 | 3212 | 0.97 | 16.4 | 79.6 |
| 6.16 | HA30W | 2.0 | Diglycolamine | 2.0 | 12 | 3015 | 3769 | 0.54 | 9.6 | 47.3 |
| 6.17 | HA30W | 2.0 | Methyl diethanolamine | 2.0 | 12 | 3255 | 3551 | 0.43 | 7.4 | 35.5 |
| 6.18 | HA30W | 2.0 | Isopropanol amine | 2.5 | 13 | 3418 | 4102 | 0.31 | 6.1 | 30.5 |
| 6.19 | HA30W | 2.0 | Diisopropanol amine | 2.0 | 13 | 3282 | 4102 | 0.38 | 7.0 | 34.7 |
| 6.20 | HA30W | 2.0 | Triisopropanol amine | 2.0 | 12 | 3091 | 3198 | 0.36 | 6.9 | 32.3 |
| 6.21 | HA30W | " | " | " | 10 | 2774 | 2484 | 0.46 | 8.1 | 38.2 |
| 6.22 | HA30W | 2.0 | Dimethyl isopropanolamine | 2.0 | 16 | 3080 | 3187 | 0.56 | 9.8 | 46.0 |

Ti(OiPr)$_4$ was dissolved in 2 eq of oxalic acid solution, then base was added to partially neutralize the acid.
The solution was then added to virgin HA30W and dried. Each catalyst contained 3.5 wt % Ti and was activated at 650° C.
Runs were conducted at 105° C., 550 psig.
* Dried at 100° C. and then washed with water before drying again.
† Dried at up to 650° C. in N$_2$.
‡ Dried at up to 650° C. in air.
OA: oxalic acid, DMAE: Dimethylaminoethanol Example 7: pH Adjustment with Other Amines The next series of experiments studied the ability of a variety of other amines to partially neutralize an acidic Ti-containing solution and create an STM capable of providing effective titanation to a catalyst. The experimental approach was essentially identical to the method described in Example 5 and the results are shown in Table 7. A general trend of higher performance from bulkier amines was observed but was sometimes compromised by a lack of solubility, e.g., 2-ethylhexylamine or DABCO. Bases capable of delocalizing a positive charge obtained upon protonation displayed very good performance; examples include DBU, creatine, and imidazole.

TABLE 7

Oxalic Acid with Other Amines

| Run No. | Base | Base/Ti | Ind. Time min | Prod. g/g | Activity g/g-h | MI dg/min | I10 dg/min | HLMI dg/min |
|---|---|---|---|---|---|---|---|---|
| 7.1 | Hydrazine | 2.00 | 12 | 3304 | 2643 | 0.00 | 2.3 | 12.4 |
| 7.2 | Hydroxylamine | 2.50 | 4 | 1638 | 1694 | 0.23 | 5.4 | 27.1 |
| 7.3 | Trimethylamine | 2.00 | 15 | 3143 | 4013 | 0.38 | 7.2 | 35.5 |
| 7.4 | Hexylamine | 2.00 | 9 | 3312 | 3896 | 0.54 | 8.2 | 45.1 |
| 7.5 | t-Butylamine + Ethanolamine | 1.0 + 1.0 | 10 | 3257 | 3832 | 0.45 | 5.0 | 38.0 |
| 7.6 | 2-Ethylhexylamine | 2.00 | | Precipitated | | | | |
| 7.7 | 2-Ethylhexylamine* | 2.00 | | Precipitated | | | | |
| 7.8 | Ethylenediamine | 0.40 | | Precipitated | | | | |
| 7.9 | Diethylene triamine | 2.00 | | Precipitated | | | | |
| 7.10 | Diethylene triamine | 0.50 | | Precipitated | | | | |
| 7.11 | Formamide | 2.00 | 13 | 2642 | 2366 | 0.15 | 3.7 | 18.8 |
| 7.12 | Methylformamide | 2.00 | 11 | 3294 | 4034 | 0.31 | 6.0 | 30.0 |
| 7.13 | Dimethylformamide | 2.00 | 11 | 3839 | 2992 | 0.59 | 11.4 | 43.6 |
| 7.14 | Acetamide | 2.00 | 14 | 3129 | 4941 | 0.39 | 6.7 | 32.8 |
| 7.15 | DBU | 2.00 | 7 | 3390 | 3632 | 0.56 | 10.0 | 48.1 |
| 7.16 | DABCO | 2.00 | | Precipitated | | | | |
| 7.17 | DABCO | 2.00 | | Precipitated | | | | |
| 7.18 | N-Methylaniline | 2.40 | 12 | 3044 | 3728 | 0.66 | 11.6 | 55.8 |

TABLE 7-continued

Oxalic Acid with Other Amines

| Run No. | Base | Base/Ti | Ind. Time min | Prod. g/g | Activity g/g-h | MI dg/min | I10 dg/min | HLMI dg/min |
|---|---|---|---|---|---|---|---|---|
| 7.19 | " | " | 17 | 1711 | 567 | 0.38 | 7.8 | 41.2 |
| 7.20 | Imidazole | 2.00 | 6 | 2785 | 2457 | 0.32 | 6.6 | 32.2 |
| 7.21 | Pyrazole | 2.00 | 9 | 3062 | 3467 | 0.21 | 4.6 | 22.5 |
| 7.22 | Glycine | 2.00 | 15 | 3150 | 3098 | 0.09 | 2.7 | 13.6 |
| 7.23 | Dimethylglycine | 2.00 | 10 | 3297 | 3243 | 0.18 | 4.2 | 21.5 |
| 7.24 | Arginine | 1.85 | 17 | 3244 | 3089 | 0.08 | 2.6 | 14.4 |
| 7.25 | " | " | 13 | 3142 | 2945 | | 2.3 | |
| 7.26 | Creatine | 2.00 | 6 | 2733 | 4316 | 0.47 | 8.5 | 42.2 |
| 7.27 | " | " | 5 | 3422 | 3366 | 0.34 | 6.9 | 35.0 |
| 7.28 | Melamine | 2.00 | | Precipitated | | | | |
| 7.29 | Uricil | 2.00 | | Precipitated | | | | |
| 7.30 | Cyanuric acid | 2.00 | | Precipitated | | | | |
| 7.31 | Methyl carbamate | 2.00 | 14 | 2930 | 2980 | 0.14 | 3.5 | 18.2 |
| 7.32 | Dimethyl carbamate | 2.00 | 14 | 3380 | 3219 | 0.26 | 5.3 | 25.7 |

Ti(OiPr)$_4$ was dissolved in 2 eq of oxalic acid solution, then base was added to partially neutralize the acid. This solution was then added to virgin HA30W and dried. Each catalyst contained 3.5 wt % Ti and was activated at 650° C. Runs were conducted at 105° C., 550 psig.
*Ethylhexylamine was added directly to the oxalic acid solution.

Example 8: pH Adjustment with Inorganic Bases

The next series of experiments studied the ability of inorganic bases to partially neutralize an acidic Ti-containing solution and create an STM capable of providing effective titanation to a catalyst. The experimental approach was essentially identical to the method described in Example 5 and the results are shown in Table 8. This approach was generally unsuccessful. Not wishing to be limited by theory, higher permittivity may have been an influence, but the presence of divalent or trivalent metal cations could have interfered with the delicate balance of surface charge between silica and titania. Runs 8.2 and 8.3 were partially successful and co-introduced equal amounts of Al ions with Ti ions. Three equivalents of oxalic acid were added to dissolve two equivalents of metal (1 Ti(OiPr)$_4$+1 Al(OH)$_3$) which is a lower acid/metal ratio than in most of the other experiments described herein. Run 8.3 included partial neutralization of the acid with tetraethylammonium hydroxide in an amount of 1.5 equivalents of base per Ti. This is a lower base/metal ratio than in most of the other experiments described herein but an increase in HLMI was observed. Not wishing to be limited by theory, coating titania onto alumina may be more facile than coating titania onto silica. Ti and Al are both metals and the chemical properties of the two are in many ways more similar than the chemical properties of Ti and Si.

TABLE 8

Oxalic Acid with Inorganic Bases

| Run No. | Description | Ind. Time min | Prod. g/g | Activity g/g-h | MI dg/min | I10 dg/min | HLMI dg/min |
|---|---|---|---|---|---|---|---|
| 8.1 | Ti + 2 OA + 1.2 Al(OH)$_3$ | 10 | 3333 | 2273 | 0.0 | 0.65 | 4.7 |
| 8.2 | Ti + 3 OA + Al(OH)$_3$ | 17 | 3286 | 2987 | 0.0 | 1.43 | 8.0 |
| 8.3 | Ti + 3 OA + Al(OH)$_3$ + 1.5 NEt$_4$OH | 12 | 3205 | 4274 | 0.0 | 2.04 | 11.2 |
| 8.4 | Ti + 2 OA + 1.4 Mg(OH)$_2$ | 12 | 3199 | 3047 | 0.0 | 0.80 | 5.1 |
| 8.5 | Ti + 2 OA + 1 Mg(OH)$_2$ | 12 | 3220 | 3645 | 0.0 | 1.04 | 6.1 |
| 8.6 | Ti + 2 OA + 0.4 ZnO | Not soluble | | | | | |

Ti(OiPr)$_4$ was dissolved in OA solution to which other metals were added. This solution was then added to virgin HA30W and dried. Each catalyst contained 3.5 wt % Ti and was activated at 650° C.
Runs were conducted at 105° C., 550 psig.
OA = oxalic acid

Example 9: Solvation of Ti by Other Acids

The next series of experiments studied the ability of carboxylic acids other than oxalic acid to be partially neutralized and create an STM capable of providing effective titanation to a catalyst. The experimental approach was essentially identical to the method described in Example 4 and the results are shown in Table 9. The experiments were generally less successful than experiments using oxalic acid. Several of the experiments added two equivalents of base per Ti, which was more than needed to obtain a pH value of 4.0 because the acids tested were weaker than oxalic acid. In other experiments, base was added until a green-hued endpoint of the bromocresol green indicator was reached, indicating a pH value of 4.0. An example of this method is Run 9.7 where the use of citric acid and tetramethylammonium hydroxide produced highly effective titanation as evidenced by an HLMI value of almost 30. Run 9.14 indicated that titanyl sulfate, in the absence of a carboxylic acid, could be partially neutralized by DMAE to produce moderately effective titanation.

titanium tetraisopropoxide was added to the water solution which caused it to immediately precipitate out as hydrous titania. The amount of titanium added was equivalent to 3.5 wt % Ti based on the weight of the dry Cr/silica. The amount of acid and peroxide used varied in each experiment, but these amounts are both listed in Table 10 as equivalents of acid or peroxide added per equivalent of titanium. The precipitated slurry was stirred until the titania dissolved into an orange or dark red solution (when $H_2O_2$ was present), usually after about 10 minutes. In cases when the titania did not readily dissolve, the stirring was allowed to continue for several hours before it was finally concluded that no soluble complex formed, and the experiment was terminated. These are some of the control runs in Table 10.

However, when a soluble complex did form, the next step was to add a nitrogen compound to the solution in some experiments, while in other experiments, no nitrogen compound was used. The nitrogen compound always dissolved into the titanium solution. Again, the amount of nitrogen compound is listed in Table 10 as equivalents of nitrogen compound per equivalent of titanium. Finally, the titanium

TABLE 9

Solvation of Ti by Other Acids and Partial Neutralization

| Run No. | Description | Ind. Time min | Prod. g/g | Activity g/g-h | MI dg/min | I10 dg/min | HLMI dg/min |
|---|---|---|---|---|---|---|---|
| 9.1 | Ti + 2 Maleic Acid + 2 NEt$_4$OH | | | Not dissolved | | | |
| 9.2 | Ti + 2 Lactic acid + 2 NEt$_4$OH | 9 | 3348 | 3720 | 0.05 | 2.2 | 12.1 |
| 9.3 | Ti + 2 Lactic Acid + 0.3 Ethanolamine, green endpoint | 12 | 3803 | 3406 | 0.02 | 1.8 | 10.1 |
| 9.4 | Ti + 1.5 NMe$_4$OH + 1.5 DMAE then 1 Malonic acid | | | Gelled | | | |
| 9.5 | Ti + 4 Malic acid + 1.6 Ethanolamine, green endpoint | 13 | 3112 | 2964 | 0.10 | 3.1 | 16.1 |
| 9.6 | Ti + 2 Citric acid + 2 NEt$_4$OH | 14 | 3218 | 3510 | 0.10 | 3.0 | 15.4 |
| 9.7 | Ti + 2.5 Citric acid + 1.66 NMe$_4$OH | 17 | 3280 | 4278 | 0.29 | 6.0 | 29.5 |
| 9.8 | Ti + 5 Glycolic acid + 1.6 Ethanolamine, green endpoint | 11 | 2930 | 2790 | 0.16 | 3.9 | 19.9 |
| 9.9 | Ti + 5 Glycolic acid + 1.6 Ethanolamine, green endpoint | 8 | 3270 | 2582 | 0.10 | 3.3 | 17.4 |
| 9.10 | 0.5 NMe$_4$OH + 1.5 DMAE, then Ti then 4.6 Glycolic acid | 9 | 4568 | 3754 | 0.21 | 4.9 | 24.1 |
| 9.11 | Ti + 3 Glyoxylic Acid + 3 NEt$_4$OH | 22 | 3284 | 2855 | 0.00 | 1.1 | 6.5 |
| 9.12 | Ti + HNO$_3$ + NH$_4$OH until ppt* | 15 | 3174 | 3662 | 0.01 | 0.7 | 4.9 |
| 9.13 | Ti + Dihydroxyfumaric acid | | | Not dissolved | | | |
| 9.14 | TiOSO$_4$ + DMAE | 10 | 3197 | 2863 | 0.022 | 1.7 | 9.8 |

An attempt was made to dissolve Ti(OiPr)$_4$ into various acidic solutions, followed by partial neutralization by base. This solution was then added to virgin HA30W and dried to yield 3.5 wt % Ti, followed by activation at 650° C.
*969MS
DMAE = dimethylaminoethanol

Example 10: Solvation of Ti with Peroxides

The catalysts listed in Table 10 (Inventive runs 10.1-10.43) were prepared much like those described previously herein, except that a peroxide (usually $H_2O_2$) was also added to the recipe, as a substitute for some or all of the amine or acid. In this way the amount of amine used, and in some runs the amount of acid used, could be lowered, which thus lowered expense and emissions and resulted in a polymer with a higher HLMI.

In these experiments, 30 g of a Cr/silica catalyst sold under the name HA30W by W.R. Grace was weighed out into a bowl. It had a surface area of about 500 m$^2$/g, a pore volume of about 1.6 mL/g, and it contained 1 wt % Cr. It was not pre-dried in any way. Into a 100 mL beaker was added 50 mL of deionized water, into which the organic acid was dissolved. A peroxide was then also added to the solution in the inventive runs, usually $H_2O_2$. Afterward, 6.65 mL of solution was added to the Cr/silica in the bowl, and it was stirred by hand for several minutes to make a consistent damp (but not wet) powder, that is, to incipient wetness. The bowl was then placed overnight in a vacuum oven set at 100° C. The next day, the dry catalyst powder was poured through a 40 mesh screen to break up any small soft clumps. A sample of the resultant titanium-containing catalyst was calcined for 3 hours in dry air at 650° C. It was then retrieved under dry nitrogen and stored for later use.

Control run 10.2 shows that although two equivalents of oxalic acid can dissolve titania, the HLMI obtained is better than one obtains from the Cr/silica catalyst in the absence of titania (Table 1, Run 1.12). In other words, the titanation was ineffective with just oxalic acid. Control 10.2 serves as a baseline for the other later experiments. Any HLMI greater than 5-7 represented an improvement in the efficiency of the titanation procedure.

Referring to Table 10, it was observed that the addition of peroxide caused titania to dissolve in many acids that could not dissolve Ti in the absence of peroxide. Some of these acids produced very high HLMI. But one can also see that even in cases where titania was soluble without peroxide, the addition of peroxide still greatly improved the HLMI from the catalyst. Further, in many experiments the amount of nitrogen compound used could be lowered, or in some cases the nitrogen compound could be entirely eliminated, when peroxide was added. Since the nitrogen compound causes undesirable emissions during calcination, this reduction is a great improvement.

In Table 11, various combinations of organic acids (and/or nitrogen compounds) were used in an effort to further reduce emission and maximize HLMI. In many of these experiments, the aforesaid ability of $H_2O_2$ to dissolve Ti, and reduce nitrogen compound or even acid ligands, has been further exploited. In these experiments (inventive 11.44 to 11.60) the catalysts were made exactly as previously described herein. That is, 30 g of Cr/silica was weighed into a bowl, and 50 mL of deionized water was measured into a 100 mL beaker. The acids were dissolved into the water, along with $H_2O_2$ when used. Then 6.65 mL of titanium tetraisopropoxide (3.5 wt % Ti based on Cr/silica weight) was added and it immediately precipitated out as hydrous titania. However, after brief stirring for about 10 min the Ti dissolved. Nitrogen compound was then added, if any, and the solution added to the dry catalyst to incipient wetness. Drying and calcination were accomplished as described above.

Only in inventive experiment 11.44 was the protocol slightly different. Here, 30 g of a silica was weighed into the bowl (rather that Cr/silica). The silica was EP30X from Philadelphia Quartz Corp., having a surface area of 300 $m^2/g$. Again 50 mL of deionized water was measured into a beaker, to which acids, $H_2O_2$ and 6.65 mL of titanium isopropoxide followed. After the Ti dissolved, 1.25 g of basic chromium acetate was also added to the solution. The silica was then impregnated with the solution as described above. It was dried and calcined as before. Note also that the acidic phenols can substitute for the organic acid to make effective ligands. Thus, several runs are shown with catechol and salicyl alcohol in place of the carboxylic acid.

In Table 11 there were some large acids that were found to be incapable of dissolving the titania until a minor amount of a smaller acid was also added. In inventive run 11.56, for example, catechol was ineffective until combined with a small amount of oxalic acid. Similarly salicylic acid, ineffective by itself, dissolved Ti and produced a high HLMI when one equivalent of oxalic acid was also added (inventive run 11.54). A similar result occurred with salicyl alcohol in inventive runs 11.52 and 11.53, phenylmalonic acid in run 11.51, diglycolic acid in run 11.49, iminodiacetic acid in run 11.48, and methylmalonic acid in run 11.46.

TABLE 10

Solvation of Titanium with Carboxylic Acid, Peroxide and Partial Neutralization

| Run No. | Comments | Catalyst g | Polymer g | Time min | Productivity g/g | Activity g/g/h | HLMI dg/min | I10 dg/min | MI dg/min | Shear HLMI/MI | Emission Potential |
|---|---|---|---|---|---|---|---|---|---|---|---|
| Control 1 | 1 Oxalic acid, not soluble | | | | | | | | | | −2.0 |
| Inventive 1 | 1 Oxalic acid + 7 H2O2 | 0.0499 | 151 | 66 | 3026 | 2751 | 14.1 | 2.79 | 0.085 | 166 | −2.0 |
| Control 2 | 2 Oxalic acid | 0.0582 | 163 | 0 | 2800 | 2560 | 6.9 | 1.20 | 0.010 | 722 | −4.0 |
| Inventive 2 | 2 Oxalic Acid + 22 H2O2 | 0.0671 | 212 | 109 | 3159 | 1739 | 12.3 | 2.36 | 0.059 | 208 | −4.0 |
| Inventive 3 | 2 Oxalic acid + 7 H2O2 + 2 DMF | 0.0876 | 244 | 81 | 2785 | 2063 | 39.9 | 7.39 | 0.487 | 82 | 8.0 |
| Inventive 4 | 2 Oxalic acid + 2 t-Butyl hydroperoxide | 0.0576 | 170 | 40 | 2951 | 4427 | 14.1 | 2.71 | 0.067 | 212 | 10.0 |
| Inventive 5 | 2 Oxalic acid + 7 H2O2 + 2 DMF | 0.0473 | 146 | 50 | 3087 | 3704 | 43.2 | 8.88 | 0.505 | 86 | 8.0 |
| Inventive 6 | 2 Oxalic acid + 7 H2O2 + 2 DMF + 1 NH4OH | 0.0651 | 214 | 100 | 3287 | 1972 | 34.1 | 7.05 | 0.422 | 81 | 8.0 |
| Control 3 | 2 Glycolic Acid, not soluble | | | | | | | | | | 0.0 |
| Inventive 7 | 2 Glycolic Acid + 7 H2O2 | 0.0611 | 171 | 0 | 2800 | 2950 | 14.5 | 3.00 | 0.121 | 120 | 0.0 |
| Inventive 8 | 2 Glycolic Acid + 15 H2O2 + 1 MeNH2 | 0.0814 | 226 | 49 | 2776 | 3400 | 23.2 | 4.77 | 0.196 | 118 | 4.0 |
| Inventive 9 | 2 Glycolic Acid + 7 H2O2 + 3 DMF | 0.0292 | 82 | 71 | 2808 | 2373 | 24.7 | 4.27 | 0.230 | 107 | 18.0 |
| Control 4 | 3 Glycolic Acid, not soluble | | | | | | | | | | 0.0 |
| Inventive 10 | 3 Glycolic Acid + 14 H2O2 | 0.0558 | 157 | 63 | 2814 | 2680 | 7.7 | 1.31 | 0.007 | 1097 | 0.0 |
| Inventive 11 | 3 Glycolic acid + 7 H2O2 + 1.3 DMAE | 0.0486 | 185 | 47 | 3807 | 4859 | 32.0 | 6.65 | 0.247 | 130 | 10.8 |
| Control 5 | 4 Glycolic Acid, insoluble in 1 day | | | | | | | | | | 0.0 |
| Control 6 | 4 Glycolic Acid after 4 days | 0.0723 | 224 | 56 | 3098 | 3320 | 5.7 | 0.97 | 0.006 | 946 | 0.0 |
| Inventive 12 | 4 Glycolic acid + 7 H2O2 + 1.6 Ethanolamine | 0.0669 | 196 | 63 | 2930 | 2790 | 19.9 | 3.90 | 0.161 | 124 | 8.0 |
| Inventive 13 | 4 Glycolic acid + 7 H2O2 + 1.6 Ethanolamine | 0.0948 | 310 | 76 | 3270 | 2582 | 17.4 | 3.31 | 0.105 | 166 | 8.0 |
| Control 7 | 2 Lactic acid, insoluble in 2 days | | | | | | | | | | 4.0 |

TABLE 10-continued

Solvation of Titanium with Carboxylic Acid, Peroxide and Partial Neutralization

| Run No. | Comments | Catalyst g | Polymer g | Time min | Productivity g/g | Activity g/g/h | HLMI dg/min | I10 dg/min | MI dg/min | Shear HLMI/MI | Emission Potential |
|---|---|---|---|---|---|---|---|---|---|---|---|
| Inventive 14 | 2 Lactic acid + 7 H2O2 | 0.0547 | 150 | 0 | 2744 | 1953 | 14.3 | 1.15 | 0.110 | 130 | 4.0 |
| Inventive 15 | 2 Lactic acid + 7 H2O2 + 2 H2NOH | 0.0470 | 123 | 86 | 2617 | 1826 | 21.7 | 4.17 | 0.155 | 140 | 6.0 |
| Inventive 16 | 2 Lactic acid + 7 H2O2 + 2 MeNH2 | 0.0430 | 141 | 52 | 3279 | 3784 | 30.7 | 8.27 | 0.384 | 80 | 12.0 |
| Inventive 17 | 2 Lactic acid + 7 H2O2 + 2 H2NOH | 0.0470 | 123 | 86 | 2617 | 1826 | 21.7 | 4.17 | 0.155 | 140 | 6.0 |
| Inventive 18 | 2 Lactic acid + 7 H2O2 + 3 DMF | 0.1086 | 221 | 71 | 2035 | 1720 | 86.2 | 17.19 | 1.293 | 67 | 22.0 |
| Control 8 | 3 Lactic acid | 0.0803 | 180 | #REF! | 2242 | 1933 | 6.7 | 1.10 | 0.009 | 741 | 6.0 |
| Inventive 19 | 3 Lactic acid + 7 H2O2 | 0.0506 | 176 | 49 | 3478 | 4259 | 28.5 | 5.96 | 0.300 | 95 | 6.0 |
| Inventive 20 | 3 Lactic acid + 7 H2O2 + 1.5 NH4OH | 0.0556 | 165 | 45 | 2968 | 3957 | 26.9 | 5.39 | 0.256 | 105 | 9.0 |
| Inventive 21 | 3 Lactic acid + 7 H2O2 + 1 DMAE | 0.0537 | 170 | 42 | 3166 | 4522 | 40.7 | 9.08 | 0.531 | 77 | 15.0 |
| Inventive 22 | 3 Lactic acid + 7 H2O2 + 2 DMF | 0.0576 | 192 | 99 | 3333 | 2020 | 68.5 | 13.89 | 0.983 | 70 | 18.0 |
| Control 9 | 2 Malic acid, not soluble in 2 days | | | | | | | | | | 2.0 |
| Inventive 23 | 2 Malic Acid + 7 H2O2 | 0.0928 | 240 | 58 | 2586 | 2675 | 12.5 | 2.33 | 0.100 | 125 | 2.0 |
| Control 10 | 2 Malonic acid, not soluble in 1 day | | | | | | | | | | 0.0 |
| Inventive 24 | 2 Malonic Acid + 7 H2O2 | 0.0347 | 96 | 39 | 2767 | 4256 | 9.3 | 1.76 | 0.018 | 520 | 0.0 |
| Control 11 | 3 Citric acid | 0.0459 | 132 | #REF! | 2877 | 3144 | 5.17 | 1.02 | 0.008 | 646 | 6.0 |
| Control 12 | 3 Citric Acid | 0.0521 | 120 | 53 | 2303 | 2607 | 4.30 | 0.48 | 0.008 | 538 | 6.0 |
| Inventive 25 | 3 Citric Acid + 7 H2O2 | 0.0594 | 171 | 43 | 2879 | 4017 | 11.5 | 2.17 | 0.032 | 364 | 6.0 |
| Control 13 | 3 Glyceric acid, not soluble in 2 days | | | | | | | | | | 3.0 |
| Inventive 26 | 1.2 Glyceric acid + 7 H2O2 | 0.0608 | 24 | 10 | 395 | 2368 | 15.7 | 2.90 | 0.099 | 158 | 1.2 |
| Inventive 27 | 1.2 Glyceric acid + 7 H2O2 | 0.0622 | 234 | 76 | 3762 | 2970 | 10.5 | 1.98 | 0.019 | 550 | 1.2 |
| Control 14 | 2 Tartaric acid | 0.0610 | 180 | 68 | 2950 | 2988 | 5.9 | 1.20 | 0.008 | 743 | −1.0 |
| Inventive 28 | 2 Tartaric acid + 14 H2O2 | 0.0206 | 58 | 94 | 2816 | 1797 | 7.4 | 1.27 | 0.009 | 818 | −1.0 |
| Control 15 | 2 Gluconic acid, not soluble | | | | | | | | | | 9.0 |
| Inventive 29 | 2 Gluconic acid + 7 H2O2 | 0.0482 | 137 | 41 | 2842 | 4159 | 10.9 | 2.02 | 0.029 | 379 | 9.0 |
| Inventive 30 | 2 Gluconic acid + 7 H2O2 + 5 NH3 | 0.0702 | 210 | 89 | 2991 | 2017 | 8.9 | 1.63 | 0.022 | 406 | −1.0 |
| Control 16 | 2 Mandelic Acid, not soluble in 2 days | | | | | | | | | | 16.0 |
| Inventive 31 | 2 Mandelic Acid + 7 H2O2 | 0.0698 | 13 | 10 | 186 | 1117 | 10.3 | 2.10 | 0.027 | 381 | 16.0 |
| Inventive 32 | 2 Mandelic Acid + 7 H2O2 | 0.0487 | 132 | 46 | 2710 | 3535 | 24.5 | 4.87 | 0.236 | 104 | 16.0 |
| Inventive 33 | 2 Mandelic Acid + 7 H2O2 + 9 NH3 | 0.0664 | 205 | 54 | 3087 | 3430 | 16.9 | 3.16 | 0.099 | 170 | 34.0 |
| Control 17 | 3 Mandelic Acid, not soluble in 2 days | | | | | | | | | | 24.0 |
| Inventive 34 | 3 Mandelic Acid + 7 H2O2 | 0.0279 | 108 | 43 | 3871 | 5401 | 42.1 | 8.96 | 0.505 | 83 | 24.0 |
| Control 18 | 2 (2,4-OH)Benzoic Acid, not soluble in 1 day | | | | | | | | | | 10.0 |
| Inventive 35 | 2 (2,4-OH)Benzoic Acid + 7 H2O2 | 0.0496 | 136 | 52 | 2742 | 3164 | 17.7 | 3.38 | 0.110 | 161 | 10.0 |
| Control 19 | 2 2,6-Pyridine dicarboxylic acid, not soluble in 1 day | | | | | | | | | | 10.0 |
| Inventive 36 | 2 2,6-Pyridine dicarboxylic acid + 7 H2O2 | 0.0540 | 176 | 51 | 3259 | 3834 | 55.2 | 12.38 | 0.759 | 73 | 10.0 |
| Control 20 | 2 Nitrilotriacetic acid, not soluble in 1 day | | | | | | | | | | 8.0 |
| Inventive 37 | 2 Nitrilotriacetic acid + 7 H2O2 + 5 NH4OH | 0.0683 | 230 | 80 | 3367 | 2526 | 9.9 | 1.74 | 0.022 | 452 | 18.0 |
| Control 21 | 2 α-OH Isobutyric Acid, not soluble | | | | | | | | | | 8.0 |
| Inventive 38 | 2 α-OH IsoButyric Acid + 7 H2O2 | 0.0375 | 119 | 57 | 3173 | 3340 | 10.9 | 2.15 | 0.064 | 170 | 8.0 |
| Inventive 39 | 2 α-OH IsoButyric Acid + 7 H2O2 | 0.0591 | 185 | 92 | 3130 | 2041 | 16.1 | 3.0 | 0.093 | 174 | 8.0 |

TABLE 10-continued

Solvation of Titanium with Carboxylic Acid, Peroxide and Partial Neutralization

| Run No. | Comments | Catalyst g | Polymer g | Time min | Productivity g/g | Activity g/g/h | HLMI dg/min | I10 dg/min | MI dg/min | Shear HLMI/MI | Emission Potential |
|---|---|---|---|---|---|---|---|---|---|---|---|
| Inventive 40 | 2 α-OH Isobutyric Acid + 14 H2O2 | 0.0692 | 128 | 34 | 1850 | 3264 | 21.5 | 4.32 | 0.185 | 116 | 8.0 |
| Control 22 | 3 α-OH Isobutyric acid, not soluble in 2 days | | | | | | | | | | 12.0 |
| Inventive 41 | 3 α-OH Isobutyric Acid + 7 H2O2 | 0.0596 | 189 | 54 | 3171 | 3523 | 47.1 | 10.35 | 0.618 | 76 | 12.0 |
| Inventive 42 | 3 α-OH Isobutyric Acid + 7 H2O2 | 0.0459 | 103 | 40 | 2244 | 3366 | 65.6 | 14.17 | 0.855 | 77 | 12.0 |
| Inventive 43 | 3 α-OH Isobutyric Acid + 7 H2O2 | 0.0392 | 117 | 51 | 2985 | 3511 | 62.1 | 12.94 | 0.824 | 75 | 12.0 |

The target titanium level was 3.5 wt % Ti. This is considered 1 eqivalent of Ti. An attempt was made to dissolve 1 equivalent of titania with the stated number of equivalents of carboxylic acid and with the stated number of equivalents H2O2 and/or base,
After the Ti solution was impregnated onto the silica, the resulting mixture was dried in a vacuum oven at 100° C. overnight, and then a portion of the catalyst was calcined in dry air at 650° C. for 3 h.
DMAE = dimethylamino ethanol,
DMF = dimethylformamide

TABLE 11

Solvation of Ti by Peroxide and Acids

| Run No. | Comments | Catalyst g | Polymer g | Time min | Productivity g/g | Activity g/g/h | HLMI dg/min | I10 dg/min | MI dg/min | Shear HLMI/MI | Emission Potential |
|---|---|---|---|---|---|---|---|---|---|---|---|
| Inventive 44 | 1 Oxalic acid + 2 α-OH Isobutyric Acid + 7 H2O2 | 0.0328 | 107 | 78 | 3262 | 2509 | 16.2 | 3.11 | 0.105 | 154 | 6.0 |
| Inventive 45 | 2 Lactic Acid + 1 Oxalic acid + 2 DMAE | 0.0627 | 185 | 44 | 2951 | 4023 | 38.7 | 8.06 | 0.441 | 88 | 20.0 |
| Control 23 | 2 Methylmalonic Acid + 7 H2O2, not soluble | | | | | | | | | | 4.0 |
| Inventive 46 | 2 Methylmalonic Acid + 1 Oxalic acid + 7 H2O2 | 0.0847 | 207 | 62 | 2444 | 2365 | 14.8 | 2.88 | 0.081 | 184 | 2.0 |
| Inventive 47 | 1 or 2 Iminodiacetic acid, not soluble | | | | | | | | | | 6.0 |
| Inventive 48 | 1 Iminodiacetic acid + 1 Oxalic acid + 7 H2O2 | 0.0473 | 128 | 47 | 2706 | 3455 | 16.4 | 3.23 | 0.106 | 155 | 1.0 |
| Control 24 | 2 Diglycolic acid + 14 H2O2, not soluble | | | | | | | | | | 2.0 |
| Inventive 49 | 2 Diglycolic acid + 14 H2O2 + 2 Oxalic acid | 0.0466 | 136 | 60 | 2918 | 2918 | 11.4 | 2.07 | 0.039 | 292 | −2.0 |
| Inventive 50 | 2 Phenyl Malonic acid + 14 H2O2, did not dissolve Ti | | | | | | | | | | 16.0 |
| Inventive 51 | 2 Phenyl Malonic acid + 1 Oxalic acid | 0.0617 | 185 | 58 | 2998 | 3102 | 17.0 | 3.35 | 0.114 | 149 | 14.0 |
| Control 25 | 3 Salicyl Alcohol + 7 H2O2 | 0.0597 | 160 | 99 | 2680 | 1624 | 3.5 | 0.52 | | | 24.0 |
| Inventive 52 | 1 Oxalic acid + 2 Salicyl alcohol + 7 H2O2 | 0.0586 | 188 | 43 | 3208 | 4477 | 10.6 | 1.81 | 0.021 | 511 | 14.0 |
| Inventive 53 | 2 Lactic acid + 7 H2O2 + 2 Salicyl alcohol | 0.052 | 148 | 53 | 2846 | 3222 | 12.4 | 2.37 | 0.058 | 213 | 20.0 |
| Inventive 54 | 1 Salicylic acid + 2 Oxalic acid | 0.0488 | 198 | 78 | 4057 | 3121 | 19.2 | 3.77 | 0.145 | 133 | 2.0 |
| Inventive 55 | 3 Catechol, not soluble | | | | | | | | | | 18.0 |
| Control 26 | 2 Catechol + 1 Lactic acid, not soluble | | | | | | | | | | 14.0 |
| Control 27 | 1 Catechol + 2 Lactic acid, not soluble | | | | | | | | | | 10.0 |
| Inventive 56 | 1 Catechol + 1.4 Oxalic acid | 0.0595 | 185 | 66 | 3109 | 2827 | 10.0 | 1.81 | 0.029 | 348 | 3.2 |
| Inventive 58 | 2 (HO—Me)2Butyric acid + 1 Oxalic acid + 7 H2O2 | 0.0340 | 107 | 39 | 3147 | 4842 | 22.4 | 4.47 | 0.245 | 91 | 12.0 |
| Inventive 59 | 2 (HO—Me)2Butyric acid + 1 Oxalic acid + 7 H2O2 + 1.7 DMAE | 0.0415 | 125 | 33 | 3012 | 5476 | 33.4 | 6.86 | 0.345 | 97 | 27.3 |

The target titanium level was 3.5 wt % Ti. This is considered 1 eqivalent of Ti. An attempt was made to dissolve 1 equivalent of titania with the stated number of equivalents of carboxylic acid and with the stated number of equivalents H2O2 and/or base,
After the Ti solution was impregnated onto the silica, the resulting mixture was dried in a vacuum oven at 100° C. overnight, and then a portion of the catalyst was calcined in dry air at 650° C. for 3 h.
DMAE = dimethylamino ethanol,
DMF = dimethylformamide Additional Disclosure—Part I The following enumerated aspects of the present disclosure are provided as non-limiting examples.

A first aspect, which is a method comprising a) contacting a solvent and a carboxylic acid to form an acidic mixture wherein a weight ratio of solvent to carboxylic acid in the acidic mixture is from about 1:1 to about 100:1; b) contacting a titanium-containing compound and the acidic mixture to form an acidic titanium mixture wherein an equivalent molar ratio of titanium-containing compound to carboxylic acid in the acidic titanium mixture is from about 1:1 to about 1:4; c) contacting a nitrogen-containing compound and the acidic titanium mixture to form a solubilized titanium mixture wherein an equivalent molar ratio of titanium-containing compound to nitrogen-containing compound in the solubilized titanium mixture is from about 1:1 to about 1:4 and a pH of the solubilized titanium mixture is less than about 5.5; and d) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

A second aspect which is the method of the first aspect further comprising e) calcining the pre-catalyst by heating the pre-catalyst to a temperature in a range of from about 400° C. to about 1000° C. and maintaining the temperature of the pre-catalyst in the range of from about 400° C. to about 1000° C. for a time period of from about 1 minute to about 24 hours to form a catalyst.

A third aspect which is the method of any of the first two aspects wherein the equivalent molar ratio of titanium-containing compound to carboxylic acid in the acidic titanium mixture is about 1:2 and the equivalent molar ratio of titanium-containing compound to nitrogen-containing compound in the solubilized titanium mixture is about 1:2.

A fourth aspect which is the method of any of the first three aspects wherein the pH of the solubilized titanium mixture is in a range of from about 3.5 to about 4.5.

A fifth aspect which is the method of any of the first four aspects wherein (c) comprises neutralizing the acidic titanium mixture and wherein the neutralizing is a partial neutralizing or a complete neutralizing.

A sixth aspect which is the method of any of the first five aspects wherein the nitrogen-containing compound has Structure 1, Structure 2, Structure 3, Structure 4, Structure 5, or Structure 6: where $R^1$, $R^2$, $R^3$, $R^9$, $R^{10}$ and $R^{11}$ are each independently hydrogen, a $C_1$ to $C_{12}$ organyl group, or a $C_6$ to $C_{12}$ aryl group; $R^4$ is a $C_1$ to $C_{12}$ organyl group or a $C_6$ to $C_{12}$ aryl group; $R^5$ and $R^6$ are each independently hydrogen, a $C_1$ to $C_6$ organyl group, or a $C_6$ to $C_{12}$ aryl group; $R^7$ and $R^8$ are each independently hydrogen or $CH_3$; $R^{12}$ is a branched $C_1$ to $C_6$ alkyl group, a cyclic $C_1$ to $C_6$ alkyl group, or a linear $C_1$ to $C_6$ alkyl group; x is an integer from 1 to 4, y is an integer from 1 to 12, and Z is oxygen or sulfur.

| $NR^1R^2R^3$ | $N(R^4)_xH_{(4-x)}OH$ | $NR^5R^6(CR^7R^8)_yOH$ |
|---|---|---|
| Structure 1 | Structure 2 | Structure 3 |
| $NR^9R^{10}OH$ | $Z=C(N(R^{11})_2)_2$ | $N(R^{12}OH)_3$ |
| Structure 4 | Structure 5 | Structure 6 |

A seventh aspect which is the method of any of the first six aspects wherein the nitrogen-containing compound comprises an alkanolamine, an amine, an ammonium hydroxide, a hydroxylamine, a urea, or a combination thereof.

An eighth aspect which is the method of any of the first seven aspects wherein the nitrogen-containing compound comprises acetamide, ammonia, ammonium hydroxide, tert-butyl amine, creatine, N,N'-dibutyl urea, diethanol amine, diisopropanol amine, dimethylaminoethanol, dimethyl carbamate, dimethyl formamide, dimethyl glycine, dimethylisopropanol amine, N,N'-dimethyl urea, ethanol amine, glycol amine, hexyl amine, hydroxyl amine, imidazole, isopropanol amine, N-methyl aniline, methyldiethanol amine, methyl formamide, pyrazole, tetraethylammonium hydroxide, tetramethylammonium hydroxide, triethanol amine, triisopropanol amine, trimethyl amine, urea, or a combination thereof.

A ninth aspect which is the method of any of the first eight aspects wherein the carboxylic acid comprises a $C_1$ to $C_{15}$ monocarboxylic acid, a $C_1$ to $C_{15}$ dicarboxylic acid, a $C_1$ to $C_{15}$ tricarboxylic acid, a $C_1$ to $C_{15}$ α-hydroxycarboxylic acid, or a combination thereof.

A tenth aspect which is the method of any of the first nine aspects wherein the carboxylic acid comprises acetic acid, citric acid, glycolic acid, oxalic acid, phosphonoacetic acid, or a combination thereof.

An eleventh aspect which is the method of any of the first ten aspects wherein the titanium-containing compound comprises a titanium hydroxide, a titanic acid, a titanyl sulfate, a titanium(IV) alkoxide, a titanyl acetylacetonate, a titanium (IV) halide, or a combination thereof.

A twelfth aspect which is the method of any of the first eleven aspects wherein the titanium-containing compound comprises titanium(IV) isopropoxide.

A thirteenth aspect which is the method of any of the first twelve aspects wherein (d) further comprises spray drying the solubilized titanium mixture onto the chromium-silica support.

A fourteenth aspect which is the method of any of the first thirteen aspects wherein the chromium-silica support is characterized by a surface area of from about 100 m²/gram to about 1000 m²/gram and a pore volume of from about 1.0 cm³/gram to about 2.5 cm³/gram.

A fifteenth aspect which is the method of any of the first fourteen aspects wherein an amount of chromium present in the catalyst ranges from about 0.01 wt. % to about 10 wt. % by total weight of the catalyst and an amount of titanium present in the catalyst ranges from about 0.01 wt. % to about 10 wt. % by total weight of the catalyst.

A sixteenth aspect which is the method of any of the first fifteen aspects wherein the solvent comprises an aqueous solvent, an alcohol, an organic solvent, or a combination thereof.

A seventeenth aspect which is a method of forming an ethylene polymer comprising contacting the catalyst formed by the method of the second aspect with an ethylene monomer under conditions suitable for formation of the ethylene polymer and recovering the ethylene polymer.

An eighteenth aspect which is the method of the seventeenth aspect wherein the ethylene polymer has a high load melt index (HLMI) that is from about 1.5 to about 15 times greater than the HLMI of an ethylene polymer prepared with an otherwise similar catalyst produced in the absence of a nitrogen-containing compound.

A nineteenth aspect which is a method of a) contacting a solvent and a carboxylic acid to form an acidic mixture wherein a weight ratio of solvent to carboxylic acid in the acidic mixture is from about 1:1 to about 100:1; b) contacting a titanium-containing compound and the acidic mixture to form an acidic titanium mixture wherein an equivalent molar ratio of titanium-containing compound to carboxylic acid in the acidic titanium mixture is from about 1:1 to about 1:4; c) contacting a nitrogen-containing compound and the acidic titanium mixture to form a solubilized titanium mixture wherein an equivalent molar ratio of titanium-containing compound to nitrogen-containing compound in the solubilized titanium mixture is from about 1:1 to about 1:4 and a pH of the solubilized titanium mixture is in a range of from about 3.5 to about 4.5; d) contacting a silica support comprising from about 0.1 wt. % to about 20 wt. % water and the solubilized titanium mixture to form a titanated support and drying the titanated support by heating to a temperature in a range of from about 50° C. to about 150° C. and maintaining the temperature in the range of from about 50° C. to about 150° C. for a time period of from about 30 minutes to about 6 hours to form a dried titanated support; and e) contacting, to form a pre-catalyst, a chromium-containing compound and at least one material selected from the group consisting of the silica support, the titanated support, and the dried titanated support.

A twentieth aspect which is the method of the nineteenth aspect further comprising: f) calcining the pre-catalyst by heating to a temperature in a range of from about 400° C. to about 1000° C. and maintaining the temperature in the range of from about 400° C. to about 1000° C. for a time period of from about 1 minute to about 24 hours to form a catalyst.

A twenty-first aspect which is the method of the nineteenth aspect wherein (c) comprises neutralizing the acidic titanium mixture and wherein the neutralizing is a partial neutralizing or a complete neutralizing.

A twenty-second aspect which is a method comprising: a) contacting a titanium-containing compound and a nitrogen-containing compound to form a basic mixture wherein an equivalent molar ratio of titanium-containing compound to nitrogen-containing compound in the basic mixture is from about 1:1 to about 1:4; b) contacting a solvent and a carboxylic acid to form an acidic mixture wherein a weight ratio of solvent to carboxylic acid in the acidic mixture is from about 1:1 to about 100:1; c) contacting the basic mixture and the acidic mixture to form a solubilized titanium mixture wherein an equivalent molar ratio of titanium-containing compound to carboxylic acid in the solubilized titanium mixture is from about 1:1 to about 1:4 and a pH of the solubilized titanium mixture is in a range of from about 3.5 to about 4.5; and d) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

A twenty-third aspect which is the method of the twenty-second aspect further comprising: e) calcining the pre-catalyst by heating the pre-catalyst to a temperature in a range of from about 400° C. to about 1000° C. and maintaining the temperature of the pre-catalyst in the range of from about 400° C. to about 1000° C. for a time period of from about 1 minute to about 24 hours to form a catalyst.

A twenty-fourth aspect which is a method comprising: a) contacting a titanium-containing compound and a nitrogen-containing compound to form a basic mixture wherein an equivalent molar ratio of titanium-containing compound to nitrogen-containing compound in the basic mixture is from about 1:1 to about 1:4; b) contacting a solvent and a carboxylic acid to form an acidic mixture wherein a weight ratio of solvent to carboxylic acid in the acidic mixture is from about 1:1 to about 100:1; c) contacting the basic mixture and the acidic mixture to form a solubilized titanium mixture wherein an equivalent molar ratio of titanium-containing compound to carboxylic acid in the solubilized titanium mixture is from about 1:1 to about 1:4 and a pH of the solubilized titanium mixture is in a range of from about 3.5 to about 4.5; d) contacting a silica support comprising from about 0.1 wt. % to about 20 wt. % water and the solubilized titanium mixture to form a titanated support and drying the titanated support by heating to a temperature in a range of from about 50° C. to about 150° C. and maintaining the temperature in the range of from about 50° C. to about 150° C. for a time period of from about 30 minutes to about 6 hours to form a dried titanated support; and e) contacting, to form a pre-catalyst, a chromium-containing compound and at least one material selected from the group consisting of the silica support, the titanated support, and the dried titanated support.

A twenty-fifth aspect which is the method of the twenty-fourth aspect further comprising: f) calcining the pre-catalyst by heating the pre-catalyst to a temperature in a range of from about 400° C. to about 1000° C. and maintaining the temperature of the pre-catalyst in the range of from about 400° C. to about 1000° C. for a time period of from about 1 minute to about 24 hours to form a catalyst.

A twenty-sixth aspect which is a pre-catalyst composition comprising: a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; c) a titanium-containing compound wherein an amount of titanium is in a range of from about 0.1 wt. % to about 20 wt. % based upon the amount of silica; d) a carboxylic acid wherein an equivalent molar ratio of titanium-containing compound to carboxylic acid is in a range of from about 1:1 to about 1:10; and e) a nitrogen-containing compound with a molecular formula containing at least one nitrogen atom wherein an equivalent molar ratio of titanium-containing compound to nitrogen-containing compound is in a range of from about 1:0.5 to about 1:10.

A twenty-seventh aspect which is the pre-catalyst composition of the twenty-sixth aspect wherein the carboxylic acid comprises a $C_1$ to $C_{15}$ monocarboxylic acid, a $C_1$ to $C_{15}$ dicarboxylic acid, a $C_1$ to $C_{15}$ tricarboxylic acid, a $C_1$ to $C_{15}$ α-hydroxycarboxylic acid, or a combination thereof.

A twenty-eighth aspect which is the pre-catalyst composition of either of the twenty-sixth or twenty-seventh aspects wherein the carboxylic acid comprises acetic acid, citric acid, glycolic acid, oxalic acid, phosphonoacetic acid, or a combination thereof.

A twenty-ninth aspect which is the pre-catalyst composition of any of the twenty-sixth through twenty-eighth aspects wherein the nitrogen-containing compound comprises an alkanolamine, an amide, an amine, an alkylamine, an ammonium hydroxide, an aniline, a hydroxylamine, a urea, or a combination thereof.

A thirtieth aspect which is the pre-catalyst composition of any of the twenty-sixth through twenty-ninth aspects wherein the nitrogen-containing compound comprises acetamide, acryl amide, allyl amine, ammonia, ammonium hydroxide, butyl amine, tert-butyl amine, N,N'-dibutyl urea, creatine, creatinine, diethanol amine, diethylhydroxy amine, diisopropanol amine, dimethylaminoethanol, dimethyl carbamate, dimethyl formamide, dimethyl glycine, dimethylisopropanol amine, N,N'-dimethyl urea, ethanol amine, ethyl amine, glycol amine, hexyl amine, hydroxyamine, imidazole, isopropanol amine, methacryl amide, methyl amine, N-methyl aniline, N-methyl-2-propanol amine, methyldiethanol amine, methyl formamide, propyl amine, 2-propanol amine, pyrazole, pyrrolidine, pyrrolidinone, succinimide, tetraethylammonium hydroxide, tetramethylammonium hydroxide, triethanol amine, triisopropanol amine, trimethyl amine, urea, 1,8-diazabicyclo[5.4.0]undec-7-ene, or a combination thereof.

A thirty-first aspect which is the pre-catalyst composition of any of the twenty-sixth through thirtieth aspects wherein the silica support further comprises alumina.

A thirty-second aspect which is the pre-catalyst composition of any of the twenty-sixth through thirty-first aspects wherein the silica support is characterized by a surface area of from about 100 $m^2$/gram to about 1000 $m^2$/gram and a pore volume of from about 1.0 $cm^3$/gram to about 2.5 $cm^3$/gram.

A thirty-third aspect which is the pre-catalyst composition of any of the twenty-sixth through thirty-second aspects wherein the silica support comprises a hydrated silica support.

A thirty-fourth aspect which is the pre-catalyst composition of any of the twenty-sixth through thirty-third aspects wherein the silica support comprises from about 1 wt. % to about 20 wt. % water based upon a total weight of the silica support.

A thirty-fifth aspect which is a pre-catalyst composition comprising: a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; and c) a titano-organic salt, wherein the titano-organic salt comprises titanium, a protonated nitrogen-containing compound and a carboxylate, and wherein: i) an amount of titanium is in a range of from about 0.1 wt. % to about 20 wt. % based upon the amount of silica; ii) an equivalent molar ratio of titanium to carboxylate is in a range of from about 1:1 to about 1:10; and iii) an equivalent molar ratio of titanium to protonated nitrogen-containing compound is in a range of from about 1:0.5 to about 1:10.

A thirty-sixth aspect which is the pre-catalyst composition of the thirty-fifth aspect wherein the protonated nitrogen-containing compound comprises a protonated alkanolamine, a protonated amide, a protonated amine, a protonated alkylamine, a protonated ammonium hydroxide, a protonated aniline, a protonated hydroxylamine, a protonated urea, or a combination thereof.

A thirty-seventh aspect which is the pre-catalyst composition of the thirty-fifth aspect wherein the protonated nitrogen-containing compound comprises protonated acetamide, protonated acryl amide, protonated allyl amine, ammonium, protonated ammonium hydroxide, protonated butyl amine, protonated tert-butyl amine, protonated N,N'-dibutyl urea, protonated creatine, protonated creatinine, protonated diethanol amine, protonated diethylhydroxy amine, protonated diisopropanol amine, protonated dimethylaminoethanol, protonated dimethyl carbamate, protonated dimethyl formamide, protonated dimethyl glycine, protonated dimethylisopropanol amine, protonated N,N'-dimethyl urea, protonated ethanol amine, protonated ethyl amine, protonated glycol amine, protonated hexyl amine, protonated hydroxyamine, protonated imidazole, protonated isopropanol amine, protonated methacryl amide, protonated methyl amine, protonated N-methyl aniline, protonated N-methyl-2-propanol amine, protonated methyldiethanol amine, protonated methyl formamide, protonated propyl amine, protonated 2-propanol amine, protonated pyrazole, protonated pyrrolidine, protonated pyrrolidinone, protonated succinimide, protonated tetraethylammonium hydroxide, protonated tetramethylammonium hydroxide, protonated triethanol amine, protonated triisopropanol amine, protonated trimethyl amine, protonated urea, protonated 1,8-diazabicyclo[5.4.0]undec-7-ene, or a combination thereof.

A thirty-eighth aspect which is the pre-catalyst composition of any of the thirty-fifth through thirty-seventh aspects wherein the carboxylate comprises a $C_1$ to $C_{15}$ monocarboxylate, a $C_1$ to $C_{15}$ dicarboxylate, a $C_1$ to $C_{15}$ tricarboxylate, a $C_1$ to $C_{15}$ α-hydroxycarboxylate, or a combination thereof.

A thirty-ninth aspect which is the pre-catalyst composition of any of the thirty-fifth through thirty-eighth aspects wherein the carboxylate comprises acetate, citrate, glycolate, oxalate, phosphonoacetate, or a combination thereof.

A fortieth aspect which is the pre-catalyst composition of any of the thirty-fifth through thirty-ninth aspects wherein the silica support further comprises alumina.

A forty-first aspect which is the pre-catalyst composition of any of the thirty-fifth through fortieth aspects wherein the silica support is characterized by a surface area of from about 100 $m^2$/gram to about 1000 $m^2$/gram and a pore volume of from about 1.0 $cm^3$/gram to about 2.5 $cm^3$/gram.

A forty-second aspect which is the pre-catalyst composition of any of the thirty-fifth through forty-first aspects wherein the silica support comprises a hydrated silica support.

A forty-third aspect which is the pre-catalyst composition of any of the thirty-fifth through forty-second aspects wherein the silica support comprises from about 1 wt. % to about 20 wt. % water based upon a total weight of the silica support.

A forty-fourth aspect which is a pre-catalyst composition comprising: a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; c) a titanium-containing compound wherein an amount of titanium is in a range of from about 0.01 wt. % to about 0.1 wt. % based upon the amount of silica; d) a carboxylic acid wherein an equivalent molar ratio of titanium-containing compound to carboxylic acid is in a range of from about 1:1 to about 1:10; and e) a nitrogen-containing compound with a molecular formula containing at least one nitrogen atom wherein an equivalent molar ratio of titanium-containing compound to nitrogen-containing compound is in a range of from about 1:0.5 to about 1:10.

A forty-fifth aspect which is a pre-catalyst composition prepared by a method comprising: a) contacting a solvent and a carboxylic acid to form an acidic mixture wherein a weight ratio of solvent to carboxylic acid in the acidic mixture is from about 1:1 to about 100:1; b) contacting a titanium-containing compound and the acidic mixture to form an acidic titanium mixture wherein an equivalent molar ratio of titanium-containing compound to carboxylic acid in the acidic titanium mixture is from about 1:1 to about 1:4; c) contacting a nitrogen-containing compound and the acidic titanium mixture to form a solubilized titanium mixture wherein an equivalent molar ratio of titanium-containing compound to nitrogen-containing compound in the solubilized titanium mixture is from about 1:1 to about 1:4 and a pH of the solubilized titanium mixture is less than about 5.5; and d) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form the pre-catalyst.

Additional Disclosure—Part II

The following enumerated aspects of the present disclosure are provided as non-limiting examples.

A first aspect which is a method comprising a) contacting a solvent, a carboxylic acid, and a peroxide-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4 and an equivalent molar ratio of titanium-containing compound to peroxide-containing compound in the solubilized titanium mixture is from about 1:1 to about 1:20; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

A second aspect which is the method of the first aspect wherein the peroxide-containing compound comprises hydrogen peroxide, di-tert-butyl peroxide, benzoyl peroxide, dicumyl peroxide, cumene hydroperoxide, tert-butyl hydroperoxide, phthaloyl peroxide or a combination thereof.

A third aspect which is the method of any of the first through second aspects wherein the carboxylic acid comprises a $C_1$ to $C_{15}$ monocarboxylic acid, a $C_1$ to $C_{15}$ dicarboxylic acid, a $C_3$ to $C_{15}$ tricarboxylic acid, a $C_1$ to $C_{15}$ α-hydroxycarboxylic acid, or a combination thereof.

A fourth aspect which is the method of any of the first through third aspects wherein the carboxylic acid comprises acetic acid, citric acid, gluconic acid, glycolic acid, glyoxylic acid, lactic acid, malic acid, malonic acid, oxalic acid, phosphonoacetic acid, tartaric acid, glyceric acid, gluconic acid, mandelic acid, 2,4-hydroxybenzoic acid, 2,6-pyridine dicarboxylic acid, nitrotriacetic acid, α-hydroxyisobutyric acid, methylmalonic acid, phenyl malonic acid, digluconic acid, iminodiacetic acid, hydoxymethyl-2-butyric acid, or a combination thereof.

A fifth aspect which is a method comprising a) contacting a solvent, a carboxylic acid, a nitrogen-containing compound, and a peroxide-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4 and an equivalent molar ratio of titanium-containing compound to peroxide-containing compound in the solubilized titanium mixture is from about 1:1 to about 1:20; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

A sixth aspect which is the method of the fifth aspect wherein the carboxylic acid comprises a $C_1$ to $C_{15}$ monocarboxylic acid, a $C_1$ to $C_{15}$ dicarboxylic acid, a $C_3$ to $C_{15}$ tricarboxylic acid, a $C_1$ to $C_{15}$ α-hydroxycarboxylic acid, or a combination thereof.

A seventh aspect which is the method of any of the fifth through sixth aspects wherein the carboxylic acid comprises acetic acid, citric acid, gluconic acid, glycolic acid, glyoxylic acid, lactic acid, malic acid, malonic acid, oxalic acid, phosphonoacetic acid, tartaric acid, glyceric acid, gluconic acid, mandelic acid, 2,4-hydroxybenzoic acid, 2,6-pyridine dicarboxylic acid, nitrotriacetic acid, α-hydroxyisobutyric acid, methylmalonic acid, phenyl malonic acid, digluconic acid, iminodiacetic acid, hydoxymethyl-2-butyric acid, or a combination thereof.

An eighth aspect which is the method of any of the fifth through seventh aspects wherein the nitrogen-containing compound comprises an alkanolamine, an amide, an amine, an alkylamine, an ammonium hydroxide, an aniline, a hydroxylamine, a urea, or a combination thereof.

A ninth aspect which is the method of any of the fifth through eighth aspects wherein the peroxide-containing compound comprises organic peroxides, diacyl peroxides, peroxydicarbonates, monoperoxycarbonates, peroxyketals, peroxyesters, dialkyl peroxides, hydroperoxides or a combination thereof.

A tenth aspect which is the method of any of the fifth through ninth aspects wherein the peroxide-containing compound comprises hydrogen peroxide, di-tert-butyl peroxide, benzoyl peroxide, dicumyl peroxide, cumene hydroperoxide, tert-butyl hydroperoxide, phthaloyl peroxide or a combination thereof.

An eleventh aspect which is a method comprising a) contacting a solvent, at least two carboxylic acids and a peroxide-containing compound to form an acidic mixture wherein a weight ratio of solvent to carboxylic acid in the acidic mixture is from about 1:1 to about 100:1 and wherein the at least two carboxylic acids comprises at least one simple carboxylic acid and at least one complex carboxylic acid; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4 and an equivalent molar ratio of titanium-containing compound to peroxide-containing compound in the solubilized titanium mixture is from about 1:1 to about 1:20; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

A twelfth aspect which is the method of the eleventh aspect wherein the at least two carboxylic acids comprise a $C_1$ to $C_{15}$ monocarboxylic acid, a $C_1$ to $C_{15}$ dicarboxylic acid, a $C_3$ to $C_{15}$ tricarboxylic acid, a $C_1$ to $C_{15}$ α-hydroxycarboxylic acid, or a combination thereof.

A thirteenth aspect which is the method of any of the eleventh through twelfth aspects wherein the at least two carboxylic acids comprise, citric acid, gluconic acid, glycolic acid, glyoxylic acid, lactic acid, malic acid, malonic acid, oxalic acid, phosphonoacetic acid, tartaric acid, glyceric acid, gluconic acid, mandelic acid, 2,4-hydroxybenzoic acid, 2,6-pyridine dicarboxylic acid, nitrotriacetic acid, α-hydroxyisobutyric acid, methylmalonic acid, phenyl malonic acid, digluconic acid, iminodiacetic acid, hydoxymethyl-2-butyric acid, or a combination thereof.

A fourteenth aspect which is the method of any of the eleventh through thirteenth aspects wherein the peroxide-containing compound comprises organic peroxides, diacyl peroxides, peroxydicarbonates, monoperoxycarbonates, peroxyketals, peroxyesters, dialkyl peroxides, hydroperoxides or a combination thereof.

A fifteenth aspect which is the method of any of the eleventh through fourteenth aspects wherein the peroxide-containing compound comprises hydrogen peroxide, di-tert-butyl peroxide, benzoyl peroxide, dicumyl peroxide, cumene hydroperoxide, tert-butyl hydroperoxide, phthaloyl peroxide or a combination thereof.

A sixteenth aspect which is a method comprising a) contacting a solvent, at least two carboxylic acids and a nitrogen-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

A seventeenth aspect which is a method comprising a) contacting a solvent, at least two carboxylic acids, a nitrogen-containing compound and a peroxide-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4 and an equivalent molar ratio of titanium-containing compound to peroxide-containing compound in the solubilized titanium mixture is from about 1:1 to about 1:20; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

An eighteenth aspect which is a method comprising a) contacting a solvent, a carboxylic acid, an acidic phenol and a peroxide-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4, wherein an equivalent molar ratio of titanium-containing compound to acidic phenol in the solubilized titanium mixture is from about 1: to about 1:5; and wherein an equivalent molar ratio of titanium-containing compound to peroxide-containing compound in the solubilized titanium mixture is from about 1:1 to about 1:20; and c) contacting a chromium-silica support comprising from about 0.1 wt. % to about 20 wt. % water and the solubilized titanium mixture to form an addition product and drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

A nineteenth aspect which is the method of the eighteenth aspect wherein the acidic phenol comprises catechol, salicyl alcohol, salicylic acid, phthalic acid, or any combination thereof.

A twentieth aspect which is a method comprising a) contacting a solvent, a carboxylic acid, an acidic phenol and a peroxide-containing compound to form an acidic mixture wherein a weight ratio of solvent to carboxylic acid in the acidic mixture is from about 1:1 to about 100:1; b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4, wherein an equivalent molar ratio of titanium-containing compound to acidic phenol in the solubilized titanium mixture is from about 1: to about 1:5; and wherein an equivalent molar ratio of titanium-containing compound to peroxide-containing compound in the solubilized titanium mixture is from about 1:1 to about 1:20; c) contacting the solubilized titanium mixture with a chromium-containing compound to form a chromium titanium mixture; d) contacting the chromium titanium mixture with a silica support comprising silica wherein an amount of silica is in a range of from about 70 wt. % to about 95 wt. % based upon a total weight of the silica support to form an addition product; and e) drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

A twenty-first aspect which is a method comprising a) preparing an acidic mixture comprising a solvent and at least two components selected from the group consisting of one or more carboxylic acids, one or more acidic phenols, one or more peroxide-containing compounds and one or more nitrogen-containing compounds wherein a weight ratio of solvent to carboxylic acid in the acidic mixture is from about 1:1 to about 100:1; b) contacting the acidic mixture with a chromium-containing compound, a titanium-containing compound and a silica support to form an addition product wherein: (i) an equivalent molar ratio of titanium-containing compound to carboxylic acid, when present in the acidic mixture, is from about 1:1 to about 1:4, (ii) an equivalent molar ratio of titanium-containing compound to acidic phenol, when present in the acidic mixture, is from about 1: to about 1:5, and (iii) an equivalent molar ratio of titanium-containing compound to peroxide-containing compound, when present in the acidic mixture, is from about 1:1 to about 1:20; and c) drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

A twenty-second aspect which is a composition comprising a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; c) a titanium-containing compound wherein an amount of titanium is in a range of from about 0.1 wt. % to about 20 wt. % based upon the amount of silica; d) a carboxylic acid wherein an equivalent molar ratio of titanium-containing compound to carboxylic acid is in a range of from about 1:1 to about 1:10; and e) a peroxide-containing compound wherein an equivalent molar ratio of titanium-containing compound to peroxide-containing compound is in a range of from about 1:1 to about 1:20.

A twenty-third aspect which is the composition of the twenty-second aspect further comprising a nitrogen-containing compound wherein an equivalent molar ratio of titanium-containing compound to nitrogen-containing compound is in a range of from about 1:0.5 to about 1:10.

A twenty-fourth aspect which is the composition of any of the twenty-second through twenty-third aspects wherein the carboxylic acid comprises a $C_1$ to $C_{15}$ monocarboxylic acid, a $C_1$ to $C_{15}$ dicarboxylic acid, a $C_3$ to $C_{15}$ tricarboxylic acid, a $C_1$ to $C_{15}$ α-hydroxycarboxylic acid, or a combination thereof.

A twenty-fifth aspect which is the composition of any of the twenty-second through twenty-fourth aspects wherein the carboxylic acid comprises, citric acid, gluconic acid, glycolic acid, glyoxylic acid, lactic acid, malic acid, malonic acid, oxalic acid, phosphonoacetic acid, tartaric acid, glyceric acid, gluconic acid, mandelic acid, 2,4-hydroxybenzoic acid, 2,6-pyridine dicarboxylic acid, nitrotriacetic acid, α-hydroxyisobutyric acid, methylmalonic acid, phenyl malonic acid, digluconic acid, iminodiacetic acid, hydoxymethyl-2-butyric acid, or a combination thereof.

A twenty-sixth aspect which is the composition of any of the twenty-third through twenty-fifth aspects wherein the nitrogen-containing compound comprises an alkanolamine, an amide, an amine, an alkylamine, an ammonium hydroxide, an aniline, a hydroxylamine, a urea, or a combination thereof.

A twenty-seventh aspect which is the composition of any of the twenty-second through twenty-sixth aspects wherein the peroxide-containing compound comprises organic peroxides, diacyl peroxides, peroxydicarbonates, monoperoxycarbonates, peroxyketals, peroxyesters, dialkyl peroxides, hydroperoxides or a combination thereof.

A twenty-eighth aspect which is the composition of any of the twenty-second through twenty-seventh aspects wherein the peroxide-containing compound comprises hydrogen peroxide, di-tert-butyl peroxide, benzoyl peroxide, dicumyl peroxide, cumene hydroperoxide, tert-butyl hydroperoxide, phthaloyl peroxide or a combination thereof.

A twenty-ninth aspect which is the composition of any of the twenty-second through twenty-eighth aspects further comprising an acidic phenol.

A thirtieth aspect which is a composition comprising a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; and c) a titano-organic salt, wherein the titano-organic salt comprises titanium, a carboxylate, and a peroxide-containing compound and wherein the titano-organic salt comprises i) an amount of titanium is in a range of from about 0.1 wt. % to about 20 wt. % based upon the amount of silica; ii) an equivalent molar ratio of titanium to carboxylate is in a range of from about 1:1 to about 1:10; and iii) an equivalent molar ratio of titanium to peroxide-containing compound is in a range of from about 1:0.5 to about 1:20.

A thirty-first aspect which is the composition of the thirtieth aspect further comprising a nitrogen-containing compound wherein an equivalent molar ratio of titanium-containing compound to nitrogen-containing compound is in a range of from about 1:0.5 to about 1:5.

A thirty-second aspect which is the composition of any of the thirtieth through thirty-first aspects wherein the peroxide-containing compound comprises hydrogen peroxide, di-tert-butyl peroxide, benzoyl peroxide, dicumyl peroxide, cumene hydroperoxide, tert-butyl hydroperoxide, phthaloyl peroxide or a combination thereof.

A thirty-third aspect which is the composition of any of the thirtieth through thirty-second aspects wherein the carboxylate comprises acetate, citrate, gluconate, glycolate, glyoxylate, lactate, malate, malonate, oxalate, phosphonoacetate, tartrate, or a combination thereof.

A thirty-fourth aspect which is a composition comprising a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; c) a titanium-containing compound wherein an amount of titanium is in a range of from about 0.01 wt. % to about 0.1 wt. % based upon the amount of silica; d) at least two carboxylic acids wherein an equivalent molar ratio of titanium-containing compound to carboxylic acids is in a range of from about 1:1 to about 1:10; and e) a peroxide-containing compound wherein an equivalent molar ratio of titanium-containing compound to peroxide-containing compounds is in a range of from about 1:1 to about 1:10.

A thirty-fifth aspect which is the composition of the thirty-fourth aspect wherein the at least two carboxylic acids comprise at least one simple carboxylic acid and at least one complex carboxylic acid.

A thirty-sixth aspect which is the composition of the thirty-fourth through thirty-fifth aspects wherein the peroxide containing compound comprises hydrogen peroxide, tert-butyl peroxide or a combination thereof.

A thirty-seventh aspect which is he composition of the thirty-fourth through thirty-sixth aspects further comprising an acidic phenol.

A thirty-eighth aspect which is the composition of any of the thirty-fourth through thirty-seventh aspects further comprising a nitrogen-containing compound wherein an equivalent molar ratio of titanium-containing compound to nitrogen-containing compound is in a range of from about 1:0.5 to about 1:10.

A thirty-ninth aspect which is a composition comprising a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; c) a titano-organic salt, wherein the titano-organic salt comprises titanium, a protonated nitrogen-containing compound and a carboxylate, and wherein the titano-organic salt comprises: i) an amount of titanium is in a range of from about 0.1 wt. % to about 20 wt. % based upon the amount of silica; ii) an equivalent molar ratio of titanium to carboxylate is in a range of from about 1:1 to about 1:10; and iii) an equivalent molar ratio of titanium to protonated nitrogen-containing compound is in a range of from about 1:0.5 to about 1:10; and d) a peroxide-containing compound wherein an equivalent molar ratio of titanium-containing compound to peroxide-containing compound is from about 1:1 to about 1:20.

A fortieth aspect which is a composition comprising a) a silica support comprising silica wherein an amount of silica is in a range of from about 70 wt. % to about 95 wt. % based upon a total weight of the silica support; b) a chromium-containing compound wherein an amount of chromium is in a range of from about 0.1 wt. % to about 5 wt. % based upon the amount of silica; and c) a titano-organic salt, wherein the titano-organic salt comprises titanium, a protonated nitrogen-containing compound and a carboxylate, and wherein the titano-organic salt comprises i) an amount of titanium is in a range of from about 0.1 wt. % to about 20 wt. % based upon the amount of silica; ii) an equivalent molar ratio of titanium to carboxylate is in a range of from about 1:1 to about 1:10; and iii) an equivalent molar ratio of titanium to protonated nitrogen-containing compound is in a range of from about 1:0.5 to about 1:10; and d) an acidic phenol wherein an equivalent molar ratio of titanium-containing compound to acidic phenol in the acidic titanium mixture is from about 1:1 to about 1:5.

A forty-first aspect which is a composition comprising a) at least two components selected from the group consisting of one or more carboxylic acids, one or more acidic phenols, one or more peroxide-containing compounds and one or more nitrogen-containing compounds; b) a chromium-containing compound wherein an amount of chromium is in a range of from about 0.1 wt. % to about 5 wt. % based upon the amount of silica; c) a titanium-containing compound wherein an amount of titanium is in a range of from about 0.01 wt. % to about 0.1 wt. % based upon the amount of silica; and (i) wherein an equivalent molar ratio of titanium-containing compound to carboxylic acid, when present, is in a range of from about 1:1 to about 1:10; (ii) wherein an equivalent molar ratio of titanium-containing compound to peroxide-containing compound, when present, is in a range of from about 1:1 to about 1:10; (iii) wherein an equivalent molar ratio of titanium-containing compound to acidic phenol, when present, in the acidic titanium mixture is from about 1:1 to about 1:5; and (iv) wherein an equivalent molar ratio of titanium-containing compound to nitrogen-containing compound, when present, is in a range of from about 1:0.5 to about 1:5.

A forty-second aspect which is a catalyst prepared according to the method of the first aspect wherein the method further comprises heating the pre-catalyst in the presence of air to a temperature in a range of from about 400° C. to about 1000° C. to form an olefin polymerization catalyst.

A forty-third aspect which is a catalyst prepared according to the method of the fifth aspect, wherein the method further comprises heating the pre-catalyst in the presence of air to a temperature in a range of from about 400° C. to about 1000° C. to form an olefin polymerization catalyst.

A forty-fourth aspect which is a catalyst prepared according to the method of the eleventh aspect, wherein the method further comprises heating the pre-catalyst in the presence of air to a temperature in a range of from about 400° C. to about 1000° C. to form an olefin polymerization catalyst.

A forty-fifth aspect which is a catalyst prepared according to the method of the sixteenth aspect, wherein the method further comprises heating the pre-catalyst in the presence of air to a temperature in a range of from about 400° C. to about 1000° C. to form an olefin polymerization catalyst.

A forty-sixth aspect which is a catalyst prepared according to the method of the seventeenth aspect, wherein the method further comprises heating the pre-catalyst in the presence of air to a temperature in a range of from about 400° C. to about 1000° C. to form an olefin polymerization catalyst.

A forty-seventh aspect which is a catalyst prepared according to the method of the eighteenth aspect, wherein the method further comprises heating the pre-catalyst in the presence of air to a temperature in a range of from about 400° C. to about 1000° C. to form an olefin polymerization catalyst.

A forty-eight aspect which is a catalyst prepared according to the method of the twentieth aspect, wherein the method further comprises heating the pre-catalyst in the presence of air to a temperature in a range of from about 400° C. to about 1000° C. to form an olefin polymerization catalyst.

A forty-ninth aspect which is a catalyst prepared according to the method of the twenty-first aspect, wherein the method further comprises heating the pre-catalyst in the presence of air to a temperature in a range of from about 400° C. to about 1000° C. to form an olefin polymerization catalyst.

The terms "a", "an", and "the" are intended, unless specifically indicated otherwise, to include plural alternatives, e.g., at least one. Herein, while methods and processes are described in terms of "comprising" various components or steps, the methods and processes can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an aspect of the present disclosure whether or not the statement is explicitly recited.

While various aspects of the present disclosure have been shown and described, modifications thereof can be made by one skilled in the art without departing from the spirit and teachings of the present disclosure. The aspects of the present disclosure described herein are exemplary only, and are not intended to be limiting. Many variations and modifications of the present disclosure are possible and are within the scope of the present disclosure. Where numerical ranges or limitations are expressly stated, such express ranges or limitations should be understood to include iterative ranges or limitations of like magnitude falling within the expressly stated ranges or limitations (e.g., "from about 1 to about 10" includes, 2, 3, 4, etc.; "greater than 0.10" includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as "comprises", "includes", "having, etc. should be understood to provide support for narrower terms such as "consisting of", "consisting essentially of", "comprised substantially of", etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspects of the present disclosure. The discussion of a reference in the present disclosure is not an admission that it is prior art to the present disclosure, especially any reference that may have a publication date after the priority date of this application. The present disclosure of all patents, patent applications, and publications cited herein are hereby incorporated by reference, to the extent that they provide exemplary, procedural or other details supplementary to those set forth herein.

All publications, patent applications, and patents mentioned herein are incorporated by reference in their entirety. In the event of conflict, the present specification, including definitions, is intended to control. With respect to all ranges disclosed herein, such ranges are intended to include any combination of the mentioned upper and lower limits even if the particular combination is not specifically listed.

What is claimed is:

1. A method comprising:
   a) contacting a solvent, at least two carboxylic acids and a nitrogen-containing compound to form an acidic mixture wherein a weight ratio of solvent to carboxylic acid in the acidic mixture is from about 1:1 to about 100:1;
   b) contacting a titanium-containing compound and the acidic mixture to form a solubilized titanium mixture wherein an equivalent molar ratio of titanium-containing compound to at least two carboxylic acids in the solubilized titanium mixture is from about 1:1 to about 1:4;
   c) contacting a chromium-silica support comprising from about 0.1 wt. % to about 20 wt. % water and the solubilized titanium mixture to form an addition product; and
   d) drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

2. The method of claim 1 wherein the at least two carboxylic acids comprise acetic acid, citric acid, gluconic acid, glycolic acid, glyoxylic acid, lactic acid, malic acid, malonic acid, oxalic acid, phosphonoacetic acid, tartaric acid, glyceric acid, gluconic acid, mandelic acid, 2,4-hydroxybenzoic acid, 2,6-pyridine dicarboxylic acid, nitrotriacetic acid, α-hydroxyisobutyric acid, methylmalonic acid, phenyl malonic acid, digluconic acid, iminodiacetic acid, hydoxymethyl-2-butyric acid, or a combination thereof.

3. The method of claim 1 wherein the nitrogen-containing compound comprises an alkanolamine, an amide, an amine, an alkylamine, an ammonium hydroxide, an aniline, a hydroxylamine, a urea, or a combination thereof.

4. The method of claim 1 wherein the solvent comprises an aqueous solvent, an alcohol, an organic solvent, a hydrocarbon, or a combination thereof.

5. A method comprising:
   a) contacting a solvent, at least two carboxylic acids, a nitrogen-containing compound and a peroxide-containing compound to form an acidic mixture wherein a weight ratio of solvent to at least two carboxylic acids in the acidic mixture is from about 1:1 to about 100:1;
   b) contacting a titanium-containing compound and the acidic mixture to form a solubilized titanium mixture wherein an equivalent molar ratio of titanium-containing compound to at least two carboxylic acids in the solubilized titanium mixture is from about 1:1 to about 1:4 and an equivalent molar ratio of titanium-containing compound to peroxide-containing compound in the solubilized titanium mixture is from about 1:1 to about 1:20;
   c) contacting a chromium-silica support comprising from about 0.1 wt. % to about 20 wt. % water and the solubilized titanium mixture to form an addition product; and
   d) drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

6. The method of claim 5 wherein the peroxide-containing compound comprises organic peroxides, diacyl peroxides, peroxydicarbonates, monoperoxycarbonates, peroxyketals, peroxyesters, dialkyl peroxides, hydroperoxides or a combination thereof.

7. The method of claim 5 wherein the peroxide-containing compound comprises hydrogen peroxide, di-tert-butyl peroxide, benzoyl peroxide, dicumyl peroxide, cumene hydroperoxide, tert-butyl hydroperoxide, phthaloyl peroxide or a combination thereof.

8. The method of claim 5 wherein the at least two carboxylic acids comprise acetic acid, citric acid, gluconic acid, glycolic acid, glyoxylic acid, lactic acid, malic acid, malonic acid, oxalic acid, phosphonoacetic acid, tartaric acid, glyceric acid, gluconic acid, mandelic acid, 2,4-hydroxybenzoic acid, 2,6-pyridine dicarboxylic acid, nitrotriacetic acid, α-hydroxyisobutyric acid, methylmalonic acid, phenyl malonic acid, digluconic acid, iminodiacetic acid, hydoxymethyl-2-butyric acid, or a combination thereof.

9. The method of claim 5 wherein the nitrogen-containing compound comprises an alkanolamine, an amide, an amine, an alkylamine, an ammonium hydroxide, an aniline, a hydroxylamine, a urea, or a combination thereof.

10. A method comprising:
    a) contacting a solvent, a carboxylic acid, an acidic phenol and a peroxide-containing compound to form an acidic mixture wherein a weight ratio of solvent to carboxylic acid in the acidic mixture is from about 1:1 to about 100:1;
    b) contacting a titanium-containing compound and the acidic mixture to form a solubilized titanium mixture wherein an equivalent molar ratio of titanium-containing compound to carboxylic acid in the solubilized titanium mixture is from about 1:1 to about 1:4, wherein an equivalent molar ratio of titanium-containing compound to acidic phenol in the solubilized titanium mixture is from about 1:1 to about 1:5; and wherein an equivalent molar ratio of titanium-containing compound to peroxide-containing compound in the solubilized titanium mixture is from about 1:1 to about 1:20;
    c) contacting the solubilized titanium mixture with a chromium-containing compound to form a chromium titanium mixture;
    d) contacting the chromium titanium mixture with a silica support comprising silica wherein an amount of silica is in a range of from about 70 wt. % to about 95 wt. % based upon a total weight of the silica support to form an addition product; and
    e) drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

11. The method of claim 10 wherein the acidic phenol comprises catechol, salicyl alcohol, salicylic acid, phthalic acid, or any combination thereof.

12. The method of claim 10 wherein the peroxide-containing compound comprises organic peroxides, diacyl peroxides, peroxydicarbonates, monoperoxycarbonates, peroxyketals, peroxyesters, dialkyl peroxides, hydroperoxides or a combination thereof.

13. The method of claim 10 wherein the peroxide-containing compound comprises hydrogen peroxide, di-tert-butyl peroxide, benzoyl peroxide, dicumyl peroxide, cumene hydroperoxide, tert-butyl hydroperoxide, phthaloyl peroxide or a combination thereof.

14. The method of claim 10 wherein the carboxylic acid comprises acetic acid, citric acid, gluconic acid, glycolic acid, glyoxylic acid, lactic acid, malic acid, malonic acid, oxalic acid, phosphonoacetic acid, tartaric acid, glyceric acid, gluconic acid, mandelic acid, 2,4-hydroxybenzoic acid, 2,6-pyridine dicarboxylic acid, nitrotriacetic acid, α-hydroxyisobutyric acid, methylmalonic acid, phenyl malonic acid, digluconic acid, iminodiacetic acid, hydoxymethyl-2-butyric acid, or a combination thereof.

15. A method comprising:
a) preparing an acidic mixture comprising a solvent and at least two components selected from the group consisting of one or more carboxylic acids, one or more acidic phenols, one or more peroxide-containing compounds and one or more nitrogen-containing compounds;
b) contacting the acidic mixture with a chromium-containing compound, a titanium-containing compound and a silica support to form an addition product wherein:
 (i) an equivalent molar ratio of titanium-containing compound to the one or more carboxylic acids, when present in the acidic mixture, is from about 1:1 to about 1:4,
 (ii) an equivalent molar ratio of titanium-containing compound to the one or more acidic phenols, when present in the acidic mixture, is from about 1:1 to about 1:5,
 (iii) an equivalent molar ratio of titanium-containing compound to one or more peroxide-containing compounds, when present in the acidic mixture, is from about 1:1 to about 1:20; and
 (iv) an equivalent molar ratio of titanium-containing compound to the one or more nitrogen-containing compounds, when present in the acidic mixture, is in a range of from about 1:0.5 to about 1:10; and
c) drying the addition product by heating to a temperature in a range of from about 50° C. to about 150° C. and maintaining the temperature in the range of from about 50° C. to about 150° C. for a time period of from about 30 minutes to about 6 hours to form a pre-catalyst.

16. The method of claim 15 wherein the one or more acidic phenols comprise catechol, salicyl alcohol, salicylic acid, phthalic acid, or any combination thereof.

17. The method of claim 15 wherein the one or more peroxide-containing compounds comprise organic peroxides, diacyl peroxides, peroxydicarbonates, monoperoxycarbonates, peroxyketals, peroxyesters, dialkyl peroxides, hydroperoxides or a combination thereof.

18. The method of claim 15 wherein the one or more peroxide-containing compounds comprise hydrogen peroxide, di-tert-butyl peroxide, benzoyl peroxide, dicumyl peroxide, cumene hydroperoxide, tert-butyl hydroperoxide, phthaloyl peroxide or a combination thereof.

19. The method of claim 15 wherein the one or more carboxylic acids comprise acetic acid, citric acid, gluconic acid, glycolic acid, glyoxylic acid, lactic acid, malic acid, malonic acid, oxalic acid, phosphonoacetic acid, tartaric acid, glyceric acid, gluconic acid, mandelic acid, 2,4-hydroxybenzoic acid, 2,6-pyridine dicarboxylic acid, nitrotriacetic acid, α-hydroxyisobutyric acid, methylmalonic acid, phenyl malonic acid, digluconic acid, iminodiacetic acid, hydoxymethyl-2-butyric acid, or a combination thereof.

20. The method of claim 15 wherein the one or more nitrogen-containing compounds comprise an alkanolamine, an amide, an amine, an alkylamine, an ammonium hydroxide, an aniline, a hydroxylamine, a urea, or a combination thereof.

* * * * *